US012717563B2

(12) United States Patent
Gartmann

(10) Patent No.: US 12,717,563 B2
(45) Date of Patent: Aug. 25, 2026

(54) SYSTEM FOR AUTO-PARALLELIZATION OF PROCESSING CODES FOR MULTI-PROCESSOR SYSTEMS WITH OPTIMIZED LATENCY, AND METHOD THEREOF

(71) Applicant: MYNATIX AG, Basel (CH)

(72) Inventor: Andres Gartmann, Basel (CH)

(73) Assignee: MYNATIX AG, Basel (CH)

( * ) Notice: Subject to any disclaimer, the term of this patent is extended or adjusted under 35 U.S.C. 154(b) by 120 days.

(21) Appl. No.: 18/698,790

(22) PCT Filed: Oct. 27, 2021

(86) PCT No.: PCT/EP2021/079873
§ 371 (c)(1),
(2) Date: Apr. 5, 2024

(87) PCT Pub. No.: WO2023/072386
PCT Pub. Date: May 4, 2023

(65) Prior Publication Data
US 2024/0403013 A1 Dec. 5, 2024

(51) Int. Cl.
*G06F 8/41* (2018.01)

(52) U.S. Cl.
CPC .............. *G06F 8/453* (2013.01); *G06F 8/451* (2013.01)

(58) Field of Classification Search
CPC ................................. G06F 8/451; G06F 8/453
See application file for complete search history.

(56) References Cited

U.S. PATENT DOCUMENTS 6,243,863 B1 * 6/2001 Kothari .................... G06F 8/456 717/149
10,466,976 B2 * 11/2019 Pudiyapura ......... G06F 9/30145
2002/0199173 A1 * 12/2002 Bowen .................. G06F 11/362 714/E11.21
2008/0263530 A1 10/2008 Rahavan et al.
2016/0139893 A1 * 5/2016 Atreya .................... G06F 8/314 717/143
2021/0256092 A1 * 8/2021 Majcher .................. G06F 17/16
2022/0365750 A1 * 11/2022 Bharambe ............... G06F 7/483
2023/0333825 A1 * 10/2023 Sanghi .................... G06F 8/441

OTHER PUBLICATIONS

Chen et al., "Compiling Parallel Programs by Optimizing Performance" (Year: 1988).*

(Continued)

*Primary Examiner* — Phillip H Nguyen
(74) *Attorney, Agent, or Firm* — Oblon, McClelland, Maier & Neustadt, L.L.P.

(57) ABSTRACT

A compiler system for optimized compiling of a computer program for execution by a parallel processing system having a plurality of processing units and corresponding method. The compiler system comprises means for translating a source programming language of the computer program into a machine code as target programming language thereby generating an optimized processing code comprising a number of instructions executable by the plurality of processing units of the parallel processing system or controlling the operation of the plurality of processing units.

17 Claims, 74 Drawing Sheets

(56) References Cited

OTHER PUBLICATIONS

International Search Report issued Feb. 10, 2022 in PCT/EP2021/079873, filed on Oct. 27, 2021, 4 pages.

International Preliminary Examining Authority issued May 8, 2023 in PCT/EP2021/079873, filed on Oct. 27, 2021, 23 pages.

Kandemir et al. "Slicing Based Code Parallelization for Minimizing Inter-processor Communication", 2009 International Conference on Compilers, Architecture, and Synthesis for Embedded Systems, 2009, pp. 87-95.

Fonseca et al. "Automatic Parallelization: Executing Sequential Programs on a Task-Based Parallel Runtime", arxiv.org, Cornell University Library, 201 Olin Library Cornell University Ithaca, NY 14853, Apr. 11, 2016, 23 pages.

* cited by examiner

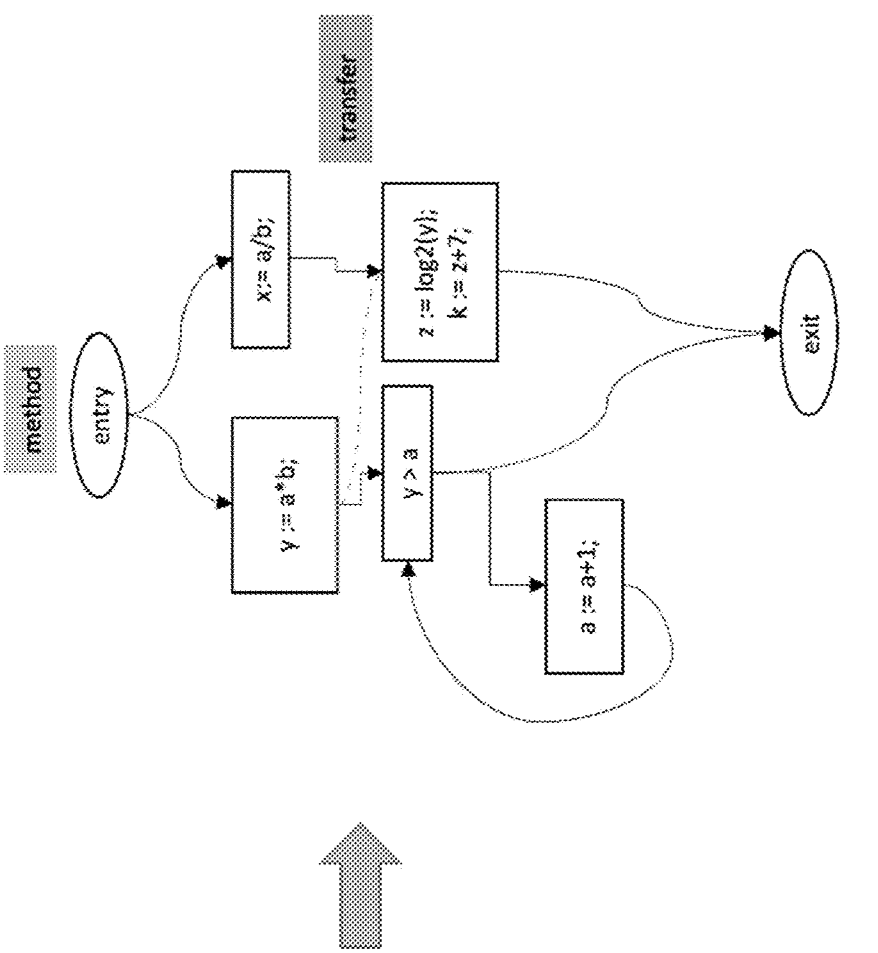
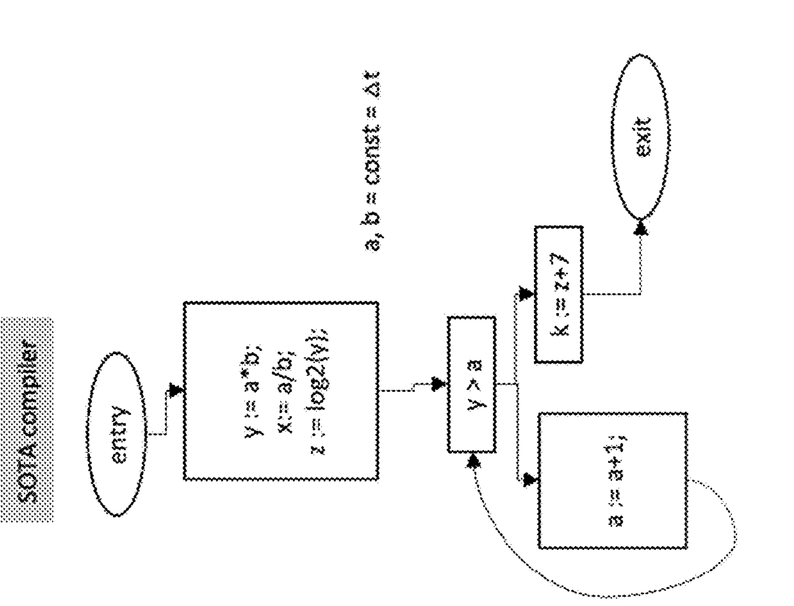
Fig. 6

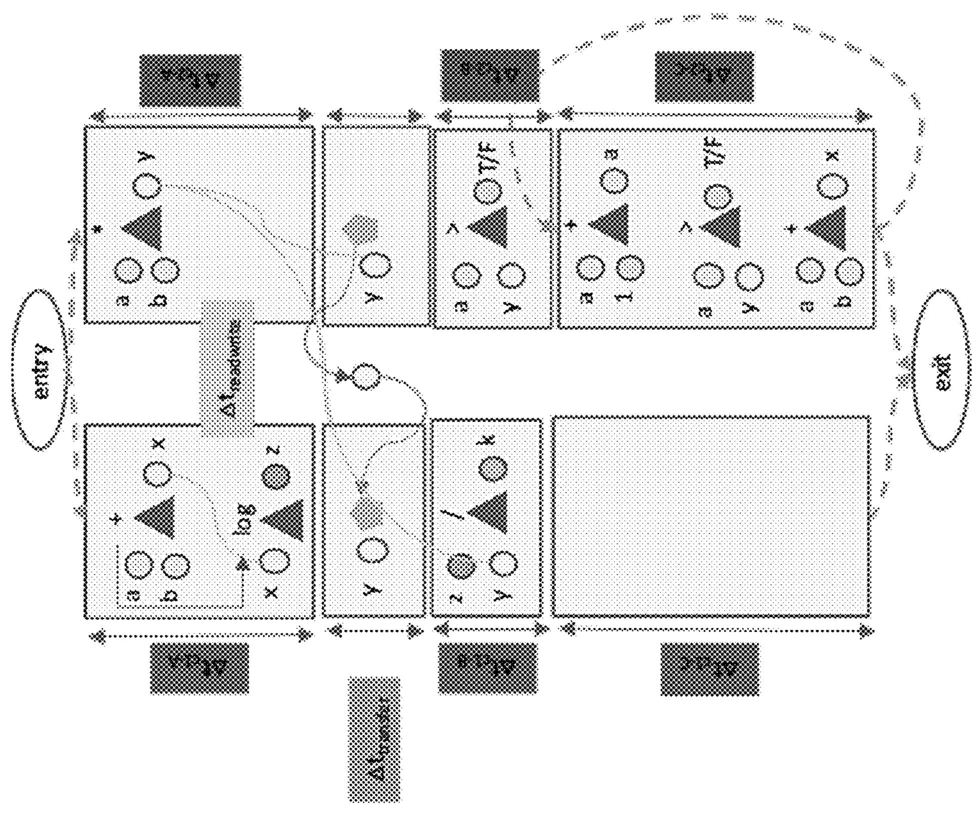
Fig. 7
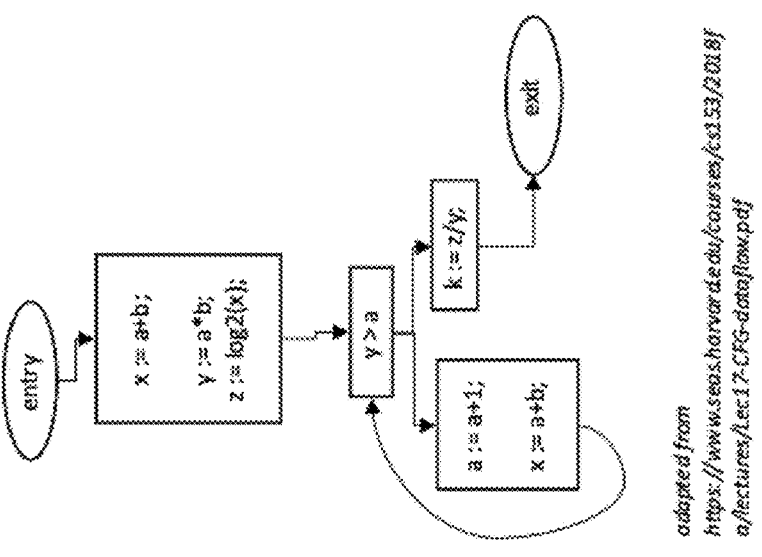

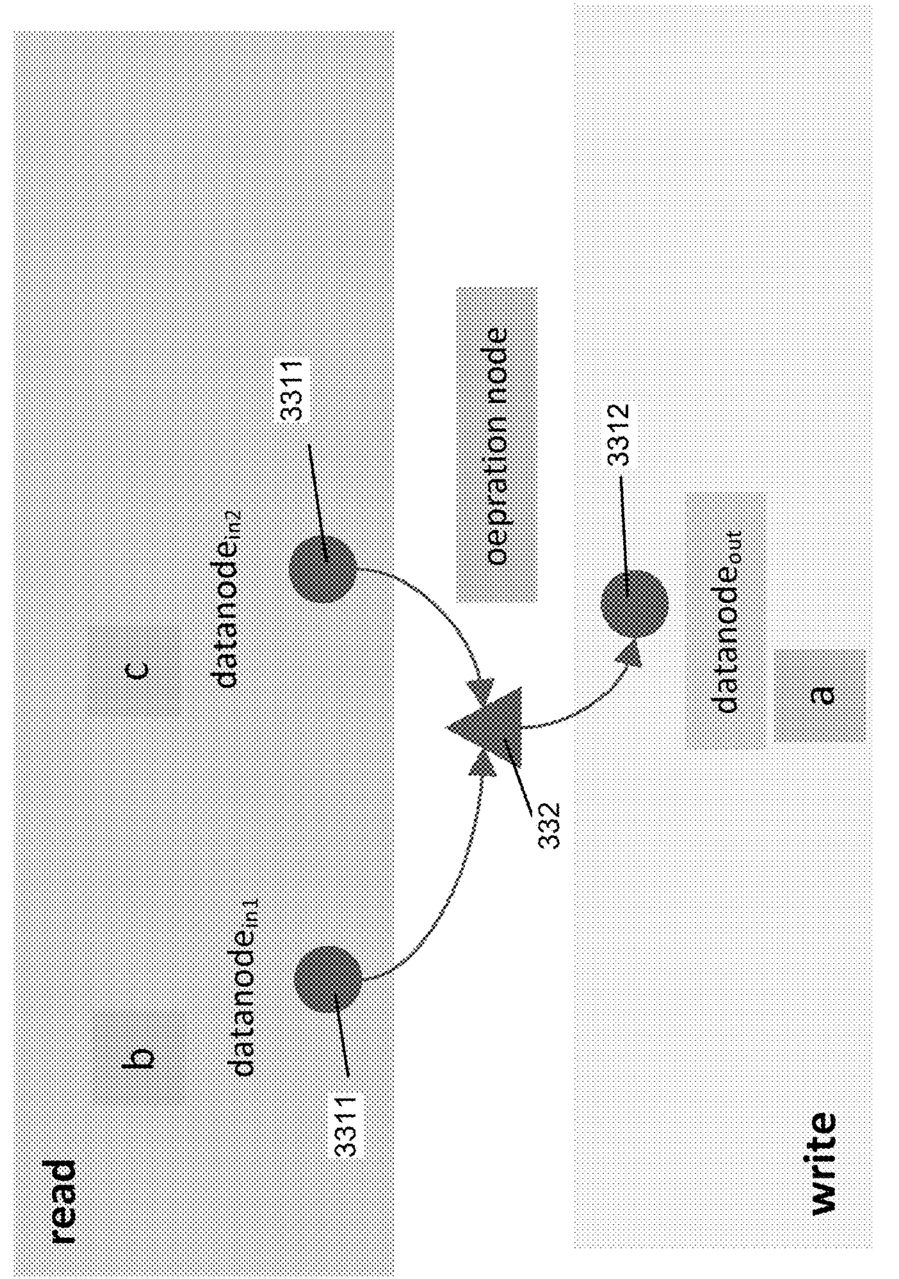
Fig. 16
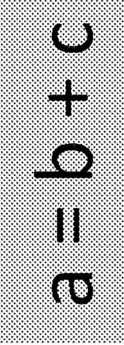

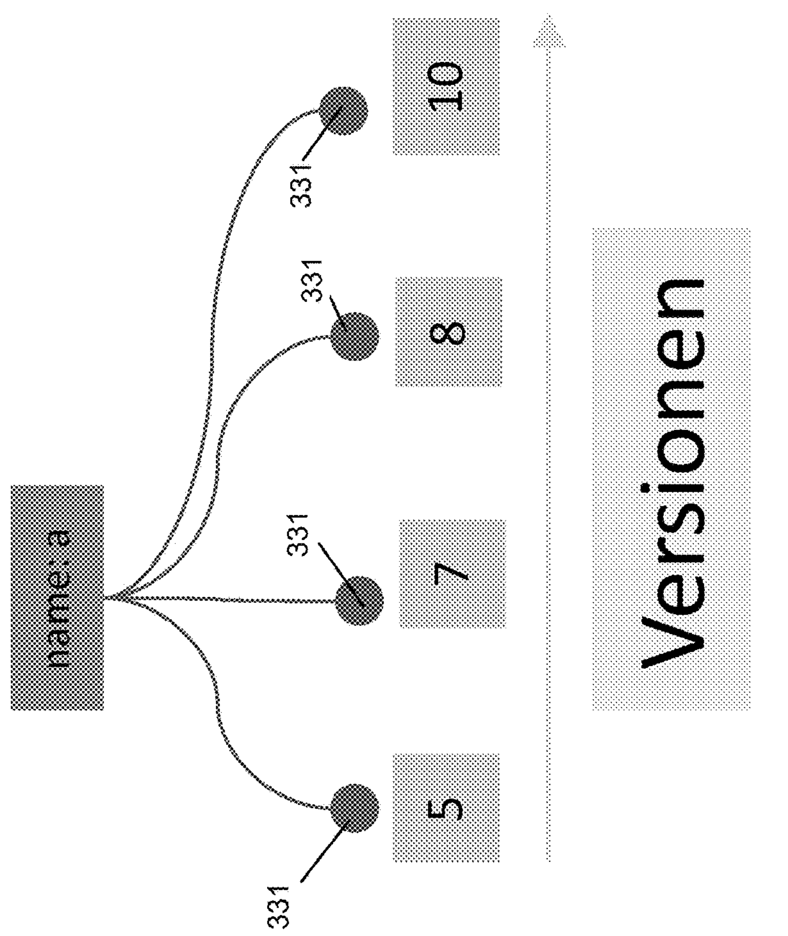
Fig. 17
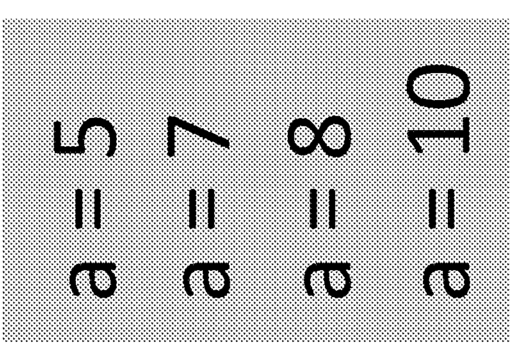

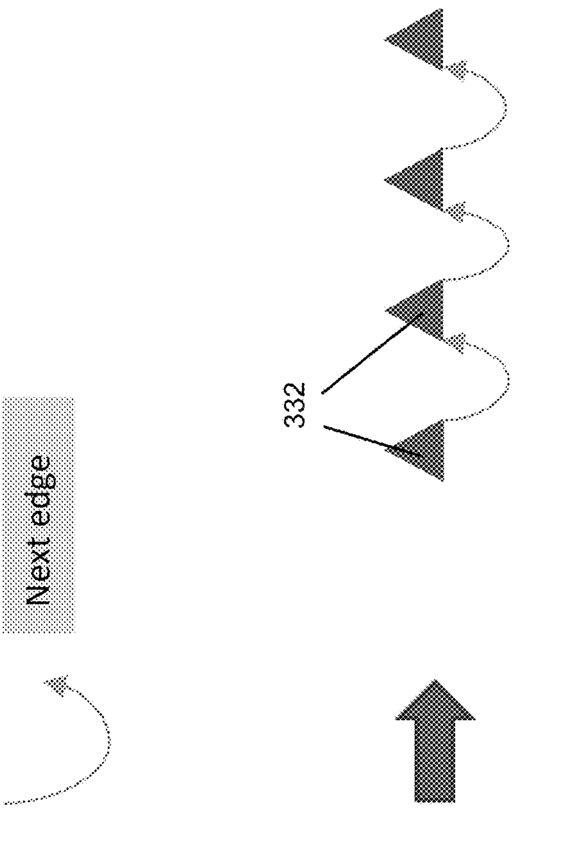
Fig. 18
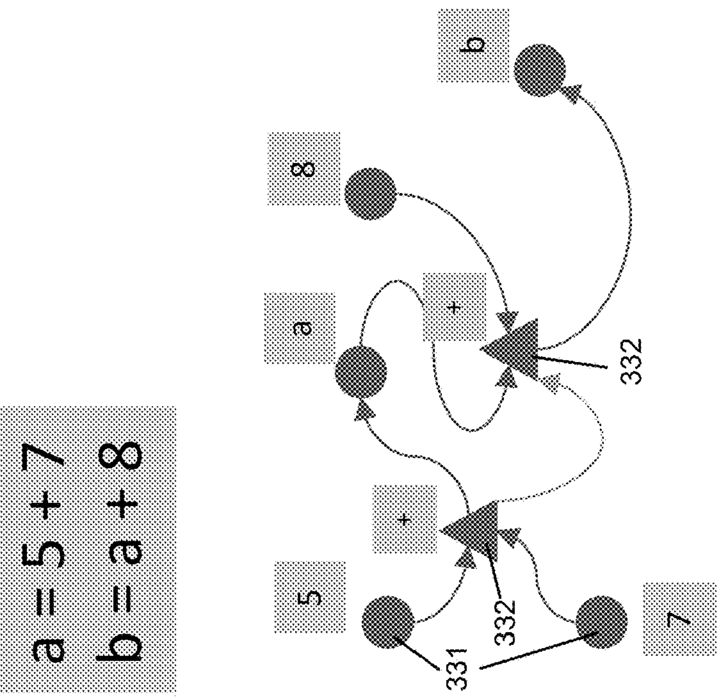

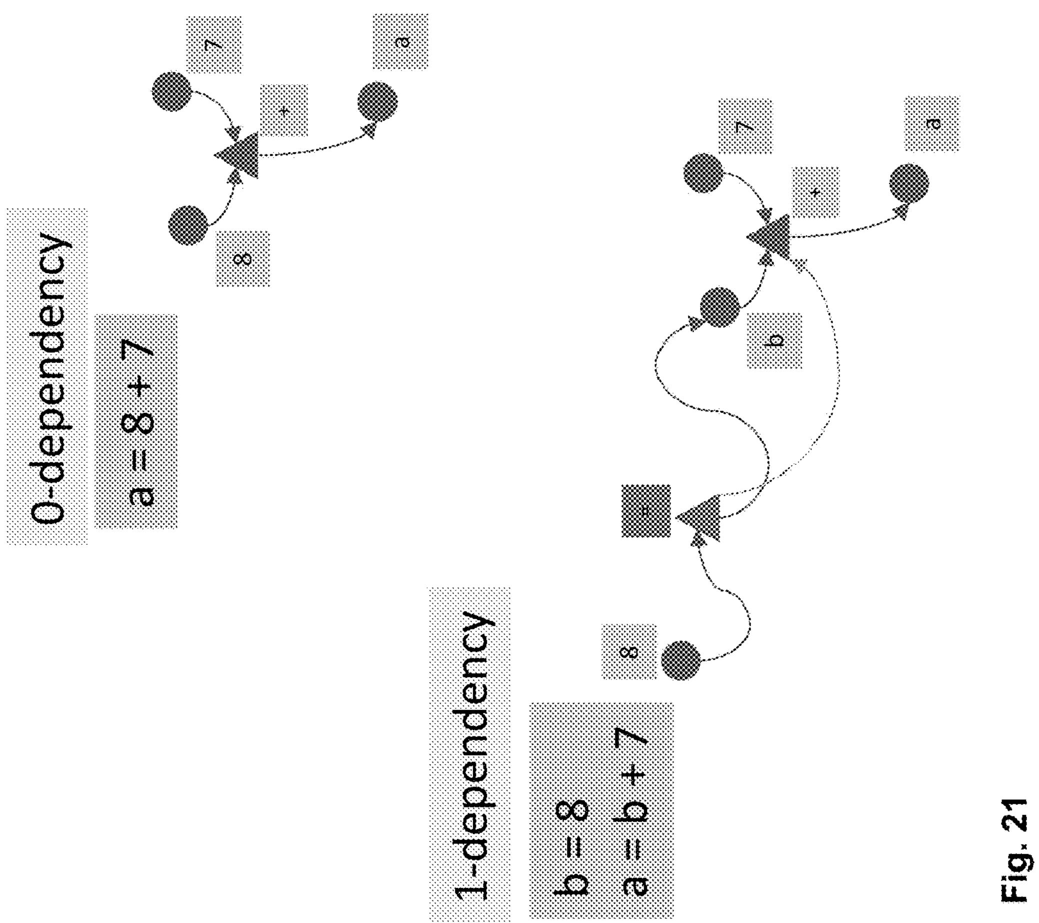
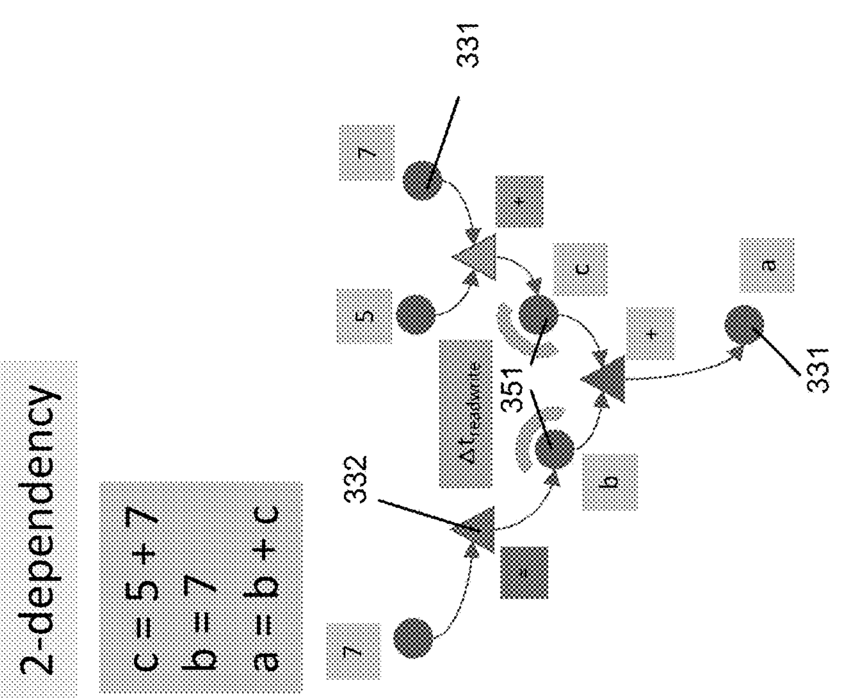
Fig. 21

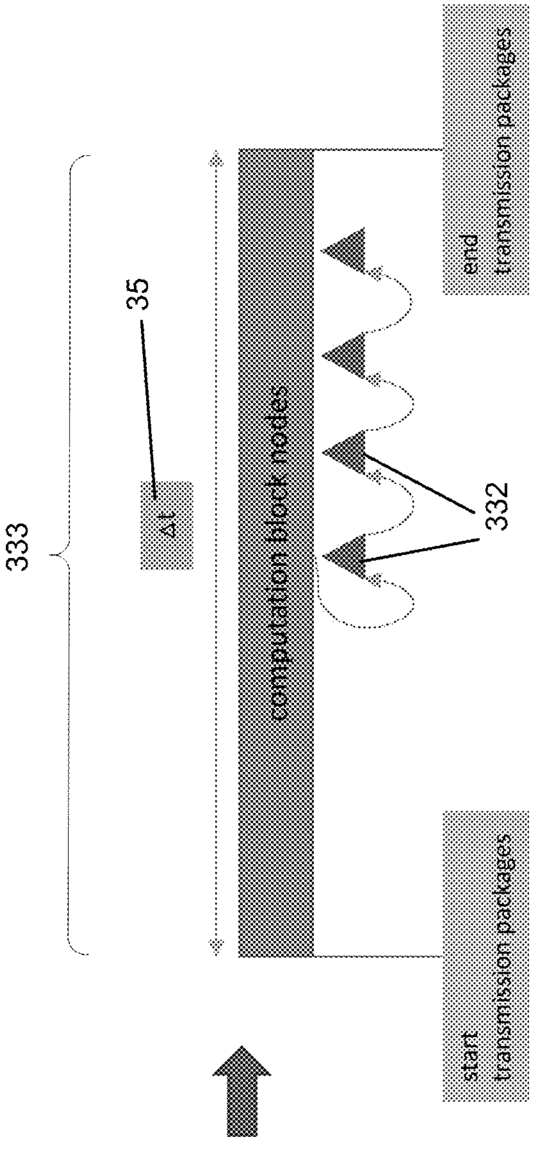
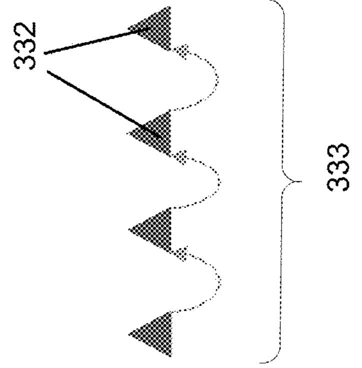
Fig. 23

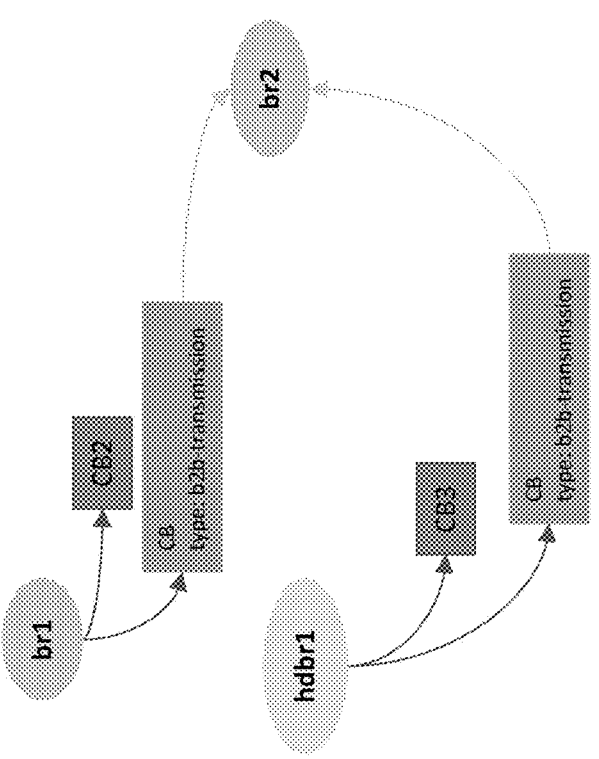
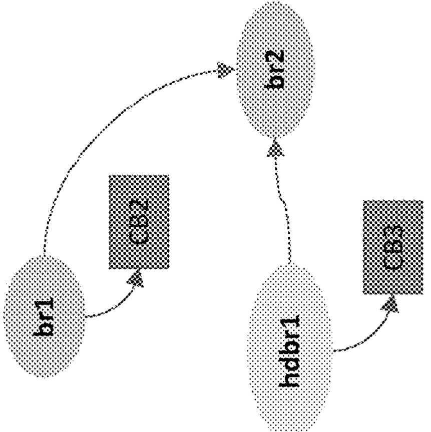
Fig. 33

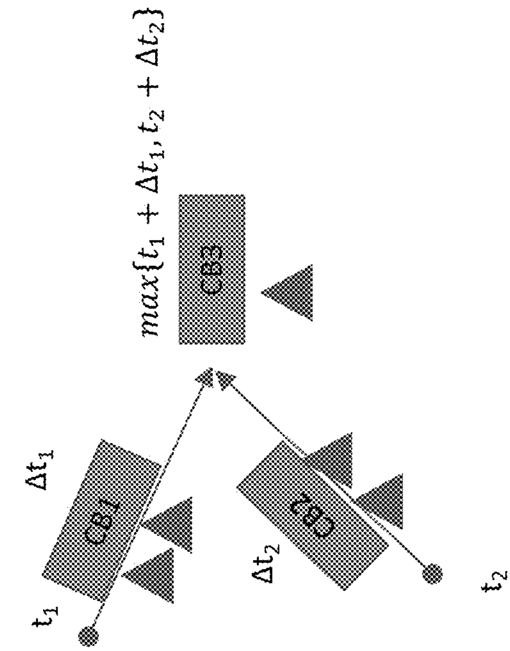
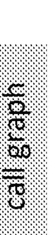
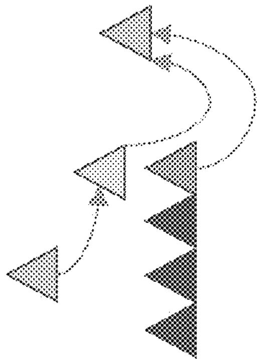
Fig. 34

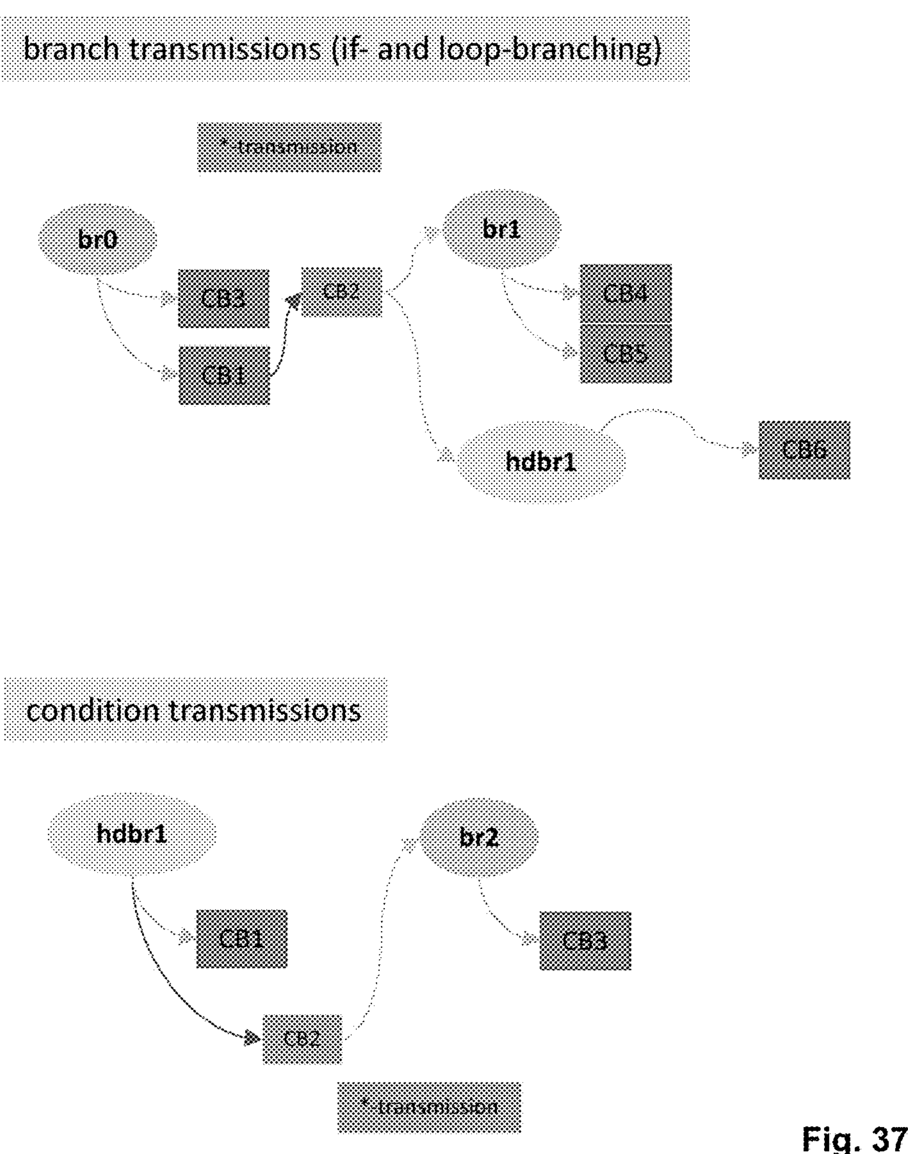
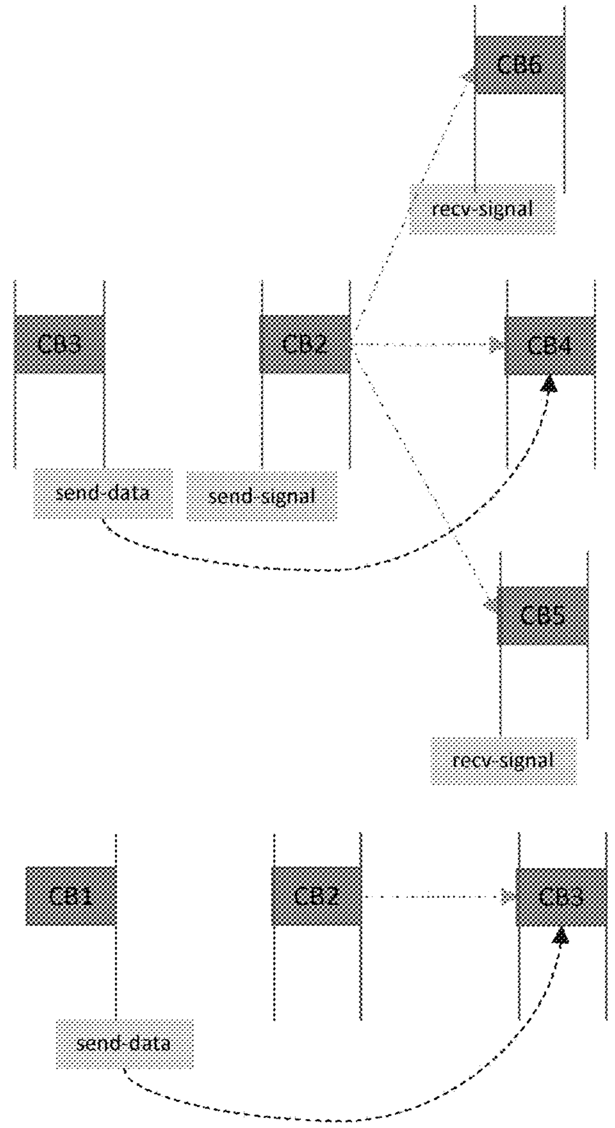
Fig. 37

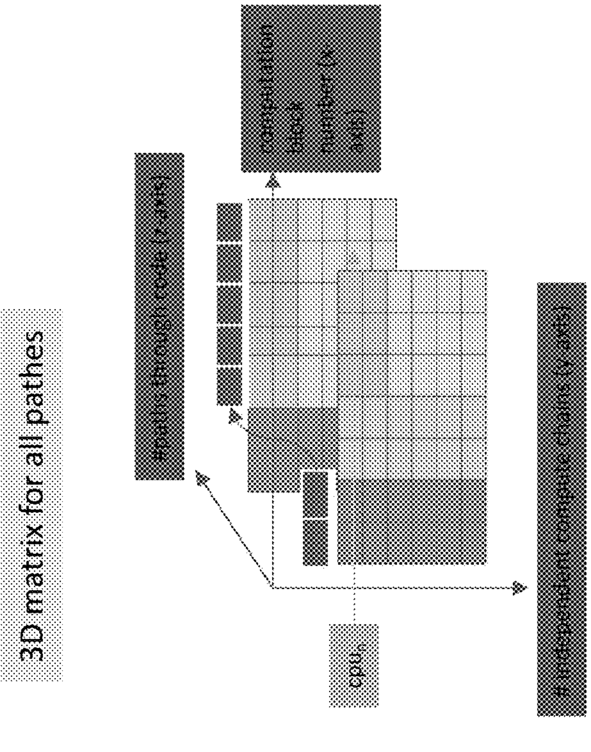
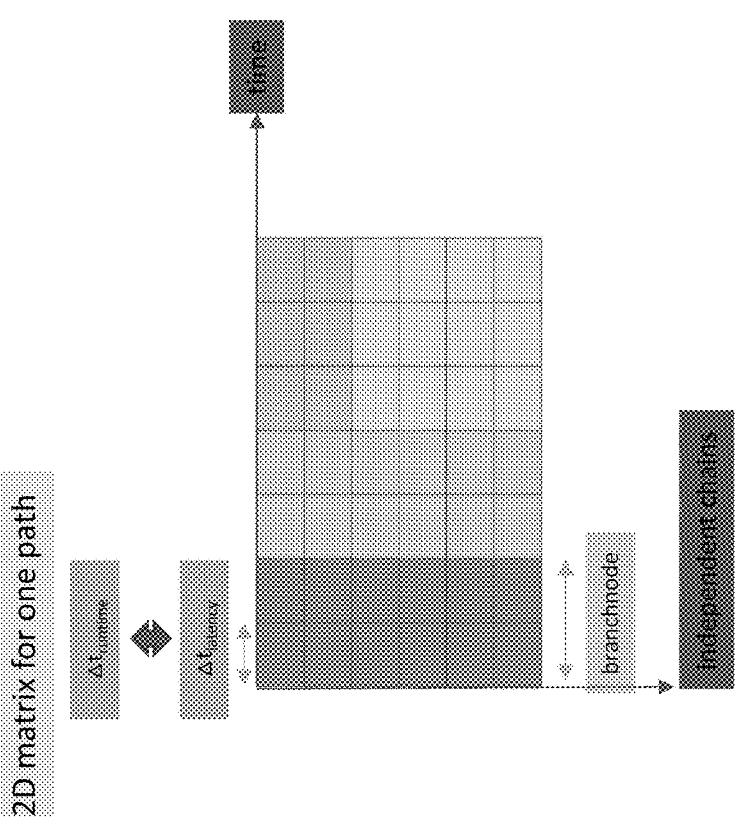
Fig. 39

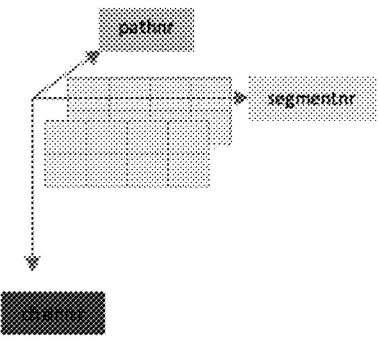
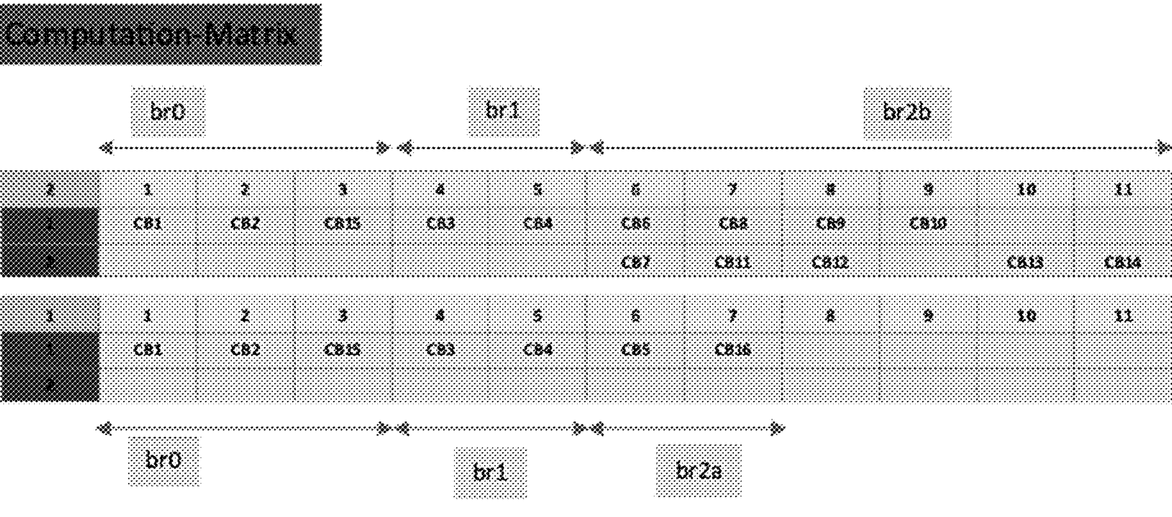
| cbid | segm,chain,path | x | y | z |
|---|---|---|---|---|
| CB1 | 1,1,1 | 1 | 1 | 1,2 |
| CB2 | 2,1,1 | 2 | 1 | 1,2 |
| CB15 | 3,1,1 | 3 | 1 | 1,2 |
| CB3 | 4,1,1 | 4 | 1 | 1,2 |
| CB4 | 5,1,1 | 5 | 1 | 1 |
| CB6 | 6,1,2 | 6 | 1 | 2 |
| CB8 | 7,1,2 | 7 | 1 | 2 |
| CB9 | 8,1,2 | 8 | 1 | 2 |
| CB10 | 9,1,2 | 9 | 1 | 2 |
| CB7 | 6,2,2 | 6 | 2 | 2 |
| CB11 | 7,2,2, | 7 | 2 | 2 |
| CB12 | 8,2,2 | 8 | 2 | 2 |
| CB13 | 10,2,2 | 10 | 2 | 2 |
| CB14 | 11,2,2 | 11 | 2 | 2 |
Fig. 44

Transfer-Matrix

| 2 | 1 | 2 | 3 | 4 | 5 | 6 | 7 | 8 | 9 | 10 | 11 |
|---|---|---|---|---|---|---|---|---|---|---|---|
| 1 | e:<br>COM1-> | | s:<br>->COM10 | e:<br>SIG1-><br>COM2-><br>s:<br>->COM1<br>->COM4<br>->COM5 | | s:<br>->SIG1<br>->COM2<br>e:<br>COM4-> | | s:<br>->COM8 | s:<br>COM6-> | | |
| 2 | | | | | | s:<br>->SIG1<br>->COM2<br>e:<br>COM5-> | | s:<br>->COM9 | | s:<br>->COM6 | s:<br>COM7-> |

| 1 | 1 | 2 | 3 | 4 | 5 | 6 | 7 | 8 | 9 | 10 | 11 |
|---|---|---|---|---|---|---|---|---|---|---|---|
| 1 | e:<br>COM1-> | | s:<br>->COM10 | e:<br>SIG1-><br>COM2-><br>s:<br>->COM1<br>->COM4<br>->COM5 | | s:<br>->SIG1<br>->COM2<br>e:<br>COM3-> | | | | | |
| 2 | | | | | | | | | | | |

| | source cbid | | target cbid | | | direction |
|---|---|---|---|---|---|---|
| | start | end | start | end | variable | |
| COM1 | | CB1 - (1,1,1) | CB3 - (4,1,1) | | gid8, addr CB15 | forward |
| SIG1 | | CB3 - (4,1,1) | CB5 - (6,1,1), CB6 - (6,1,2), CB7 - (6,2,2) | | gid2 | forward |
| COM2 | | CB3 - (4,1,1) | CB5 - (6,1,1), CB6 - (6,1,2), CB7 - (6,2,2) | | gid1 | forward |
| COM3 | | CB5 - (6,1,1) | CB15 / CB9 / CB12 | | gid1 | |
| COM4 | | CB6 - (6,1,2) | CB3 - (4,1,1) | | gid3, addr CB9 | backward |
| COM5 | | CB7 - (6,2,2) | CB3 - (4,1,1) | | gid5, addr CB12 | backward |
| COM6 | | CB9 - (9,1,2) | CB10 - (10,2,2) | | gid4 | forward |
| COM7 | | CB13 - (10,2,2) | CB15 / CB9 / CB12 | | gid7 | |
| COM8 | | LL | CB9 - (8,1,2) | | gid4 | |
| COM9 | | LL | CB12 - (8,2,2) | | gid5 | |
| COM10 | | LL | CB15 - (3,1,1) | | gid9 | |

Fig. 45

```
# Set the initial condition
u.fill(u_initial)
```

initial block

```
# Set the boundary conditions
u[:, (plate_length-1):, :] = u_top
u[:, :, :1] = u_left
u[:, :1, 1:] = u_bottom
u[:, :, (plate_length-1):] = u_right
```

boundary conditions computation block

```
for k in range(0, max_iter_time-1, 1):
        for i in range(1, plate_length-1, delta_x):
            for j in range(1, plate_length-1, delta_x):
                u[k + 1, i, j] = gamma * (u[k][i+1][j] + u[k][i-1][j] + u[k][i][j+1] + u[k][i][j-1] - 4*u[k][i][j]) + u[k][i][j]
```

Fig. 55

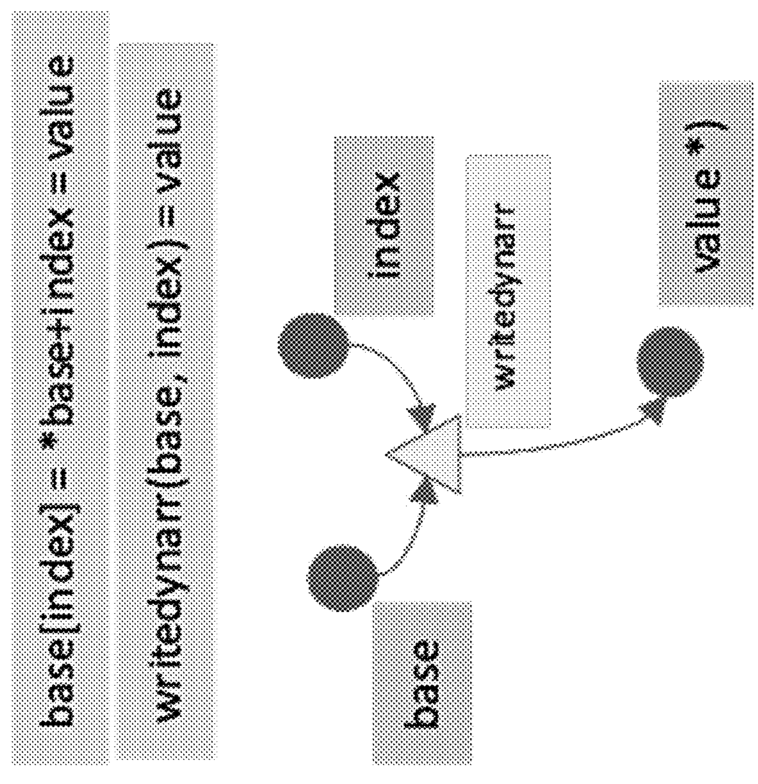
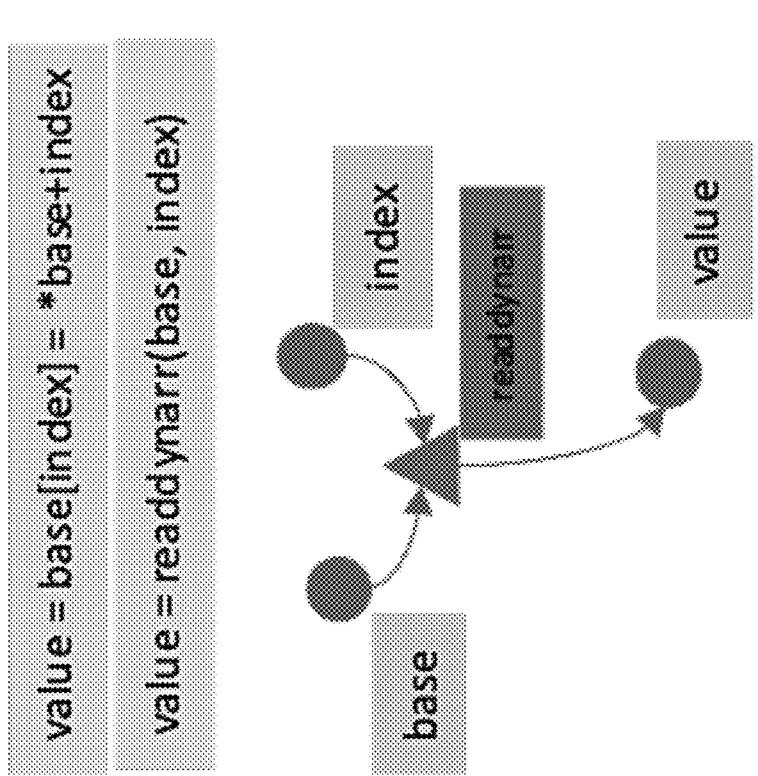
Fig. 56

| | | | | | | |
|---|---|---|---|---|---|---|
| 2->1 | 0 | 4->1 | 0 | 1->1 | Smal: op +; 2mal: op * | send: ->2, ->4 |
| 3->2 | 1->2 | 5->2 | 0 | 2->2 | Smal: op +; 2mal: op * | send: ->1, ->3, ->5 |
| 0 | 2->3 | 6->3 | 0 | 3->3 | Smal: op +; 2mal: op * | send: ->2, ->6 |
| 5->4 | 0 | 0 | 1->4 | 4->4 | Smal: op +; 2mal: op * | send: ->4, ->1 |
| 6->5 | 4->5 | 0 | 2->5 | 5->5 | Smal: op +; 2mal: op * | send: ->4, ->6, ->2 |
| 0 | 5->6 | 0 | 3->6 | 6->6 | Smal: op +; 2mal: op * | send: ->5, ->3 |

$$\begin{pmatrix} 2\rightarrow 1 \\ 3\rightarrow 2 \\ 0 \\ 5\rightarrow 4 \\ 6\rightarrow 4 \\ 0 \end{pmatrix} \cdot \Delta t_{trans} \quad \begin{pmatrix} 0 \\ 1\rightarrow 2 \\ 2\rightarrow 3 \\ 0 \\ 4\rightarrow 5 \\ 5\rightarrow 6 \end{pmatrix} \cdot \Delta t_{trans} \quad \begin{pmatrix} 4\rightarrow 1 \\ 5\rightarrow 2 \\ 6\rightarrow 3 \\ 0 \\ 0 \\ 0 \end{pmatrix} \cdot \Delta t_{trans} \quad \begin{pmatrix} 0 \\ 0 \\ 0 \\ 1\rightarrow 4 \\ 2\rightarrow 5 \\ 3\rightarrow 6 \end{pmatrix} \cdot \Delta t_{trans} \quad \begin{pmatrix} 0 \\ 0 \\ 0 \\ 0 \\ 0 \\ 0 \end{pmatrix} \cdot \Delta t_{trans} \quad \begin{pmatrix} \Gamma \\ \Gamma \\ \Gamma \\ \Gamma \\ \Gamma \\ \Gamma \end{pmatrix} \cdot \Delta t_{latency}$$

meta-values $$cache\_size = \begin{pmatrix} 6 \\ 6 \\ 6 \\ 6 \\ 6 \\ 6 \end{pmatrix} float\_size$$

$$transfer\_size = \begin{pmatrix} [illegible] \\ [illegible] \\ [illegible] \\ [illegible] \\ [illegible] \\ [illegible] \end{pmatrix} float\_size$$

$$\Gamma = 5+, 2*$$

Fig. 70

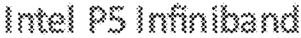
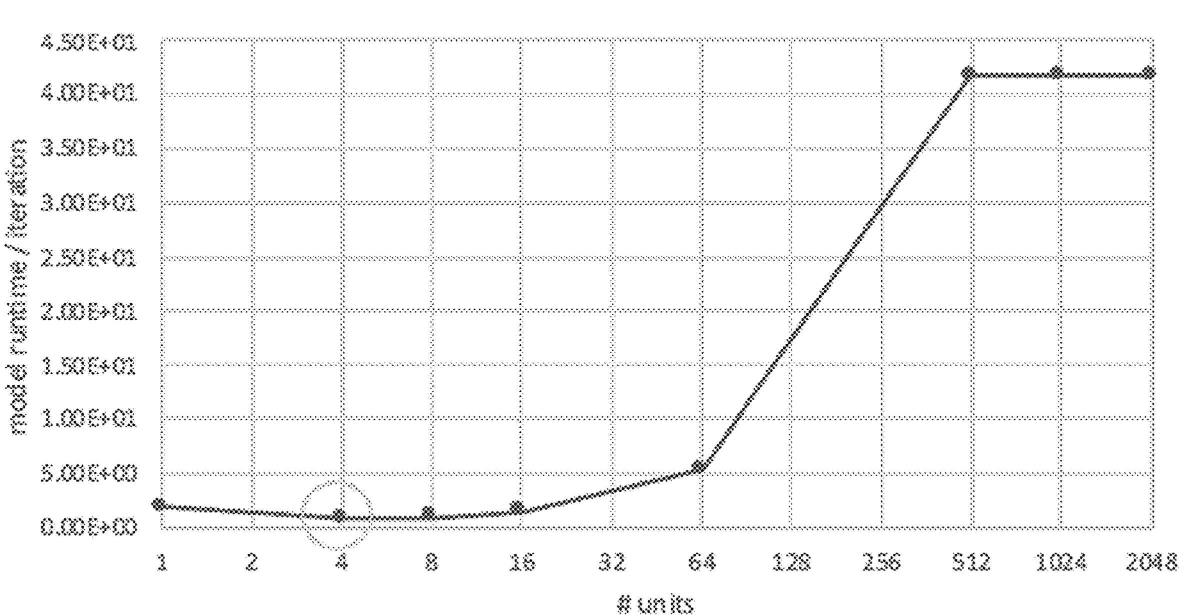
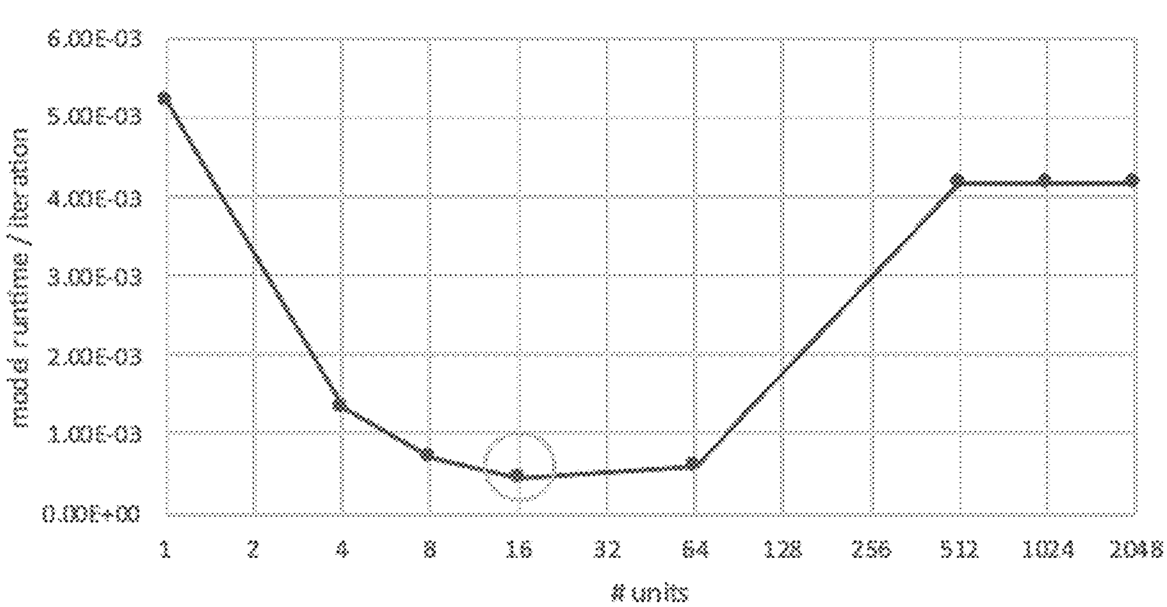
Fig. 72

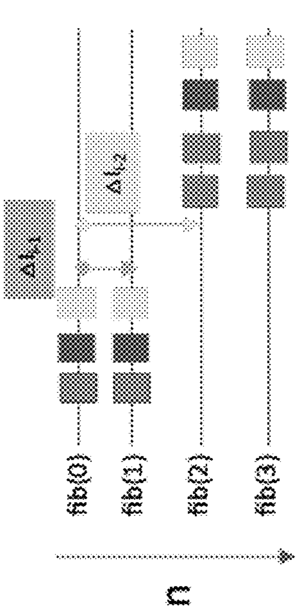
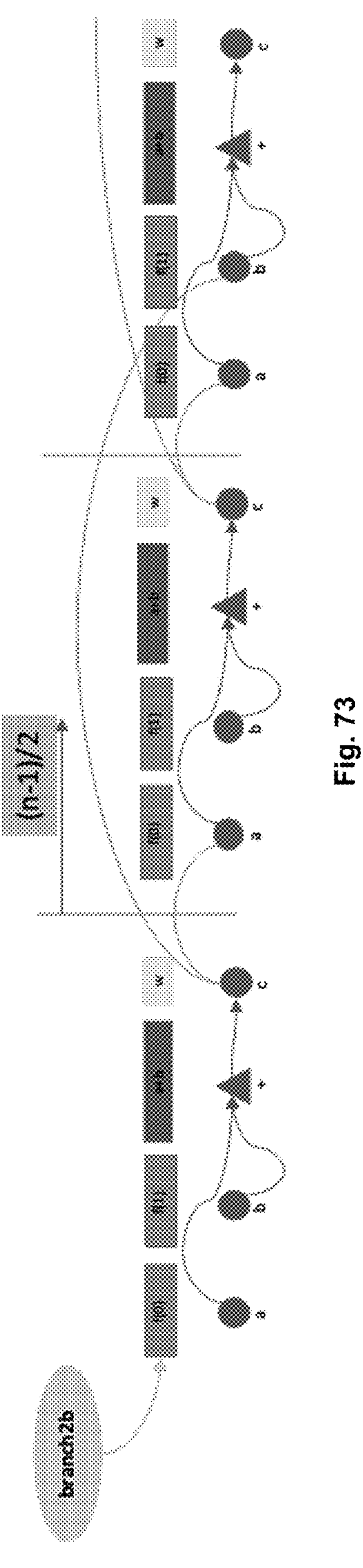
Fig. 73

SYSTEM FOR AUTO-PARALLELIZATION OF PROCESSING CODES FOR MULTI-PROCESSOR SYSTEMS WITH OPTIMIZED LATENCY, AND METHOD THEREOF

FIELD OF THE INVENTION

The current invention generally relates to multi-processor systems, multicore systems and parallel computing systems allowing multiprocessing in which two or more processors work together to execute multiple program codes and/or processor instruction sets simultaneously, the multi-processor systems or parallel-computing systems comprising a number of central processing units linked together to enable said multiprocessing or parallel processing to take place. In particular, it relates to compiler systems for optimizing a computer program for execution by a parallel processing system having a plurality of processing units. More particularly, the described embodiments relate to systems and methods for auto-parallelization of code for execution in the described multi-processor systems. In the technical field of multiprocessor systems, important characteristics and classifications arise inter alia, from way, how processor memory access is handled and whether system processors are of a single type or various ones in the system architecture.

BACKGROUND OF THE INVENTION

The increasing need of computation heavy applications, inter alia driven by the dawn of the industry 4.0 technology, the ongoing automation of traditional manufacturing, accompanied by more and more industrial practices using modern smart technology, large-scale machine-to-machine communication (M2M), the internet of things (IoT) with improved communication and monitoring means having large scale data access and aggregation, and the increasing importance of industrial simulation technology as e.g. digital twin technology, is causing a paradigm shift from centralized computing to parallel and distributed computing. Parallel computing includes distributing computing jobs to various computing resources. These resources generally include several central processing units (CPU), graphics processing units (GPU), memory, storage, and support for networking. In addition to the increasing demand, there has been, on hardware level, huge developments in the performance and capability of the computer systems in the last 50 years. This was made possible with the help of Very Large Scale Integration (VLSI) technology. VLSI technology allows a large number of components to be accommodated on a single chip and clock rates to increase. Therefore, more operations can be performed at a time, in parallel. Parallel processing is also associated with data locality and data communication. Thus, the field of parallel computer architectures typically refers to systems and methods of organizing all the resources of parallel computer systems to maximize the performance and the programmability within the limits given by technology and the cost at any instance of time. Parallel computer architecture adds dimensions in the development of computer systems by using more and more number of processors. In principle, performance achieved by utilizing large number of processors is higher than the performance of a single processor at a given point of time. However, parallelization of processor code is complex and difficult to automate in respect to truly optimized parallelization.

Centralized computing works well in many applications but may falls short in the execution of computation rich applications and massive data processing. Programs can be executed in a serial fashion or distributed to be executed on multiple processors. When programs are executed in a serial fashion, only one processor can be utilized and hence the throughput is limited to the speed of the processor. Such systems with one processor are adequate for many applications but not for compute intensive applications, as modern computer-based simulation techniques. Processing code can be executed in parallel in multi-processor systems leading to higher throughput. Multi-processor systems entail breaking of code into smaller code blocks and efficiently managing the execution of code. In order for the processors to execute in parallel, data to each of the processors has to be independent. Instances of a same code block can be executed on several processors simultaneously to improve the throughput. If the processors need data from a previous execution or another process currently performing calculations, then parallel processing efficiency could decrease due to the latency occurring exchange data between and/or of the processor units. In general, when processors enter states in which the execution of a program is suspended or not executed, for whatever reason, and instructions belonging to it are not fetched from memory or executed, those states induce idle states of the processor affecting parallel processing efficiency. Data dependency needs to be considered when scheduling processors. Efficiently managing multiple processors and data dependency for higher throughput is challenging. It is desirable to have a method and system for efficient management of code blocks in computation rich applications. It is to be noted, that the problem of latency also exist in single processor systems, where, for example, latency oriented processor architecture is used to minimize the problem, which are microarchitecture of microprocessor designed to serve a serial computing thread with a low latency. These architectures, in general, aim to execute as many instructions as possible belonging to a single serial thread, in a given window of time, where the time to execute a single instruction completely from fetch to retire stages may vary from a few cycles to even a few hundred cycles in some cases. However, these techniques do not automatically apply to the latency problem of (massive) parallel computing systems.

In general, parallel computing systems require efficient parallel coding or programming, where parallel programming becomes a programming paradigm. It comprises on the one hand methods to divide a computer program into individual sections that can be executed concurrently, and on the other hand methods to synchronize concurrent code sections. This is in contrast to classical sequential (or serial) programming and coding. Parallel execution of a program can be supported on the hardware side; the programming languages are then typically adapted to this. For example, parallel programming can be done explicitly by letting the programmer execute program parts in separate processes or threads, or it can be done automatically so that causally independent (parallelizable) sequences of instructions are executed side by side, i.e. parallel. This parallelization can be done automatically by a compiler system if a computer with a multi-core processor or a parallel computer is available as target platform. Some modern CPUs can also recognize such independence (in the machine code or microcode of a program) and distribute the instructions to different parts of the processor in such a way that they are executed simultaneously (out-of-order execution). However, as soon as the individual processes or threads communicate with each other, they are, in that sense, no longer concurrent as a whole since they influence each other, only individual sub-processes being still concurrent with each other. If the order of execution of the communication points of the individual processes or threads cannot be defined accordingly, conflicts can arise, especially so-called deadlocks, when two processes wait for each other (or block each other) or race-conditions, when two processes overwrite each other's results. In the prior art, to solve this problem, synchronization techniques are used, as e.g. mutual exclusion (Mutex) techniques. Though such techniques can prevent race conditions, they do not allow an optimized parallel handling of the processes or threats with a minimal latency of the processor units.

(Micro-) processors are based on integrated circuits, which make it possible to do arithmetic and logical operations based on two binary values (in the simplest 1/0). For this, the binary values must be available for the processor's calculating unit. A processor unit needs to get the two binary values to calculate the result of an expression a=b operand c. The time it takes to retrieve the data for these operations is known as the latency time. There is a wide hierarchical range for these latency times from the register, L1-cache, memory access, I/O Operation or a network transfer, as well as processor configuration (e.g. CPU vs. GPU). As every single component has a latency time, the overall latency time for the calculation is a combination mainly of hardware components needed to get the data from one location to the other in a modern computation infrastructure. In modern architectures, also the different software layers (e.g. of an operating system) have large influences. The difference between fastest location for a CPU (or GPU) to get data and the slowest can be huge (in the range of factor $>10^9$). FIG. 1 illustrates the formation of latency times in modern computation infrastructures. As FIG. 1 shows, parallel computing machines have been developed with different distinct architecture. It is important to note, that parallel architecture enhances the conventional concepts of computer architecture with communication architecture. Computer architecture defines critical abstractions (like user-system boundary and hardware-software boundary) and organizational structure, whereas communication architecture defines the basic communication and synchronization operations. It also addresses the organizational structure.

Computer applications are typically written in the top layer, i.e. in a high level language, being based on corresponding programming models. Various parallel programming models are known, as e.g. (i) shared address space, (ii) message passing, or (iii) data parallel programming referring to corresponding multi-processor system architectures. Shared memory multiprocessors are such a class of parallel machines. Shared memory multiprocessor systems give better throughput on multiprogramming workloads and supports parallel programs. In this case, the computer system allow a processor and a set of I/O controller to access a collection of memory modules by some hardware interconnection. The memory capacity is increased by adding memory modules and I/O capacity is increased by adding devices to I/O controller or by adding additional I/O controller. Processing capacity can be increased by implementing faster processors or by adding more processors. As illustrated in FIG. 2, the resources are organized around a central memory bus. Through the bus access mechanism, any processor can access any physical address in the system. As all the processors are assumed to be or in fact equidistant from all the memory locations, the access time or latency of all the processors is same on a memory location. This is called symmetric multiprocessor system.

The message passing architecture is another class of parallel machines and programming model. It provides communication among processors as explicit I/O operations. The communication is combined at the I/O level, instead of the memory system. In message passing architectures, user communication is executed by using operating system or library calls that perform lower level actions, which includes the actual communication operation. As a result, there is a distance between the programming model and the communication operations at the physical hardware level. Send and receive is the most common user level communication operations in message passing system. Send specifies a local data buffer (which is to be transmitted) and a receiving remote processor. Receive specifies a sending process and a local data buffer in which the transmitted data will be placed. In send operation, an identifier or a tag is attached to the message and the receiving operation specifies the matching rule like a specific tag from a specific processor or any tag from any processor. The combination of a send and a matching receive completes a memory-to-memory copy. Each end specifies its local data address and a pair wise synchronization event. Though, message passing and a shared address space traditionally represent two distinct programming models, each having an own paradigm for sharing, synchronization and communication, the basic machine structures have converged towards a common organization, today.

Finally the data parallel processing is a further class of parallel machines and programming model, also referred as processor arrays, data parallel architecture or single-instruction-multiple-data machines. The main feature of this programming model is that operations can be executed in parallel on each element of a large regular data structure (like array or matrix). Data parallel programming languages are usually enforced by viewing the local address space of a group of processes, one per processor, forming an explicit global space. As all the processors communicate together and there is a global view of all the operations, so either a shared address space or message passing can be used. However, the development of programming models only cannot increase the efficiency of the computer, nor can the development of hardware alone do it. Further, top level programming models necessarily introduce boundary conditions, as e.g. the model specific architecture, given by the programming model requirements. Since a parallel program consists of one or more threads operating on data, the underlying parallel programming model defines what data the threads require, which operations can be performed on the required data, and which order is followed by the operations. Thus, there are limitations on the optimization of machine codes for multi-processor systems, due to the boundaries of the underlying programming model. A parallel program must necessarily coordinate the activity of its threads to ensure that the dependencies between the programs are enforced.

As FIG. 1 shows, parallel computing machines have been developed with different distinct architecture, each giving raise to different formation of latency times in their computation infrastructures. One of the most common multiprocessor systems is the shared memory multiprocessors systems. Essentially, there are three basic architectures known for shared memory multiprocessors systems: (i) Uniform Memory Access (UMA), (ii) Non-uniform Memory Access (NUMA), and (iii) Cache Only Memory Architecture (COMA). In the UMA-architecture (see FIG.

3), all the processors share the physical memory uniformly. All the processors have equal access time to all the memory words. Each processor may have a private cache memory. Same rule is followed for peripheral devices. When all the processors have equal access to all the peripheral devices, the system is called a symmetric multiprocessor. When only one or a few processors can access the peripheral devices, the system is called an asymmetric multiprocessor. In the NUMA multiprocessor architecture (see FIG. 4), the access time varies with the location of the memory word. The shared memory is physically distributed among all the processors, called local memories. The collection of all local memories forms a global address space which can be accessed by all the processors. Finally, the COMA multiprocessor architecture (see FIG. 5) is a special case of the NUMA multiprocessor architecture. In the COMA multiprocessor architecture, all the distributed main memories are converted to cache memories. The COMA architecture can also be applied to distributed memory multi-computers. A distributed memory multicomputer system consists of multiple computers, typically denoted as nodes, inter-connected by message passing network. Each node acts as an autonomous computer having a processor, a local memory and sometimes I/O devices. In this case, all local memories are private and are accessible only to the local processors, thus such machines are also called no-remote-memory-access (NORMA) machines. Other known multi-processor architectures are e.g. multivector computers and Single Instruction, Multiple Data (SIMD) parallel computers, Parallel Random-Access Machines (PRAM) and parallel computers based on Very Large-Scale Integration (VLSI) chip etc., all having a different multiprocessor architecture and infrastructure characteristic. In summary, since different multiprocessor architectures give raise to different formation of latency times in their computation infrastructures, the development of programming models only cannot increase the efficiency of the computer, nor can the development of hardware alone do it.

As mentioned above, code parallelization can also be performed automatically by a compiler system, if a computer with a multi-core processor or a parallel computer is available as target platform. Such automatic parallelization, also called auto parallelization, denotes the converting of sequential code into multithreaded and/or vectorized code in order to use multiple processors simultaneously e.g. in a shared-memory multiprocessor (SMP) machine. With prior art systems, fully automatic parallelization of sequential programs is technically challenging because it requires complex program analysis and because the best approach can depend upon parameter values that are not known at compilation time. The programming control structures on which auto parallelization by compiler systems places the most focus are loops, because, typically, most of the execution time of a program takes place inside some form of loop. There are two main approaches to parallelization of loops: pipelined multi-threading and cyclic multi-threading. The compiler structure for automatic parallelization normally comprises a parser, an analyzer, a scheduler and a code generator. The parser of a compiler system covers the first processing stage where e.g. a scanner reads the input source files to identify all static and extern usages. Each line in the file will be checked against pre-defined patterns to segregate into tokens. These tokens will be stored in a file which will be used later by the grammar engine. The grammar engine will check patterns of tokens that match with pre-defined rules to identify variables, loops, control statements, functions etc. in the code. In a second stage, the analyzer identifies sections of code that can be executed concurrently. The analyzer uses the static data information provided by the scanner-parser. The analyzer first detects all the totally independent functions and mark them as individual tasks. The analyzer then finds which tasks have dependencies. In the third stage, the scheduler will list all the tasks and their dependencies on each other in terms of execution and start times. The scheduler will produce the optimal schedule in terms of number of processors to be used or the total execution time for the application. In the fourth and final stage, the scheduler generates a list of all the tasks and the details of the cores on which they will execute along with the time that they will execute for. The code generator then inserts special constructs in the code that will be read during execution by the scheduler. These constructs will instruct the scheduler on which core a particular task will execute along with the start and end times.

If a cyclic multi-threading parallelizing compiler is used, the compiler tries to split up each loop so that each iteration of the loop can be executed on a separate processor concurrently. During auto parallelization, the compiler typically conducts two passes of automated assessment before actual parallelization in order to determine the following two fundamental preconditions for parallelization: (i) In a first pass, based on dependence analysis and alias analysis, is it safe to parallelize the loop?, and (ii) in a second pass, based on estimation (modeling) of the program workload and the capacity of the parallel system, is it worthwhile to parallelize it? The first pass of the compiler performs a data dependence analysis of the loop to determine whether each iteration of the loop can be executed independently of the others. Data dependence can sometimes be dealt with, but it may incur additional overhead in the form of message passing, synchronization of shared memory, or some other method of processor communication. The second pass attempts to justify the parallelization effort by comparing the theoretical execution time of the code after parallelization to the code's sequential execution time. It is important to understand, that code does not always benefit from parallel execution. The extra overhead that can be associated with using multiple processors can eat into the potential speedup of parallelized code.

If a pipelined multi-threading parallelizing compiler is used for auto parallelization, the compiler tries to break up the sequence of operations inside a loop into a series of code blocks, such that each code block can be executed on separate processors concurrently.

There are many parallel problems that have such relatively independent code blocks, in particular systems using pipes and filters. For example, when producing live broadcasting, many different tasks must be performed many times a second.

A pipelined multi-threading parallelizing compiler tries to assign each of these operations to a different processor, normally arranged in a systolic array, inserting the appropriate code to forward the output of one processor to the next processor. For example, in modern computer systems, one of the focuses lies on using the power of GPU's and multicore systems to compute such independent code blocks (or independent iterations of a loop) at runtime. The memory accessed (whether direct or indirect) can be then marked for different iterations of a loop and can be compared for dependency detection. Using this information, the iterations are grouped into levels such that iterations belonging to the same level are independent of each other, and can be executed in parallel.

In the prior art, many compiler for automatic parallelization exist. However, most modern prior art compilers for automatic parallelization depend on the use of Fortran as high level language, i.e. are applicable to Fortran programs only, because Fortran makes stronger guarantees about aliasing than languages such as C. Typical examples of such prior art compilers are (i) Paradigm compiler, (ii) Polaris compiler, (iii) Rice Fortran D compiler, (iv) SUIF compiler, And (v) Vienna Fortran compiler. Further disadvantages of the automatic parallelization by the prior art compilers lies in the fact, that a high optimization of the code is often difficult to achieve due to the fact, that (a) dependence analysis is hard for code that uses indirect addressing, pointers, recursion, or indirect function calls because it is difficult to detect such dependencies at compile time; (b) loops have often an unknown number of iterations; (c) accesses to global resources are difficult to coordinate in terms of memory allocation, I/O, and shared variables; and (d) irregular algorithms that use input-dependent indirection interfere with compile-time analysis and optimization.

One important tasks of a compiler is to try to handle the latency times efficiently. Compiling is the transcription from human readable and so-called higher languages (such as C, python, java, etc.) to assembler/processor code, which then only consists of the available instructions on a given processor. As already discussed, modern applications with a large demand for data or computation have to be targeted for appropriate infrastructure and a lot of different latency times are introduced—and currently only parts of it can be solved by prior art compiler optimization techniques.

For every level of complexity (hardware components), the solutions have historically been developed and evolved, from compiler optimization techniques to multithread libraries for concurrent data structures to prevent race-conditions to vectorization of code, to GPU systems with corresponding programming languages (e.g. OpenCL (Open Computing Language) to frameworks such as "TensorFlow" to distribute computations by programmers, to big data algorithm such as the "MapReduce", where MapReduce is a programming technique and an associated implementation for processing and generating big data sets with a parallel, distributed algorithm on a cluster. In the field of high-performance computing, theoretical, mathematics-based techniques to split large matrices to special gridding techniques for finite difference or element methods were developed and defined. This includes protocols, e.g. in cluster infrastructures Message Passing Interface (MPI) supports the transfer of data to different processes over an infrastructure.

As discussed above, the list of prior art optimization techniques is long. But from a system theory perspective, the question is more or less always the same: How can the code (any code) interact most efficiently with the latency times in a complex hardware infrastructure? Compilers work well when using a single CPU. As soon as the hardware complexity increase a compiler cannot really render the code parallel. The parallelization becomes merely CPU approximated, e.g. by introducing microprocesses. Hardware industry for CPUs, GPUs and clusters thereof mainly focuses on their specific domains, developer and research focus on implementation techniques and framework development and have so far not moved into the field of a more generic (cross-industry) approach. Further, the authors Ruggiero, Martino; Guerri, Alessio; Bertozzi, Davide; Milano, Michaela; Benini, Luca, revealed in their pamphlet: A Fast and Accurate Technique for Mapping Parallel Applications on Stream-Oriented MPSoC Platforms with Communication Awareness, International Journal of Parallel Programming, Vol. 36, No. 1, February 8, the partitioning of algorithms that process data streams onto different processor cores. The authors model is a simple communication network with a simple, additive communication model between processor cores. This does not allow realistic conclusions about the actual communication load caused by partitioning on multiple cores.

Generally, known processor manufacturer are focused on their processors and related hardware components, whereas other developers, for example, the research group for High Performance Computing (HPC) are focused on the numerical methods and the use of libraries. Currently, there is no attempt to solve the question regarding an optimization of a compiler system from a system theoretical perspective by accessing the latency dynamics resulting from a given source code. The source code in the prior art merely consists of a series of statements which result in read and write direct for a given target infrastructure.

SUMMARY OF THE INVENTION

It is one object of the present invention to provide compiler system for multi-processor systems and multi-computer systems compiling program codes to machine codes with optimized latency of the processing units of the multi-processor systems, thereby efficiently managing multiple processors and data dependency for higher throughput, and not having the disadvantages of the prior art systems, as discussed above. In particular, it is an object of the present invention to provide a system and technique that can be used to achieve the highest performance in multi-processor machines through auto parallelization, thereby optimizing the exploitation of low-level parallelism (temporal and spatial) at the level of the processing of machine instructions. It is a further object of the invention to overcome disadvantages of prior art techniques overcoming their limitations of dealing with parallelization sections which are typically restricted to specific systems in mind like loop or particular section of code. The auto-parallelization system should be able to optimize identifying opportunities for parallelization as a critical step while generating multithreaded application.

According to the present invention, these objects are achieved, particularly, with the features of the independent claims. In addition, further advantageous embodiments can be derived from the dependent claims and the related descriptions.

According to the present invention, the above-mentioned objects for a compiler system for optimized compiling of a program code for execution by a parallel processing system having a plurality of processing units simultaneously processing data in the parallel processing system by executing the program code and corresponding method are achieved, particularly, in that the compiler system comprises means for translating a source programming language of a source machine code of the computer program into a machine code as target programming language generating the machine code as parallel processing code comprising a number of instructions executable by the plurality of processing units of the parallel processing system or controlling the operation of the plurality of processing units; in that the parallel processing system comprise memory units comprising at least main execution memory units comprising a plurality of memory banks for holding data of at least parts of the processing code, and transition buffer units comprising high speed memory for storing starting locations of the processing code and data segments at least comprising branch or jump instructions and/or used memory references and data values, wherein the main execution memory units provide a slower access time than the transition buffer units; in that the execution of the processing code by the parallel processing system comprises the occurrence of latency times, the latency times being given by idle time of a processing unit between transmitting data back to the parallel processing system after having processed a specific block of instructions of the processing code on the data by the processing unit and receiving data necessary for execution of a consecutive block of instructions of the processing code by said processing units; in that the compiler system comprises a parser module for translating the source programming language into a code with a flow of elementary instructions executable by the processing units, the elementary instructions selectable out of a processing-unit-specific set of elementary instructions and the elementary instructions comprising elementary arithmetic operations and/or logic operations and/or control operations and/or memory operations for the number of processing units; in that the parser module comprises means for partitioning the code of elementary instructions into computation block nodes, each computation block node consisting of a smallest possible segmentation of a non-further decomposable sequence of elementary instructions of the code processable by a single processing unit, the smallest possible segmentation of the elementary instructions being characterized by a sequence of elementary instructions framed by consecutive read and write instructions, said sequence being not further decomposable by smaller sequences of elementary instructions between consecutive read and write instructions, and the read and write instructions needed to receive data required for processing said sequence of elementary instructions by the processing unit and transmit back data after processing by the sequence; in that the compiler system comprises a matrix builder for generating numerical matrices out of computation chains portioned from the code depending on the latency times, the numerical matrices comprising computation and transfer matrices, wherein a computation chain is formed by one or more computation block nodes creating an ordered flow of computation block nodes, wherein each computation chain is executed by one processing units, in that the computation matrix contains in each row the computation chain of a processing unit with each column having the sequence of elementary instructions of a computation block node within the computation chain (34) of the row and the transfer matrix contains transfer properties associated with a data transfer from one to a consecutive computation block node; and in that the compiler system comprises an optimizer module using a numerical matrix optimization technique minimizing an aggregated occurring latency time integrating all occurring latency times by providing an optimized structure of computation chains being processed by the plurality of processing units, wherein by means of a code generator an optimized machine code is generated for the plurality of processing units with an optimized aggregated latency time. If matrices or tensors are used, the optimization by means of the optimizer module can e.g. be based on numerical matrix optimization technique (or more general numerical tensor optimization technique, respectively). Technically, the present optimization problem can be formulated by using tensors and/or matrices and obtain in this way matrix/tensor field optimization problems. For linear optimization, matrices and linear programming can e.g. be used by the optimizer module. For certain applications of the present invention, the concept of tensor can e.g. be technically instrumental. In optimization tensor technics are able to solve systems of nonlinear relations and equations and for unconstrained optimization using second derivatives. Tensor methods can be used as general purpose-methods intended especially for problems where the Jacobian matrix at the solution is singular or ill-conditioned. The tensor methods can also be used for linear optimization problems. An important feature of tensors is that their values do not change when they cause regular nonlinear coordinate transformations, and thus, this notion can technically be useful for the characterization of structural properties not depending on regular nonlinear coordinate transformations. Thus, the tensor optimization can also be applied within the framework of nonlinear optimization. However, it has to be noted, that one of the technical advantages of the present invention is, that all matrices, know up-to-now, are, in contrast to the prior art optimization techniques in the field of auto-parallelization of source code, linear for optimization, while the prior art systems mainly must rely on non-linear optimization. Optimization, herein, denotes the problem of finding a set of inputs to an objective function that results in a maximum or minimum function evaluation. For this technically challenging problem, for example, also various machine learning algorithms can be used with the optimizer module from fitting logistic regression models to training artificial neural networks. If the optimizer module is realized by realized machine learning structures, it can be formulated it usually can be provided by using continuous function optimization, where the input arguments to the function are real-valued numeric values, e.g. floating point values. The output from the function is also a real-valued evaluation of the input values. However, as an embodiment variant, also optimization functions can be used taking discrete variables, i.e. providing a combinatorial optimization problem. To technically select the best optimization structure, for example, one approach can be to group the selectable optimization structures based on the amount of information available about the target function that is being optimized that, in turn, can be used and harnessed by the optimization algorithm. It is clear, that the more information is available about the target function, the easier the function is to optimize by machine learning, for sure, dependent from the fact whether the available information can effectively be used in the optimization. Thus, one selection criterion can e.g. be related to the differentiable target function by the question, if the first derivative (gradient or slope) of the function can be calculated for a given candidate solution or not. This criterion partition the available machine learning structures into those that can make use of the calculated gradient information and those that do not, i.e. machine learning structures that use derivative information, and machine learning structures that do not use derivative information. For the application, where differential object functions can be used, it has to be noted, that herein, differentiable function denotes a function where the derivative can be generated for any given point in the input space. The derivative of a function for a value is the rate or amount of change in the function at that point, which is also referred as the slope. The first-order derivative is defined as the slope or rate of change of an objective function at a given point, where the derivative of the function with more than one input variable (e.g. multivariate inputs) is referred to as the gradient. Thus, the gradient can be defined as derivative of a multivariate continuous objective function. A derivative for a multivariate objective function is a vector, and each element in the vector can be called a partial derivative, or the rate of change for a given variable at the point assuming all other variables are held constant. Further, the partial derivative can be defined as element of a derivative of a multivariate objective function. Then, the derivative of the derivative of the objective function can be generated, that is the rate of change of the rate of change in the objective function. This is referred to as the second derivative. Thus, the second-order derivative can be defined as rate at which the derivative of the objective function changes. For the present case of a function that takes multiple input variables, this is a matrix and is referred to as the Hessian matrix, where the Hessian matrix is defined as second derivative of a function with two or more input variables. Simple differentiable functions can be optimized analytically using known calculus. However, the objective functions may not be solvable analytically. The used optimization can be significantly easier if the gradient of the objective function can be generated. Some machine learning structures that are able to use gradient information and may be used for the present application include: Bracketing algorithms, local descent algorithms first-order algorithms, and second-order algorithms.

The invention has, inter alia the advantage to provide and achieve a massive optimization based in the lowest possible code structure, reducing high programing language code to a few elementary instructions, which are, in respect to their data input and output points, not further reducible due to the limited set of machine instructions running on a CPU/microprocessor. The elementary instructions comprise, for example, e.g. (i) arithmetic operations: +, −, *, /→ in applied numerical applications, i.e. mathematical operations, such as integrating or differential analysis are reduced to these elementary instructions, (ii) logical operations: AND, OR, etc., (iii) variable and array declarations, (iv) compare operations: same, larger, smaller, etc., (v) code flow: jump, call, etc., (vi) if (condition) {codeA} else {codeB}, and (vii) loop (condition). The interactions between today's modern higher languages (e.g. python, C, java, etc.) and the limited resources of processor instructions can be analyzed and made accessible by creating a 'mapping' of read and write of 'data points' by their operations. In other words, by mapping the interactions of the read and write of the single instructions using an appropriate representation, which can, in addition, also be represented graphical, they can be made available for numerical optimization techniques, which leads to the ability to parallelize source code automatically resulting always with a runnable concurrent code. There are several approaches to access these interactions, but none that consequently maps the read and write pattern of a source code to the data introduced by the programmer's choice of variable definition and then goes on to extract the required sequential chains and introducing potential communication patterns, which makes "mapping" the code to a wide range of hardware infrastructure. This method discloses a new approach of "fitting" source code to a given hardware infrastructure over all levels (CPU, GPU, clusters).

The invention has further the advantage the disclosed method and system can solve known technical problems, such as resolving nested loops with arrays solving PDEs (Partial Differential Equations) with a new perspective or well-known problems occurring in optimizing steps of SOTA compilers. The method gives a new perspective on codes and this new scope is based on physical effects occurring in all classical computation infrastructures, resulting in a generic way to map computations to a given hardware structure and derive a concurrent representation of a code on a given hardware or an ideal hardware for a given code. This is based on the consequence keeping all dependencies of "reading" and "writing" of the introduced data nodes and building chains of instruction depending on these dependencies. The resulting computation block nodes and their flow graph gives back a well-formed base in matrices, which result in a generic way of getting back code applicable to different computational units (e.g. CPUs, GPUs, FPGAs, micro-controller, etc.). The method has a new perspective on ICT software and hardware interaction following the principles of system theory. This results in a method, which can bring novelty solutions in a wide range of fields, as:

(a) Adaptive hardware—FPGAs (Field Programmable Gate Array)/ACIDs (Atomicity, Consistency, Isolation, Durability): The invention decomposes code into chains with instructions, which obviously represent logic elements in Integral Circuits. As the method gives a generic form to optimize combination of computing and communicating, it can be used to optimize the group of instructions based on the same «bit-pattern»/«signal» and lead to new approaches e.g. to optimize the transfer, respectively automatically of software to FPGAs or close the gap from code to chip floor-planning.

(b) ML (Machine Learning)/AI (Artificial Intelligence): Machine Learning and Artificial Intelligence codes need a lot of resources, especially in training phases. The method can be used for example to (i) optimize already known codes, (ii) support code development, which adapt their complexity during runtime and therefore are hard to parallelize in advance (as the method always result in an optimized code), (iii) support upcoming, not on Neuronal Network based approaches (e.g. Genetic Algorithms, see e.g. Inside HPC Special Report, AI-HPC is Happening Now by R. Farber)

(c) HPC (High Performance Computing) applications: As the method can translate code from e.g. python to a C code with MPI support libraries it can close gaps existing e.g. in different research fields (HPC to AI development). Another application could be adaptive mesh refinement implementations, used in numerical model software packages for engineering applications, weather prediction models, etc., Or it can be used to combine models with different spatial and temporal resolutions (e.g. Computational Fluid Dynamic models and Agent Based models, etc.) and improve existing software packages in different fields, such as modelling and analytic software packages.

(d) Automated business processes: The invention can also be used in process management, the decision if a unit should work on a task or transmit it to another unit is a well-known problem. For this problem the method shows an approach.

(e) Cloud, desktop operation system, virtual machines, deployment in general: Having a generic approach available, which «reduces» a code on the elementary needed operation and possible concurrent options, supports a wide range of solutions in the interface between software and hardware. This interface occurs obviously especially for any form of operating systems, virtualization and/or deployment of software or more concrete e.g. for virtualization solutions for cloud infrastructures, operating systems (with multicore systems), virtual machines to support mixing of different operating systems, or similar examples.

(f) Heterogeneous platforms, (i) IoT and edge computing: Heterogeneous platforms dominating the given situation in different fields, such as IoT projects, autonomous driving, combined mobile and cloud applications and other forms of application running with and/or on a mixed hardware infrastructure. The method can adapt a code to decide how to optimal distribute data, computations and/or data communication on a platform. Furthermore, she can incorporate in the process of deploying/developing software for different properties of the hardware components of a given network of computing units and optimize a code to fulfil target properties, such as e.g. reducing latency for some parts of a software system.

(g) Embedded systems: Embedded systems have high requirements for e.g. power consumption or other specific adaption for a given code, such as only reduced instruction sets on some micro-processors or similar challenges. The method can support this mapping directly, as she can optimize for given physical properties and results therefore in a most efficient code representation for any given code.

(h) Self-optimizing algorithms: The invention allows a complete autonomous circle, meaning an algorithm can optimize itself on a given platform without any by-hand interaction. This enables new applications and fields, not known up till now.

BRIEF DESCRIPTION OF THE DRAWING

The present invention will be explained in more detail, by way of example, with reference to the drawings in which:

FIG. 6 shows a block diagram schematically illustrating the different scopes of the units "basic blocks" (or "block units" respectively) and "computation block nodes" as schematic examples. "Computation block nodes" as used in the present application differ essentially from those block units, used in SOTA (State-Of-The-Art) compilers.

FIG. 7 shows a block diagram schematically illustrating a simplified, but more realistic example, where the inventive method exploits the fact, that a logarithmic instruction (as an example on a modern CPU: FYL2X) needs much longer then a floating point addition and/or multiplication instruction (e.g. FADD, FMUL). The inventive method adds the statement 'x:=a+b' und 'y:=a*b' to two different computation block nodes (cbn), as both are based on the same information 'a', and 'b'. The 'log 2(x)' statement is appended to the 'x=a+b' as it uses the information 'x'. The information 'y' is getting transferred, so the information is available to both, independent computation-chains.

Figure 15:
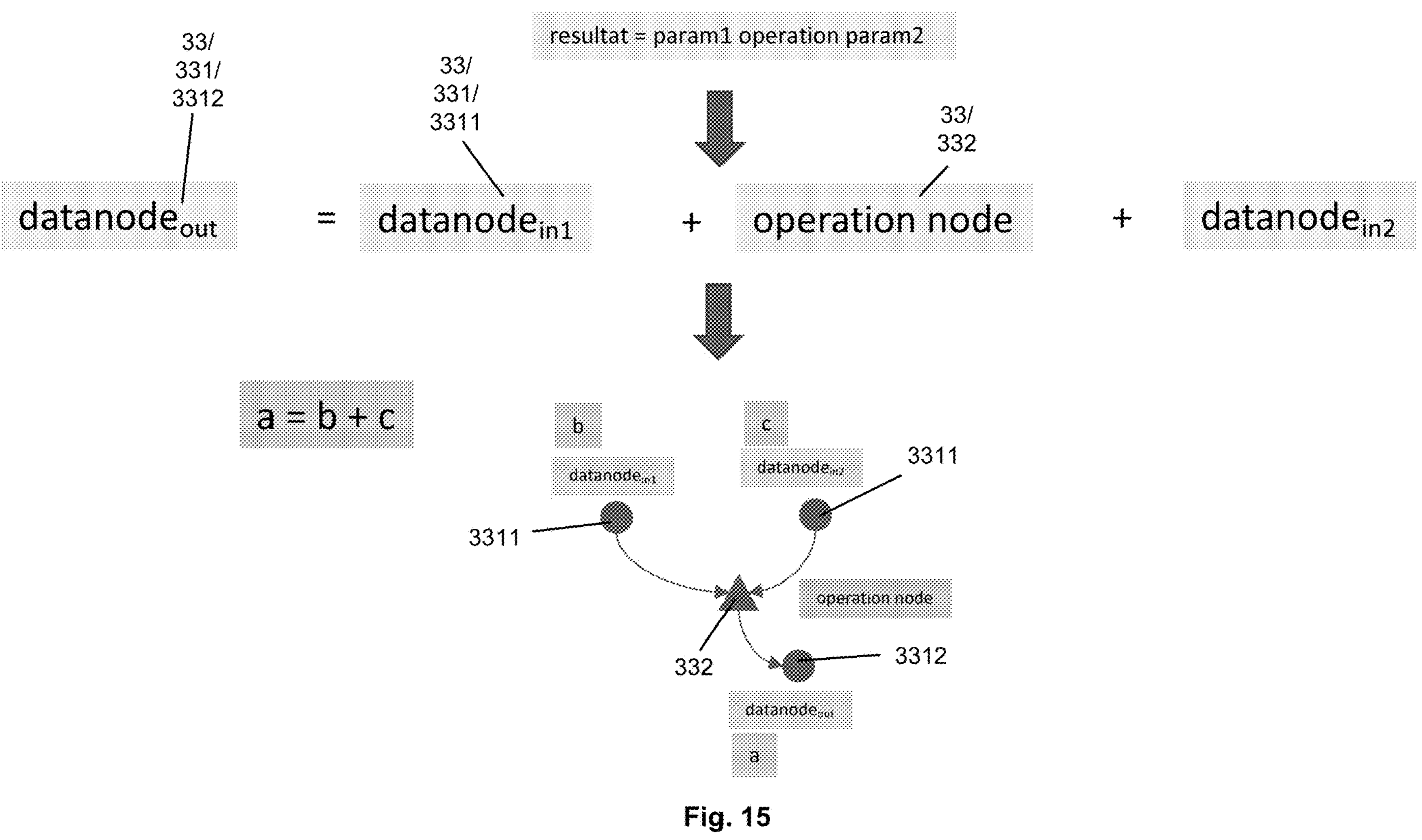
FIG. 15 shows a block diagram schematically illustrating exemplary basic elements for a tree structure and/or computation graph, respectively. The computations are reduced to one type of a statement: result=param1 operation param2. The numerical operands are +, −, *, /→ from a numerical point of view these are the only ones. Within source code 31 as high level language, values are assigned to variable in the form of variablename=value. This is a link to a "virtual" place (at variablename) to save a value. The source code 31 is normally sequential—this is how a programmer thinks. According to the invention, the code is differently approach seeing the code as $savelocation_1=savelocation_2$ operation $savelocation_3$. Based on this, basic graph or tree structure elements are here introduced with e.g. two input data nodes 33/331/3311 ($datanode_{in1}$ and $datanode_{in2}$), an operation node 332 and a output data node 33/332/3312 ($datanode_{out}$). They are connected with directed edges as seen in FIG. 15.

A node 33, as used herein, is a basic unit of a data structure, such as a sequence of linked processor instructions (computation block node 333/operation node 332) or tree data structure, as a data entry or data output structure ($datanode_{in}$/$datanode_{out}$). Nodes 33 contain data and also may link to other nodes 33. Links between the nodes 33 are often given in the graph of FIG. 15 by pointers (arrows).

FIG. 16 shows a block diagram schematically illustrating exemplary the basic elements of the source code. In the lexer and parser 11, operations from the higher language are reduced to the basic graph or tree structure elements. So it becomes possible to use: (i) arithmetic operations: +, −, *, /, (ii) logical expression like a condition: a==b or a>=b or similar leading to a true or false output, (iii) variable assignment name=value, (iv) flow control operations as (1) branch expression such as if (condition) {block1}, and (2) loop expression like loop (condition: incremental variable: maxvalue for incremental variable) {block1}. Here a similarity exists to the basic operation in assembler code, the instruction sets in a processor 21, which have normally 3 parameters. A statement and a basic graph element describe two read ($datanode_{in1}$ 3311 and $datanode_{in2}$ 3312) and one write access ($datanode_{out}$ 3312) after an operation (operation node 332). Multiple assignments to a variable name create versions of this variable and create different data nodes 331. As FIG. 17 shows, each version builds a new data node 331.

FIG. 17 shows how a new data node 331 is built.

FIG. 18 shows a block diagram schematically illustrating exemplary simple sequence of operations 332 in a tree structure or graph. Statement-by-statement, the sequence of the program code 31 can be added to the tree structure or graph. Complex expressions are reduced (by the need to reduce computation on a binary computing system to such a form) to a series of expression of type result=param1 operand param2. If an operation node 332 accesses a data node 331 to which another operation node 332 is writing, then the building a sequence is started by connecting these operation nodes 332 by a directed edge (next-edge). Write and reads are mapped by this method in the tree structure or graph for all data nodes 331 (see FIG. 19). As a rule to simplify the following steps, only 1 write is allowed to a data node 331 (this helps to simplify later operation to the graph). Otherwise a new operation 332 is introduced to model several writes to a data node 331.

Figure 19:
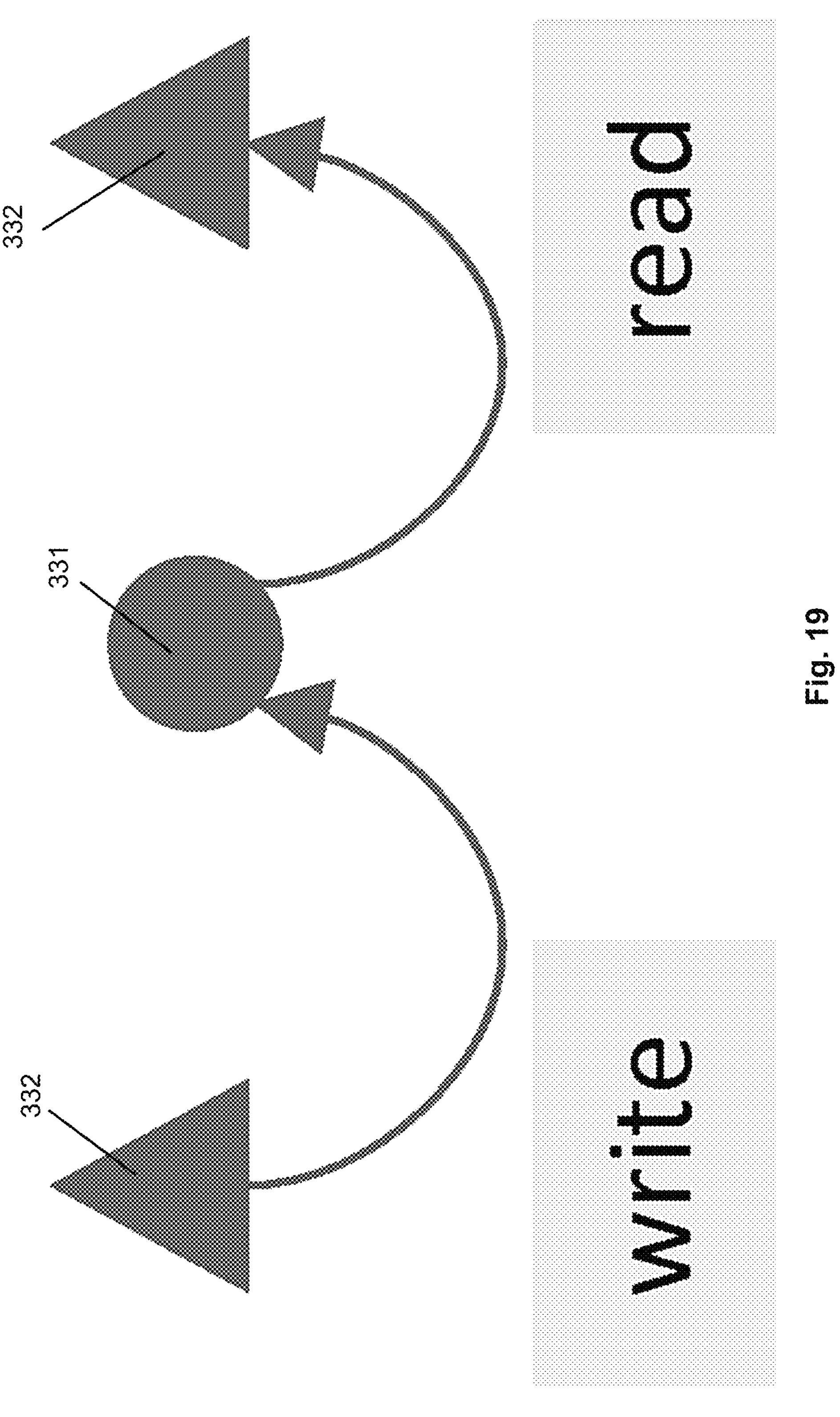

FIG. 19 shows how Write and reads are mapped in the tree structure or graph for all data nodes 331.

Figure 20:
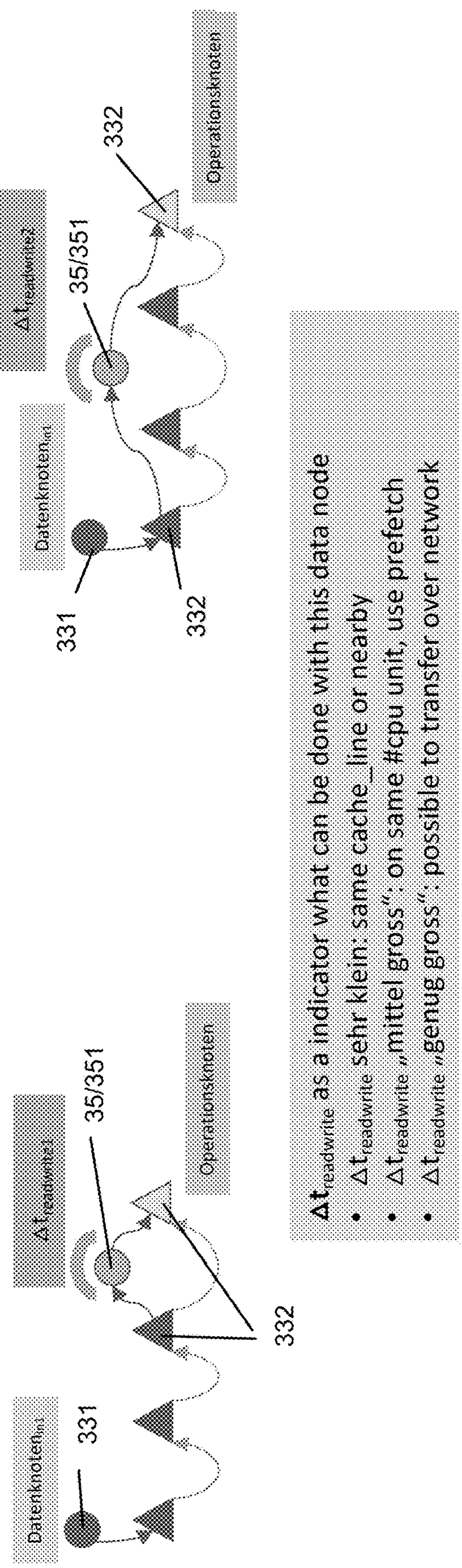

FIG. 20 shows a block diagram schematically illustrating exemplary how $\Delta t_{readwrite}$ 35/351 describes the time, which lies between a write access and a read access to a data node 331. With this interpretation, the latency time $\Delta t_{readwrite}$ 351 can be viewed as a number which expresses the time the data node 331 has to be transferred to another process in the multi-processing system 2. The interpretation of $\Delta t_{readwrite}$ 351 depends on the level of the hardware setup. It is the technical and physical based time between a write access 3311 (I/0 process, network card or similar) and the read access. $\Delta t_{readwrite}$ 351 is a unit given by the hardware infrastructure. $\Delta t_{readwrite}$ 351 can be composed of different Δt's: $\Delta t_{total}=\Delta t_1+\Delta t_2+\Delta t_3+\Delta t_n$ (e.g. L1-cache access-memory access). For a 1-dependency (operation node read from 1 dependent $datanode_{in}$) $\Delta t_{readwrite}$ 351 is given, respectively must be very short. It is to be noted, that other problems come up, if there are 2-dependencies, which is discussed below.

FIG. 21 shows a block diagram schematically illustrating exemplary the dependencies for basic tree structure elements and graph elements, respectively. As a variant, it makes it easier if the rule is set, that only one operation node 332 writes to one data node 331. Then there exist different, but finite situations to add a new operation node 332 in a sequence: (i) 0-dependency: placement: independent, (ii) 1-dependency: placement: after the dependent operation node 332; (iii) 2-dependency: —unclear→$\Delta t_{readwrite}$ 351 for both data node 331 (in1 3311 and in2 3312) are dependent of the history of their previous operation nodes 332; —At this point, to find $\Delta t_{readwrite}$ 351, the history of all preceding $\Delta t_{readwrite}$ 351 of datanode$_{in}$ 3311 and datanode$_{in2}$ 3311 must be known. This history of $\Delta t_{readwrite}$ 351 has to be placed in contrast to a $\Delta t_{latency}$ 352, which is the time which is needed to distribute an information or data point to another location through the system 2.

Figure 22:
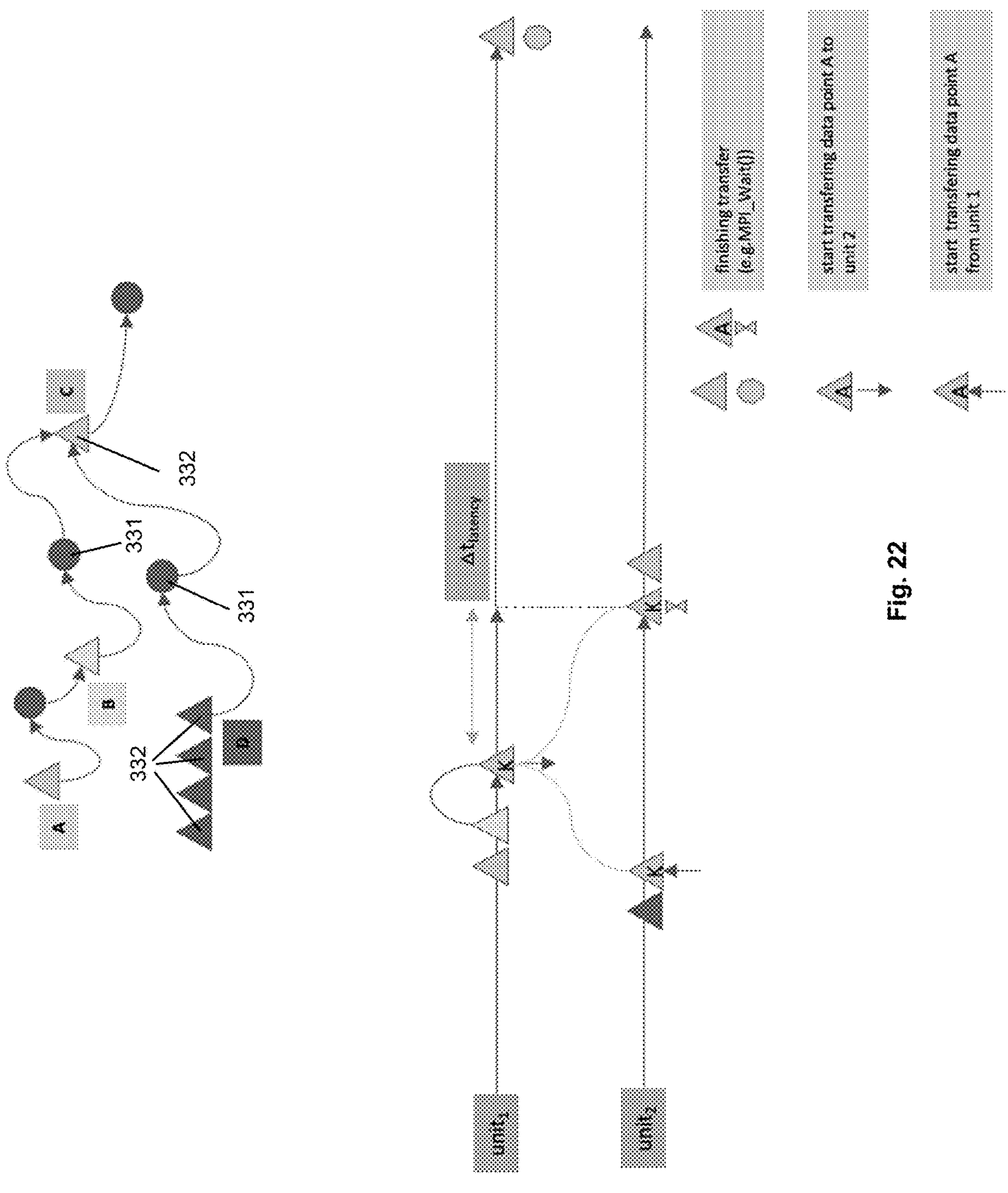

FIG. 22 shows a block diagram schematically illustrating exemplary how data/information can be considered, e.g. it is possible to transfer data from one process to another, or in case of threading, e.g. it is possible to prevent same time writing. Moving data can be seen, for example, as elementary operations (operations K) and a transfer would be $\Delta t_{latency}$ 35 long. It is important to note that the interpretation of $\Delta t_{latency}$ 35 is strongly dependent on the hardware system and can be seen as the time to transfer data/information through the system. Further, during this time operation nodes not affected by the transfer can be computed, if the systems allows this, e.g. in the case of a Direct Memory Access (DMA) network transfer. Or in case of a multithreaded system 2 (where two or more processes have access to the same data, but race conditions are critical) this $\Delta t_{latency}$ 35 can be seen as a block time, where one process reads/writes the corresponding data and no other is allowed. A transmission (see FIG. 23) can be seen to transfer information or data through the system 2 from a source to a target location. A transmission is not yet a clearly defined pattern (e.g. send and receive) and not given if it is needed in the final code, respectively is not vanished. This only can be done after optimization to the corresponding platform/hardware infrastructure.

FIG. 23 shows a block diagram schematically illustrating exemplary computation block nodes 332/CB1, CB2, . . . , CBx. Computation block nodes 333 can be introduced as follows: (i) computation block nodes 333 consist of connected operation nodes 332, (ii) operation nodes 332 are composed in one chain 34, (iii) computation block nodes 333 can be connected to next computation block nodes 333 or to control flow nodes 334, e.g. branch nodes 3341, (iv) $\Delta t_{computation}$ 352 is the time to compute all operation nodes 332 (representing instructions) in a computation block node 333, (v) it has a minimum length: $\Delta t_{latency}$ 35. During this time, it is possible to transfer data in the computation infrastructure, and (vii) for describing a communication, the transmission is introduced consisting of: (a) source: location in computation block node 333 (start, end), computation block node 333 id, operation node id, datanode$_{in}$/datanode$_{in2}$ 3311 or output data node 3312, (b) target: location in computation block node 333 (start, end), computation block node 333 id, operation node 332 id, datanode$_{in1}$/datanode$_{in2}$ 3311 or output data node 3312. Transmission must not be explicitly sending and receiving information→computation block nodes 333 can start sending and/or receiving data information at the beginning and end of the block 333 (before and after all operation nodes 332 are computed)→this models would typically be applied in explicit non-blocking sending and receiving communication methods (e.g. Message Passing Interface (MPI)), where it can be possible to send and receive independently of computations (e.g. by Direct Memory Access (DMA) network cards). But block sending and receive work in the same way by explicitly introducing operation nodes with a send and receive operation (and then have own $\Delta t_{readwrite}$ 351). If no communication is allowed, e.g. in a multithread approach (threads sharing same data, but time dependency only can be guaranteed by lock-mechanisms), the send and write can be interpreted as lock set and release and the $\Delta t_{latency}$ 351 has to be interpreted accordingly.

Figure 24:
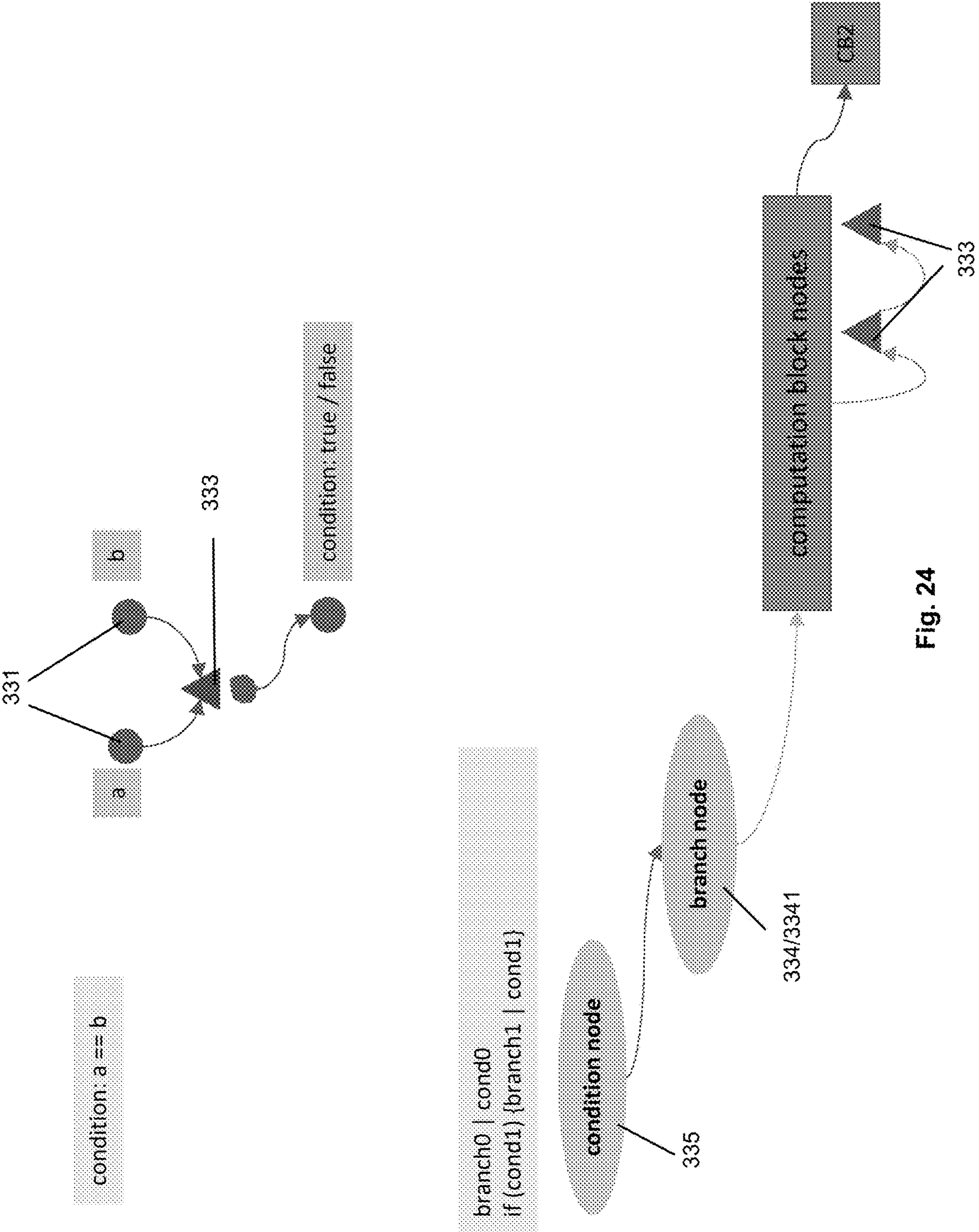

FIG. 24 shows a block diagram schematically illustrating exemplary the handling of program flow control elements in a tree structure or graph. The condition nodes 335 are realized based on that (i) each condition in an if condition or loop condition creates a new "level", e.g. cond:0→cond:1, (ii) each condition knows how many levels between the own level and the base level of a program (condition 0) are given (e.g. by cond:0→cond:1→cond:2 which means 2 condition were computed to come to this location in code), and (iii) conditions nodes 335 are connected to branch nodes 334/3341 with same condition by a directed edge. Further the branch nodes 3341 are introduced: (i) each condition has at least one branch node 3341, (ii) each branch node 3341 is connected to computation block nodes 333 belonging to this branch (code in section of if clause). The condition results from an operation node 332 with a (logical) expression with "conditional" result such as true or false. The introduction of conditions is one way to make it possible to decide to which computation block node a new operation can be assigned in the "earliest" way (the computation block node must be in the group of the same condition level but can be in another branch node). It has to remark here, that branch nodes do not correspond with a block in a branch in the definition of "basic blocks".

Figure 25:
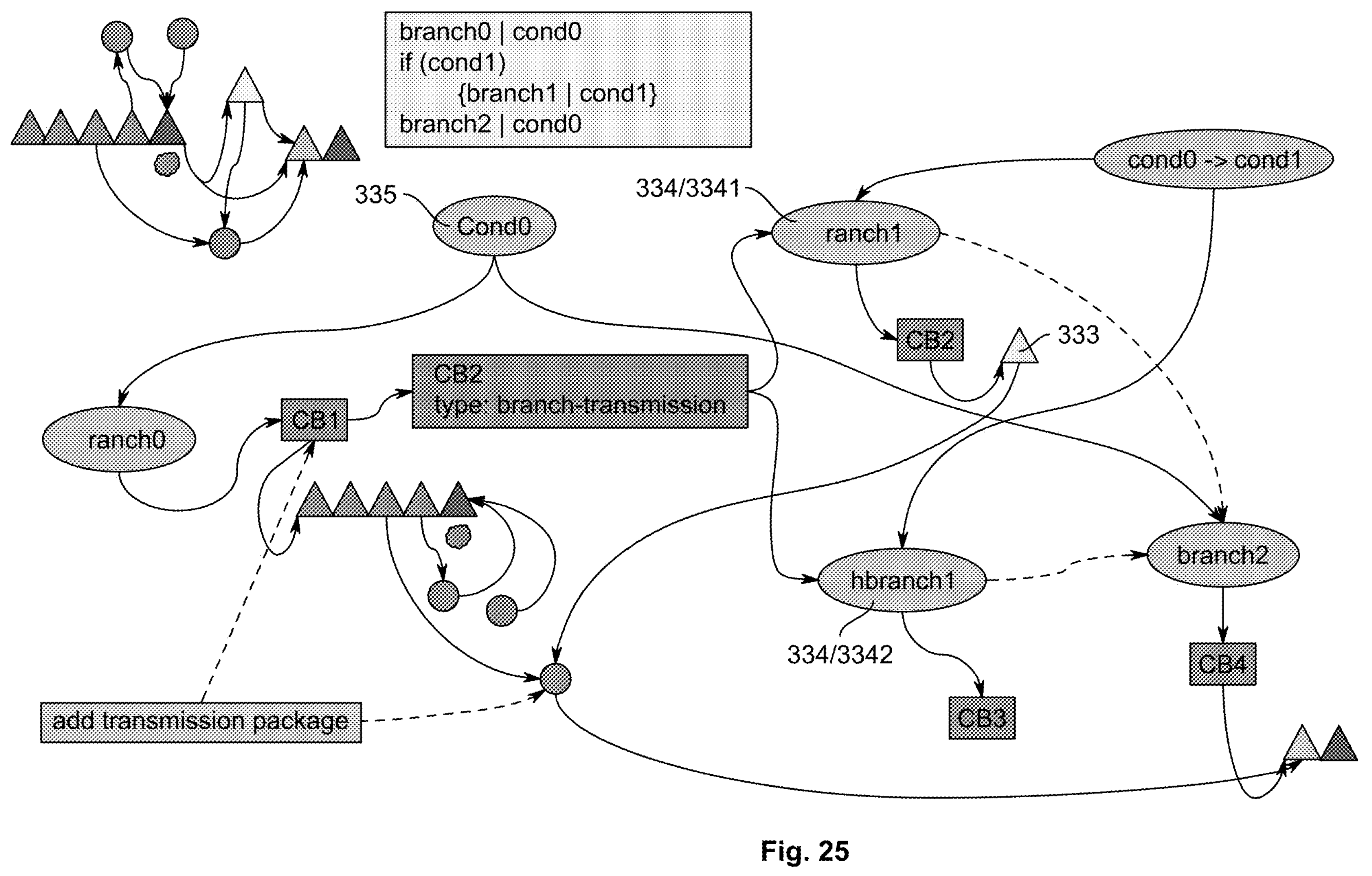

FIG. 25 shows a block diagram schematically illustrating exemplary the handling of "if statements". If-statement leads to branching of the code under one condition (if (condition) {codeA}). As the result of the logical condition expression needed to be transferred in the system→add a following, empty computation block node 333 after the computation block node 333 of the operation node 332 with the logical command in it→this is the time needed to transfer the result of the comparison (meaning the condition) to other processes→it can be used to compute other things—this computation block node 333 can be marked as a branch-transmission type (CB2). After this, CB2 333 two directed edges are added to a new branch node with new computation block nodes for code in the branch1 and a so called hidden branch node (see below) which will be used if condition is not fulfilled (but it is NOT the else clause, however, it can be the else clause). The result of the condition expression has to be transferred to the following branches→a transmission package is added to the end of CB1. Edges from branch node and hidden branch node 3342 can be set only after parsing all the statements in the branch code section, so after the closing-statement for the if condition (see below).

Figure 26:
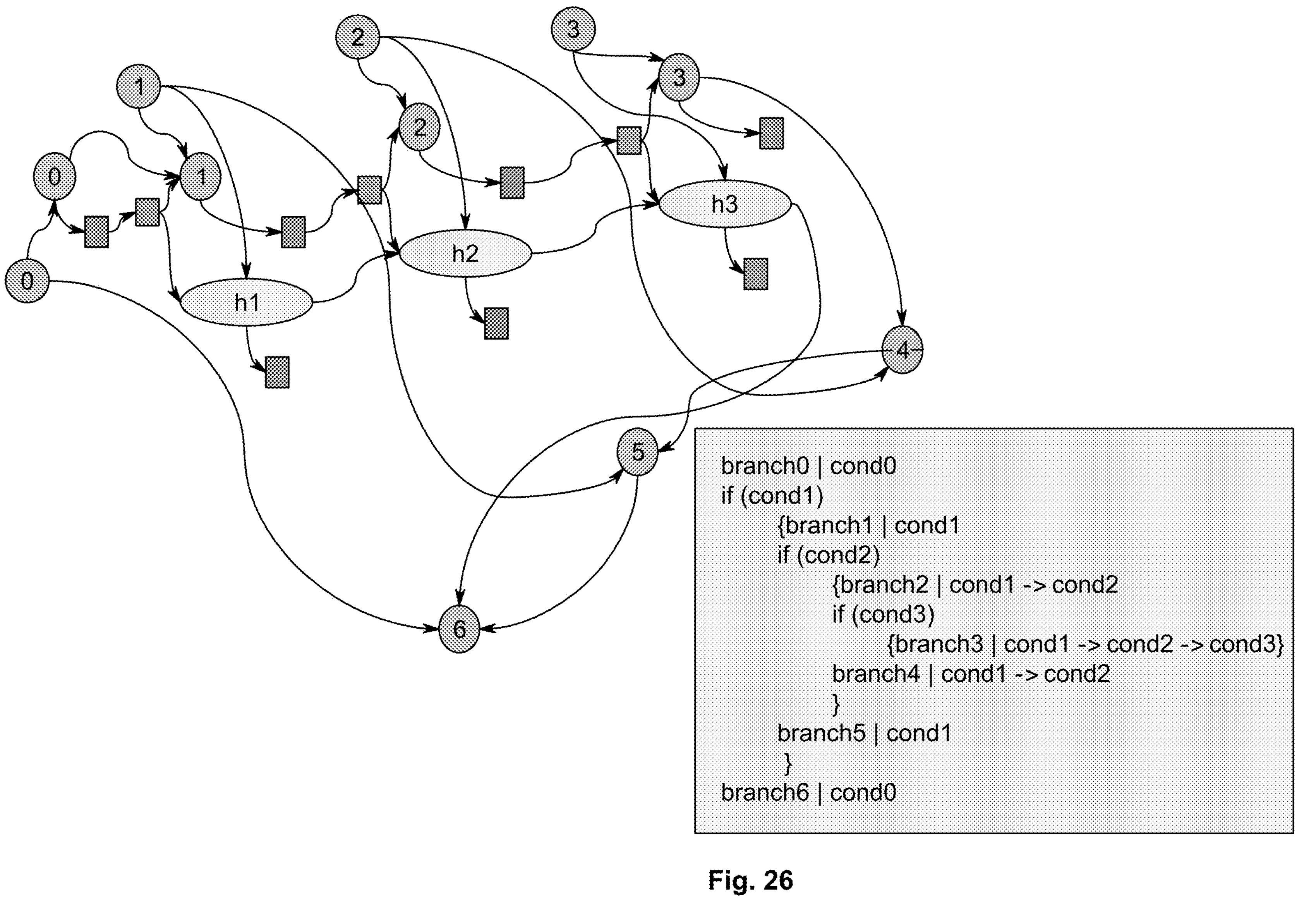

FIG. 26 shows a block diagram schematically illustrating exemplary the handling of nested "if statements". As each statement in the code is added to the graph in the sequence it is read in, the control edge connection between branch nodes 3341 and following branch nodes 3341 can only be done after reaching the closing marks for an if statement→nested if statements. The correct condition node 335 with the correct branch node 3342 can be found by calculating the last condition level (this is decreased with a closing if statement) and by traversing the graph to the correct nodes 33.

Figure 27:
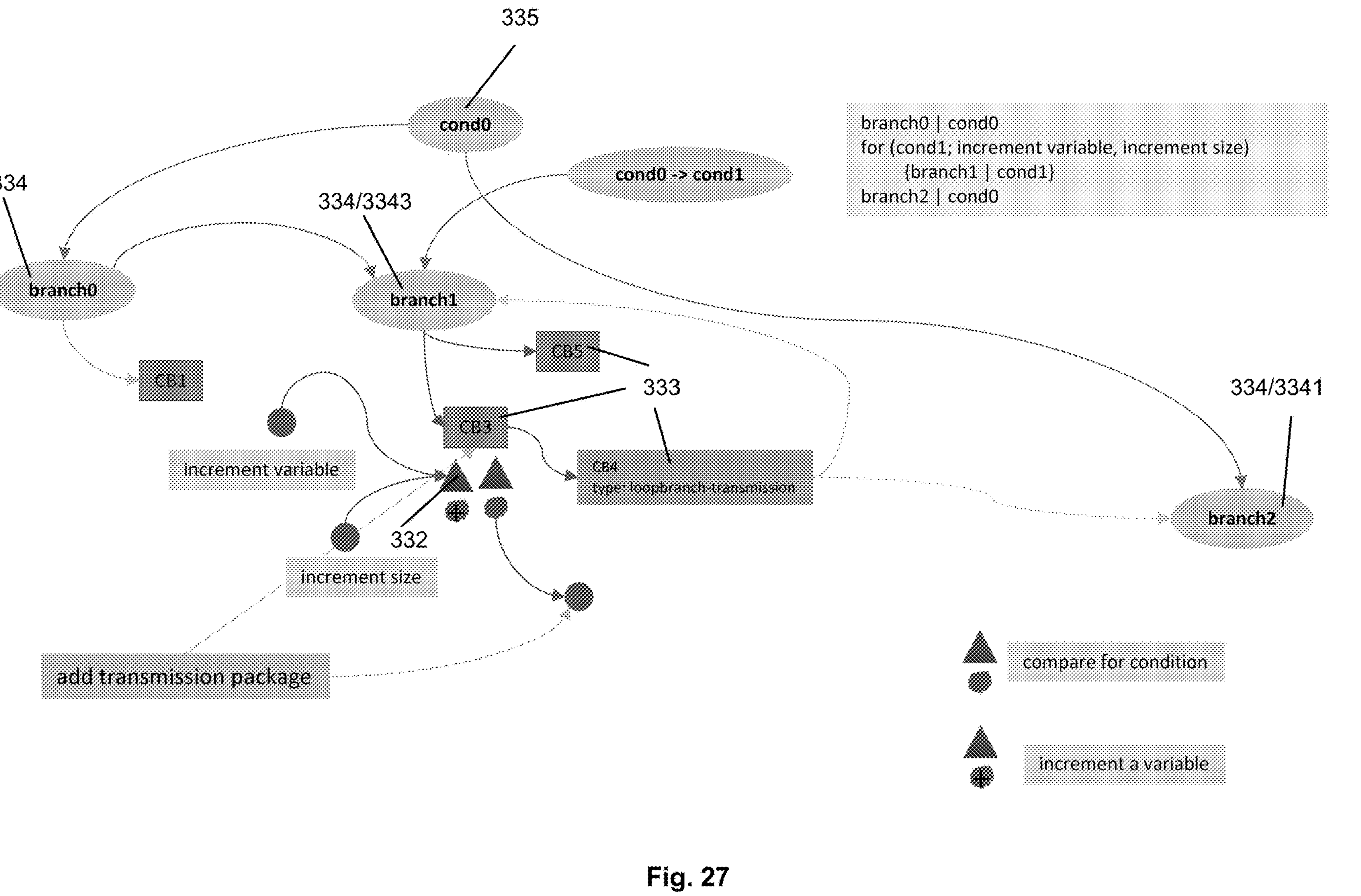

FIG. 27 shows a block diagram schematically illustrating exemplary the handling of "loop statements". It is to be noted, that according to the branching illustrated above for if statements, loop statements can be handled with some adaptions. Loop-statement leads to branching of the code as long as one condition is fulfilled, in this example by incrementing a variable till a certain value is reached (loop (condition, i, 2) {codeA}). This is the same as for if-statement→add CB4 333 for transmission with type loopbranch-transmission. An increment operation node 332 is added to the variable defined in the expression. The result of the condition expression has to be transferred to the following branches→a transmission package is added to the end of CB3 333. Edges from computation block node 333 with type transmission and the branch node 3341 (branch2) after the loop branch node 3343 (branch1) can be set only after the closing-statement for the loop statement (see below) was reached.

Figure 28:
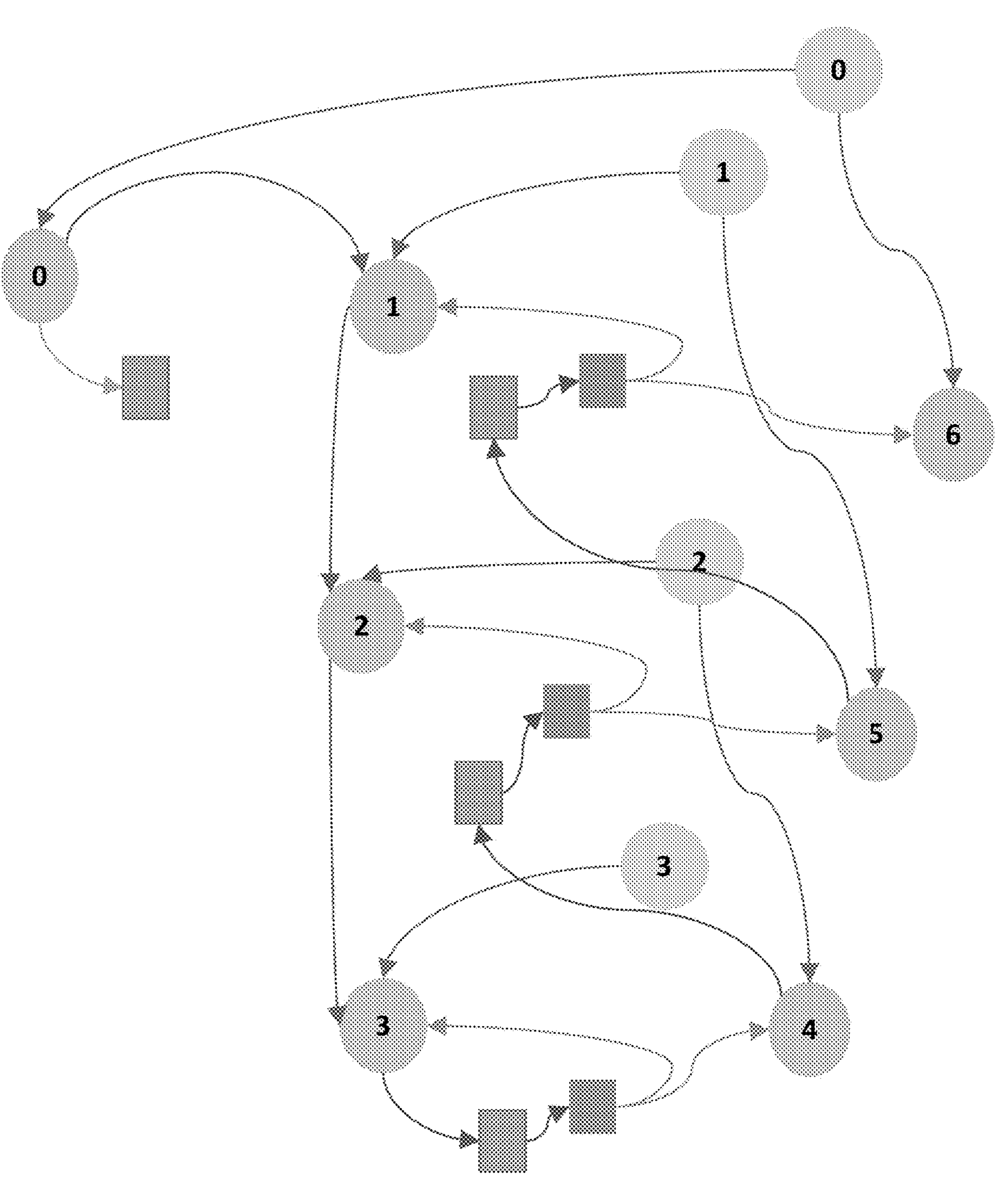

FIG. 28 shows a block diagram schematically illustrating exemplary the handling of nested loop statements. As each statement in the code is added to the graph in the sequence it is read in, the control edge connection between computation block node 333 with type loopbranch-transmission and following branch node 3341 can only be done, after reaching the closing marks for a loop statement→nested loop statements. This can be done by finding lower condition levels based on the last added statement and finding the correct loopbranchtransmission node 33. The computation block node 333 with the compare and increment operation nodes 332, as well as the computation block node 333 of type loopbranch-transmission has to be reconnected to the branch node 3341 of the earlier loop. As well as the branch nodes connection after the loop have to be updated

```
branch0 | cond0
for (i=0; cond1; i++)
  {branch1 | cond1
  for (j=0; cond2; j++)
    {branch2 | cond1 -> cond2
    for (k=0; cond3; k++)
      {branch3 | cond1 -> cond2 -> cond3}
    branch4 | cond1 -> cond2
    }
  branch5 | cond1
  }
branch6 | cond0
```

In regard to variable assignment, assignments are also operation nodes, but for a=0 and a=b with only one data node (in1) instead of two (in1 and in2): (i) a=0 (→variablename=number): —0-dependency and 1-dependency can happen, (ii) a=b:–a copy operation node has to be added, as you explicitly copy the data from data node to another data node with correct version number, —has to be a 1-dependency, (iii) a redefinition of a variablename leads to a new version of the variable and a new data node 331. Further, array and pointer variables can be handled in a similar way.

Figure 29:
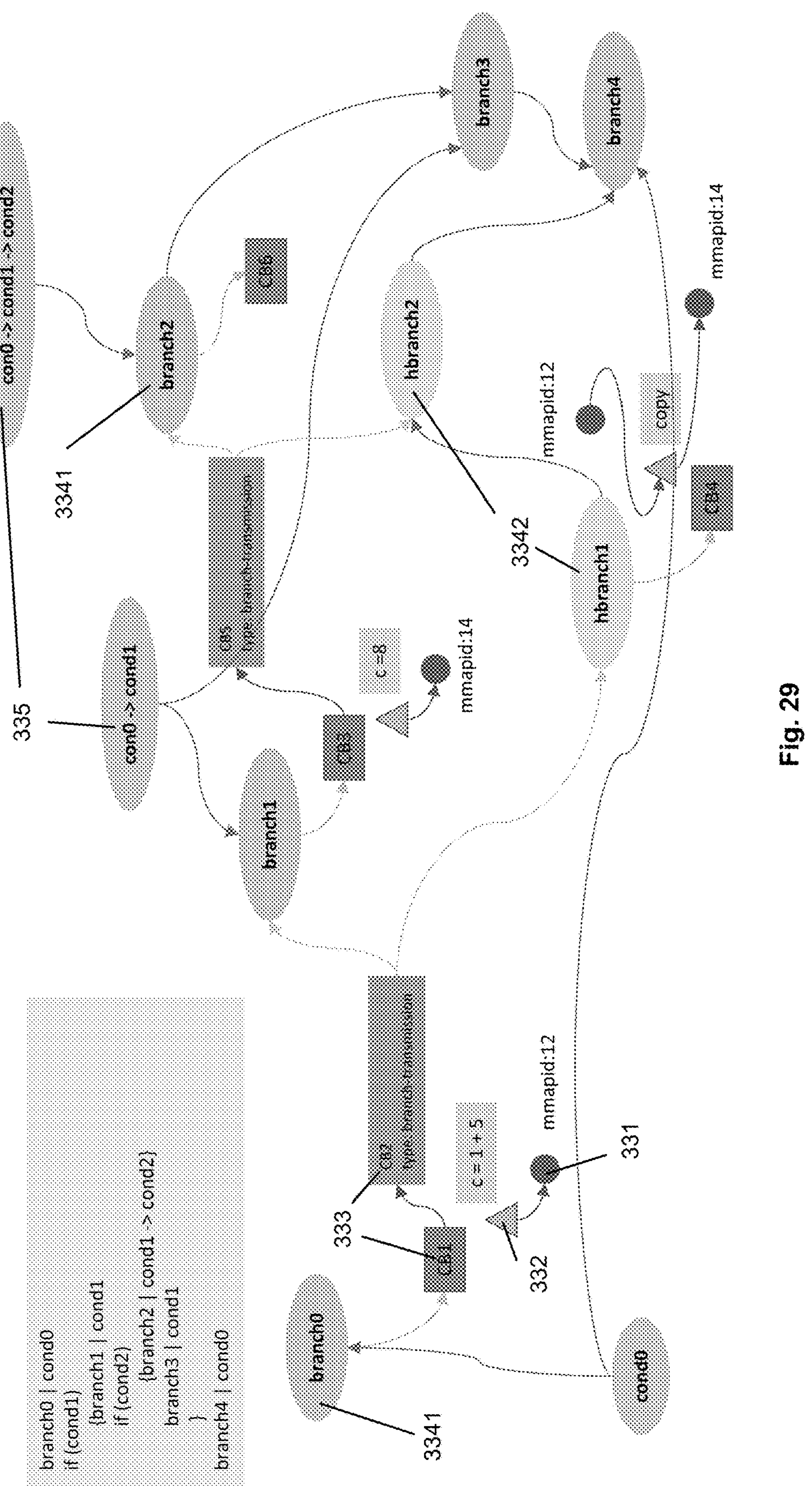
Figure 30:
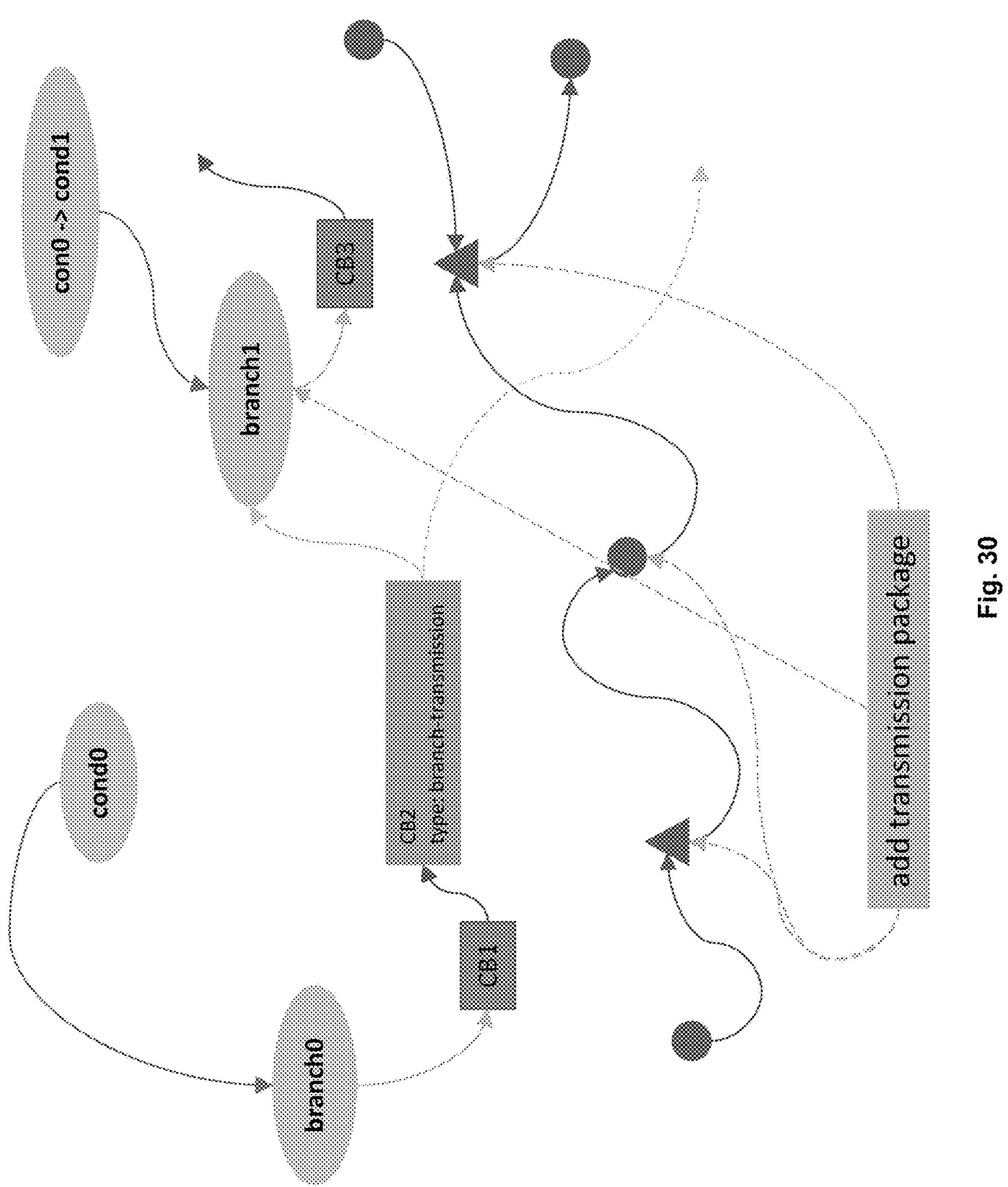

FIG. 29 shows a block diagram schematically illustrating exemplary the handling of branching and variable versions. As the compiler sees code with a clear data centric perspective, also not explicit change to data under condition has to be incorporated. In FIG. 30, c is computed in branch0 under condition cond0. c is redefined in branch1 under condition cond0→cond1. If compare function in CB1 is false→the program flow goes to hidden branch node 3342 hbranch1→copy the value from data node @ position mmapid: 12 (data node for c=1+5) to new location as if in CB3 would be true. This is important and the reason there is a hidden branch node, which is not (only) the else statement. The above must be done, as the programmer programs the data flow for the true condition, but not the false condition (is expected nothing happens), but in the data dependency graph this is not true, because during parsing the code this c=8 in the branch1 has done a new version to the variable. Further, it has to be done for every variable assignment under a condition.

FIG. 30 shows a block diagram schematically illustrating exemplary the handling of branching and transmissions. In the situation, when a e.g. 1-dependency or a 2-dependency occurs under different conditions→different branch nodes→means as branch nodes indicating that a information transmission must have happened before this. The same is also in 2-dependency cases when the same condition, but different branch nodes. However, there are also other possibilities to solve this problem. It means it needs a data transfer to this new computation block node in the corresponding branch node. Thus, branch nodes could also be handled otherwise.

Figure 31:
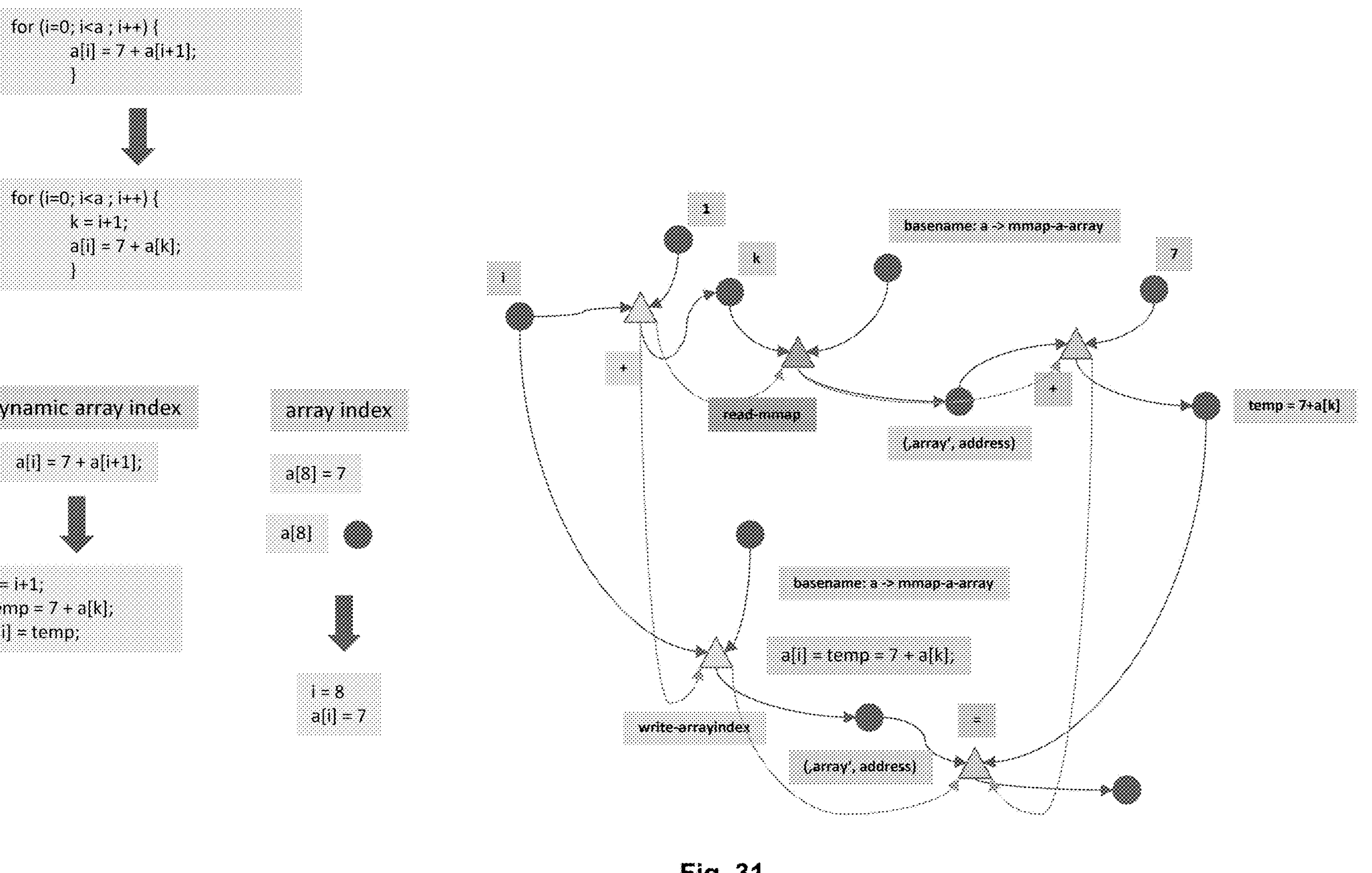

FIG. 31 shows a block diagram schematically illustrating exemplary the handling of arrays and dynamic arrays. Arrays can be viewed as basevariable name and an offset in a sequence of data with the same length (e.g. in C pointer variable and an offset). So it can be handled with a two-step operation: find address/location of base variable and get the offset and then go to offset found by the variable definition (type/length, e.g. u_int8<→u_int32). It is worth noting, that in this special case, the operation is, de facto, no really direct CPU-based elementary instruction since those are performed by the processor, itself, by first looking up in the L1-Ln caches, etc.

Figure 32:
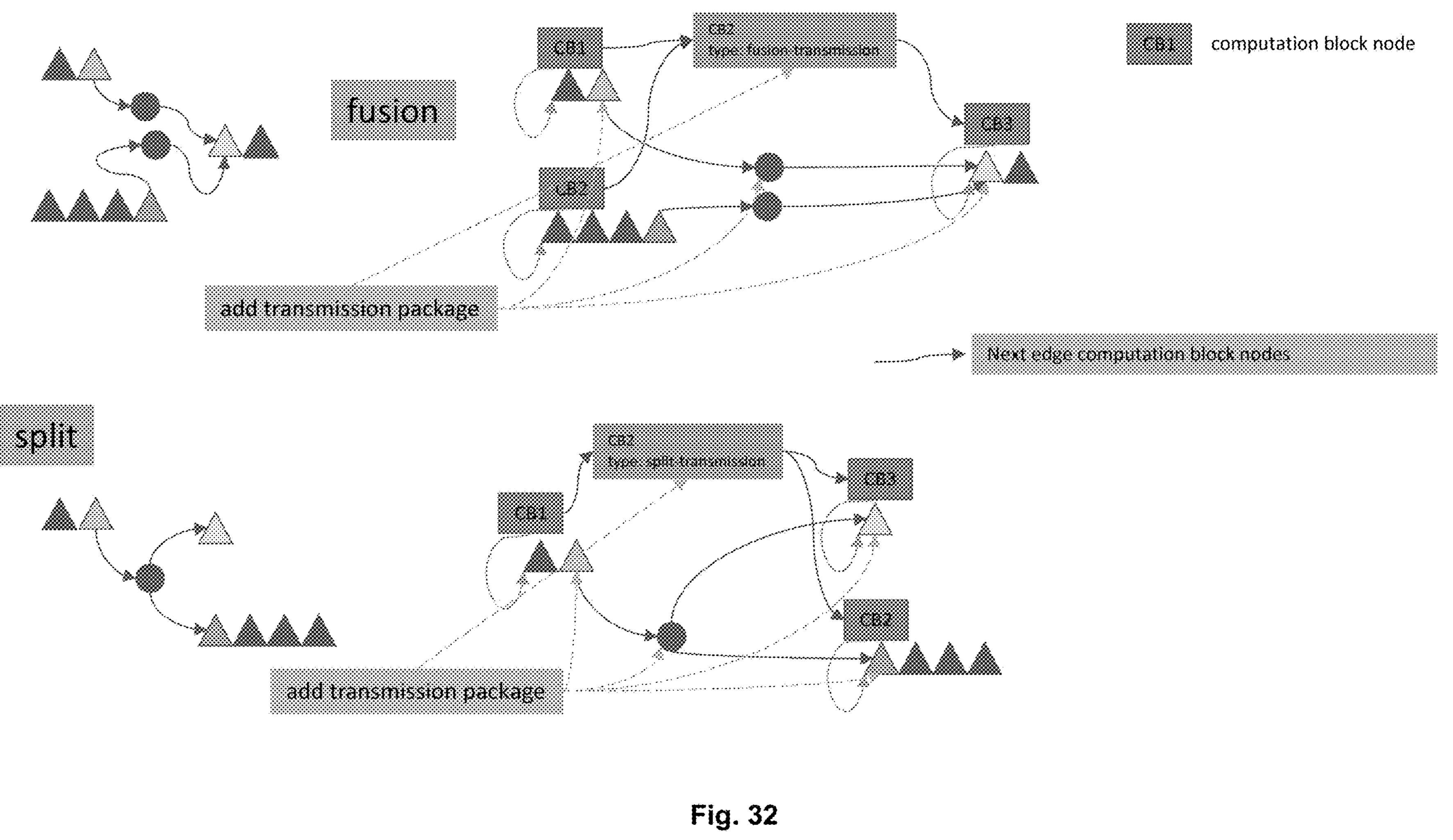

FIG. 32 shows a block diagram schematically illustrating exemplary split and fusion situations for computation block nodes 333. In case of a 2-dependency, there must be a fusion situation of two computation blocks 333. In case, when two operation nodes read from the same data node→this creates a split situation of two computation block nodes 333. For both cases by introducing a new computation block node 333 (e.g. fusion-transmission or split-transmission), to split or to (re)join two calculation chains 34 (chain of computation block nodes) is allowed by sending transferring data/information through the system. Transmission information are added to the—transmission typed computation block nodes newly created.

FIG. 33 shows a block diagram schematically illustrating exemplary how to close transmission gap in graph flow. This step can happen only after all statements from the source code were added to the graph. Then to the branch nodes is added, which are not connected by computation block nodes 333 of type-transmission an additional computation block nodes 333 of type b2b-transmission. This is needed to propagate the branch change through the system. At a later step these transmission blocks must be set to the latest block number (computation step), so the information of the branch change can be propagated through the system 2.

FIG. 34 shows a block diagram schematically illustrating exemplary the introduction of a time perspective to the tree structure or graph. From the connected operation nodes 332 and the flow controlled computation block nodes 333, the tree structure or graph can be seen as chains 34 of computation blocks 333 with $\Delta t_{computation}$ 352. In every computation block node, the operation nodes are grouped, so $\Delta t_{readwrite}$ 351 is "optimal" (in the sense of locality, so copy data is slower than computing data). These sequential chains in the computation block nodes should not be disrupted, because they represent the sequential part of the code. To parallel the code, the computation block nodes need to be balanced by the time to make both incoming chains of computation block nodes (and therefor chains of operations) balanced to each other→so in a fusion situation both incoming chains have to have the same runtime. Otherwise the overall computation stalls the time the other chain has to be computed. If in all fusion situations of a computation block nodes 333, the incoming chains (CB1 and CB2) have the same runtime and start timepoint, a most concurrent/optimized parallel code is achieved. In a split situation it is possible to start different chains at the same time and create therefore parallel computations. It has to be noted that a series of "+" and under some conditions "*" could happen in a computation block node and they could be again split to parallel computations. However, this is easy to detect during an optimization phase. Each computation block node needs $\Delta t_{compute}$ to calculate all operation nodes 332 in it. Now it is possible to try to balance out the $\Delta t_{compute}$ with the systems available $\Delta t_{latency}$ 35, because each computation block node 333 can be viewed as minimum $\Delta t_{latency}$ 35 long, as this was so introduced in the preceding steps. By assuming that every computation block node 333 has to be at least $\Delta t_{latency}$ 35 long, it is possible to transfer data in the system 2. Finite block numbers can be introduced for each computation block node. They represent the required sequence of the computation blocks 333 of the sequential chains 34 of operation nodes 332. This generates a distinguished and well-defined grouped graph, where every group of operations has a unique number and is according to these numbers transformable to bring them in matrices. These matrices then can be used to optimize/map using e.g. real world times to a given or ideal infrastructure.

Regarding to assign the block graph or tree structure to runtime numbers the numbering can be implemented, for example, as a recursive function parsing the graph of computation block nodes and their edges, branch node by branch node. In each branch node 3341, the computation block nodes 333 are started to be numbered. Then, it is stepped recursively through the computation block node chains 341 of the branch nodes 3341. After a branch node, the maximal block number is known given a computation block node in a branch node. This is used for the next branch node. The rules are computation block node 333 are stepped to computation block node 333. Is there only one or no previous computation block→set the block number to actual block number and increase the block number (for the next computation block node). Are there 2 preceding computation block nodes→this is a fusion situation→if this is the first visit to this node→append to a local list of block numbers. Otherwise if this is the second visit→use the highest block number (actual from the function call or the saved in the list of the node). Is there 1 following computation block node→call the function for the computation block node (recursive approach). Are there 2 following computation block nodes→split situation→call for both the computation block node numbering function in a recursive way. If there are none (so no next computation block nodes)→give back next branch nodes, if there are and finish the actual recursive call. By appropriately adjusting the block numbers in the branch nodes transmission, the call graph is numbered based on the computation block nodes connection to a form of a discrete time graph, where each computation block node has a finite number, which has to be calculated during the same time period.

Figure 35:
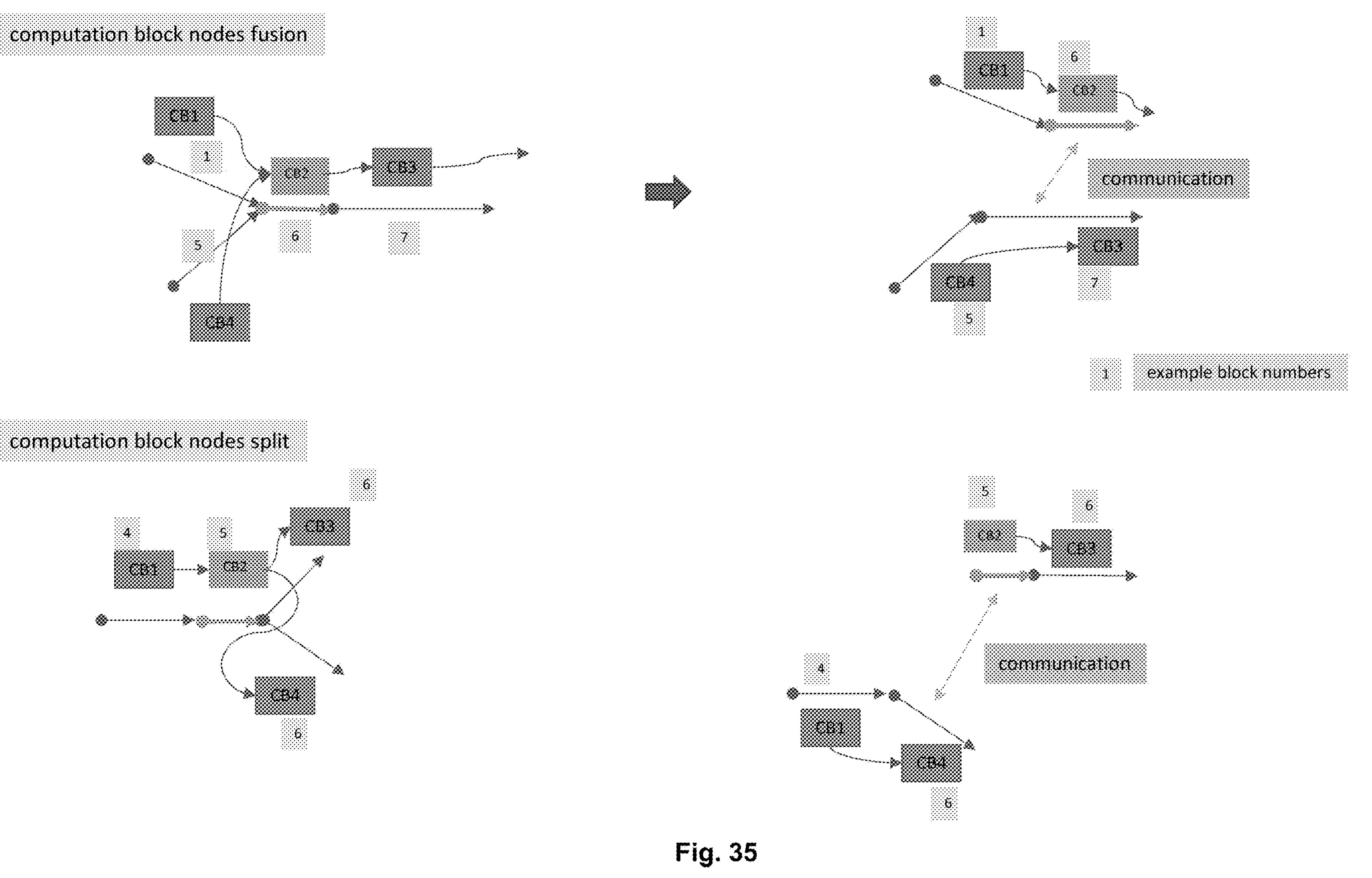

FIG. 35 shows a block diagram schematically illustrating exemplary splitting the graph to single/"transmission coupled" call chains. At this point, it is possible to split the call graph or tree structure into single chains 34 of computation block nodes 333, which leads to a single series of operation nodes with corresponding transmission information for each computation block node 333. Each computation block node has a unique number. The needed transmission/communications are saved in the computation block nodes.

Figure 36:
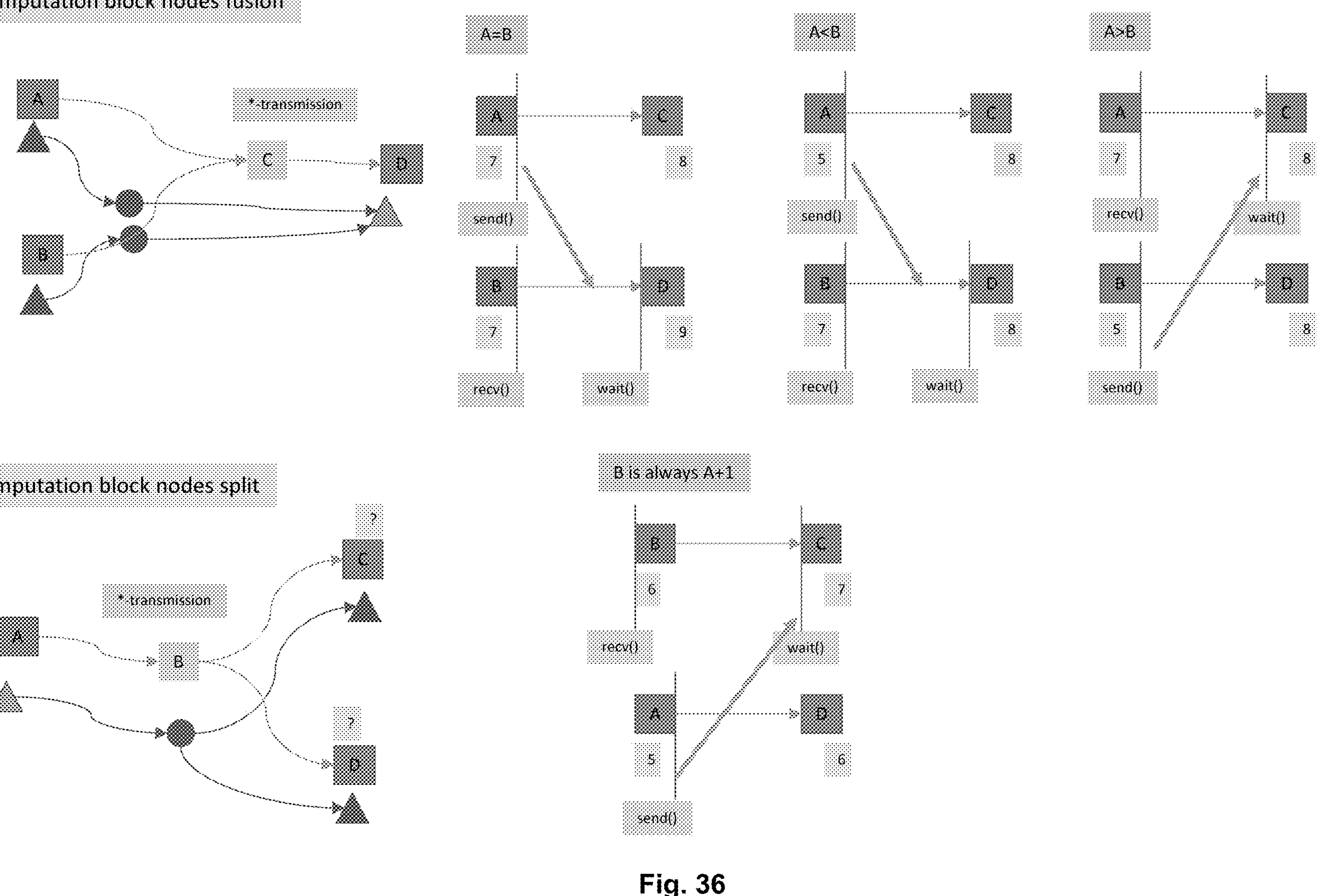

FIGS. 36 and 37 show block diagram schematically illustrating exemplary a possible process from transmission to directed communication. The direction of the communication can be dependent on the computation block node 333 numbers, as the examples of FIGS. 36 and 37 show. It has to be made sure that all-transmission computation block nodes are at the highest+1 block number (to ensure to have enough time to propagate information of program flow to all computation units/processes) in one branch node. Transfer the transmission packages with source and target information explicitly to send commands in the correct computation block nodes. The receive part can only be done after the optimization step. Signals transmission, such as a branch- or loop-transmission has to be implemented to all connected next computation block nodes 333 in the corresponding branch.

Figure 38:
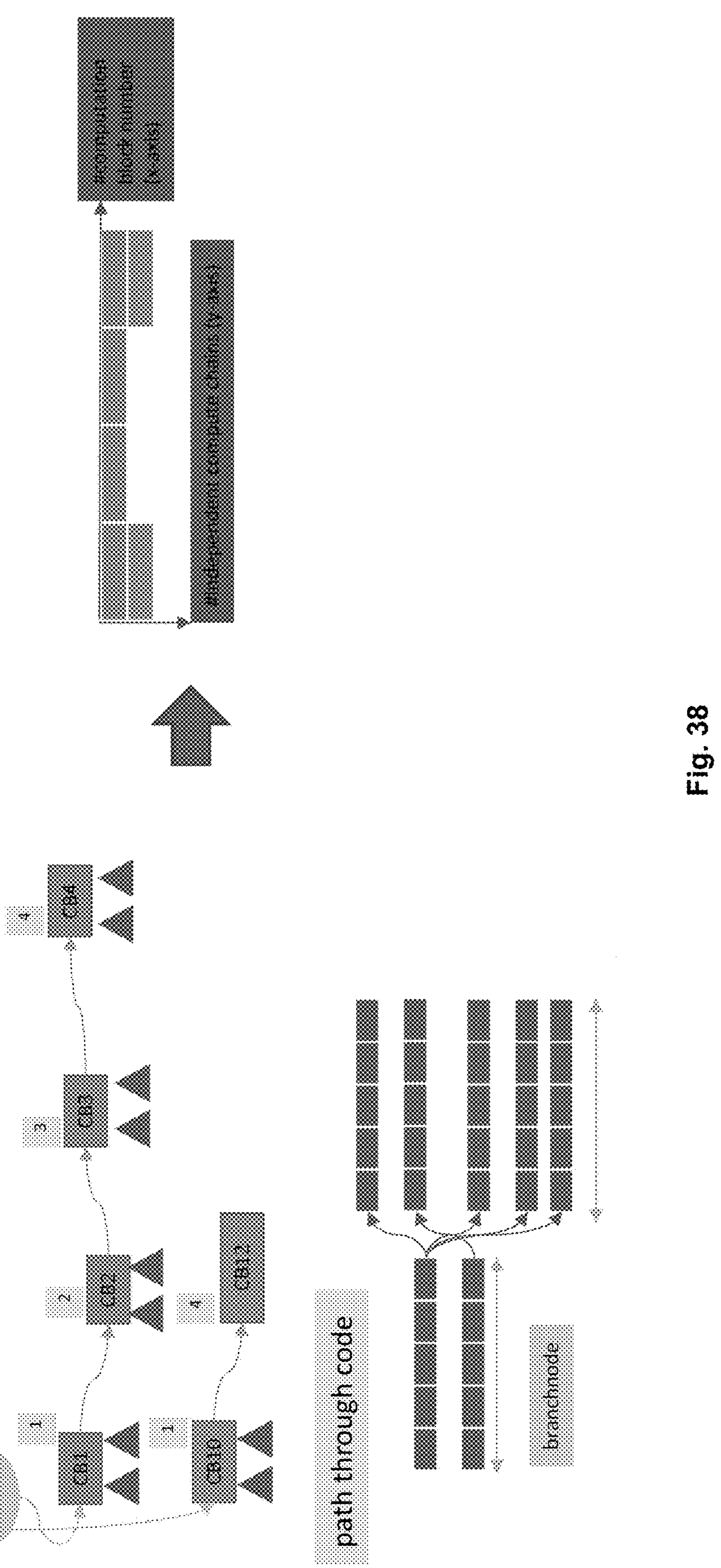

FIG. 38 shows a block diagram schematically illustrating exemplary the process from graph to matrices. At this point, the graph consists of branch nodes with single chains 34 of computation block nodes 333. Each computation block node 333 knows to which other computation block node 333 what information (data and or signal) has to be transferred. Each computation block node 333 has a discrete number, which represents the order each block has to be computed over the time of the program. So the graph can be interpreted as matrices where each cell is a computation block node, each row a single unit and each column the discrete block number (order number) and each cell (computation block node) knows what for information has to be send to other computation block nodes 333 (cell entries). Each cell knows which operations (chain of operation nodes) has to be calculated during their block number and in which order-they are independent and have to be in the correct order→which have a clear nearest write and read connection. Each operation node knows the correct global data which is needed to read (in1 and in2) and write (out). The matrices now can be optimized, e.g. numerically, to the target hardware infrastructure (CPU, CPU with explicit network transfer e.g. by MPI, GPU (memory transfer then vectorized operations), etc.)

FIG. 39 shows a block diagram schematically illustrating exemplary program paths and matrices. z-axis dimension is a code perspective for each path through the code (each condition change introduces a different path through the code). The 3rd dimension (or z-dimension) is a condition switch meaning each set of a transfer and a computation matrix is one way through the code under 1 condition. In this perspective, each path through the code could be represented by two matrices with row for the independent chains and columns (x- and y-axis) for the block numbers. Branching evolves by switching to the corresponding z-dimension set of matrices (path through code) and each process node needs to know all possible chains 34 for itself. In this description each condition change is captured by one set of a computation and a transfer matrix, but we could see matrices also a tensor and then e.g. a computation and a transfer tensor can embrace in their rows the independent operations, respectively corresponding transfers and in each column a discrete computing step and in their 3rd dimension different conditions. Or all could be packed in one tensor combining computations and transfers for each block number and unit and condition, etc.

Regarding optimization, the now applicable automatic optimization techniques are numerous: combine rows to reduce parallelity, move single operation chains to the earliest point (send commands in the cells are like barriers), reduce communication by best combination of rows, etc. The compiler system 1 can be used to get an estimation for runtime of a cell entry, or ways like by Agne Fog of the technical university of Denmark can be used to extract CPU and cache interactions, or use tables from the manufacturer of the CPUs, or compile it with openCL, etc. There is a wide range of optimization techniques to map the matrices to a target infrastructure in the technical fielders. For example in the perspective with one tensor for the computations and one for the transfers, different parallel code versions can be retrieved by combining the same rows in each tensor and therefore generate new combinations of "computations and transfers" per block number. This would lead to reduce the number of parallel/concurrent units. By combining rows it is possible to reducing or group transfers (in a final code communications) and the computations sum up. Operation nodes in a block can be move to a previous block in case there is no send( ) or read( ) at the beginning of the block. Each cell knows the amount of data (memory or similar) it needs. The different given $\Delta t_{latency}$ 35 on the target platform can be used to make a decision on which sequential part (cell entry in computation matrix) has to be computed at which hardware unit. The communication type in the infrastructure can be implemented as needed, from asynchrony or non-blocking to blocking explicitly send and receive commands in a MPI framework, to prevent race conditions by ensuring correct barriers are set and released, to bulk copy transfer in GPU infrastructure, etc. The choice of the optimization technique can, thus, easily be done by choosing an appropriate prior art optimization technique, e.g. by use of a SOTA compiler for each code (computations and transfers) per unit. The used optimization techniques will introduce a much wider perspective to get a more "perfectly parallel" code than others (perfect in the mean of a linear dependency of speedup vs. #processes with a slope of 1). So it is possible to numerically optimize the matrices to a new parallelized and optimized/concurrent code for the target hardware. This can be done automatically and therefor it is a big step compared with other methods. As this is done by software, software now can parallel its own code, which is new and leads to new possibilities, for e.g. adaptive models in Machine Learning (ML) or Artificial Intelligence (AI) applications, meshes in Computational Fluid Dynamics (CFD) calculations or particle sources in vortex methods, or combining different model methods with different spatial and time resolution (Finite Volume Methods (FVM) with agent-based models and statistical models), etc.

Figure 40:
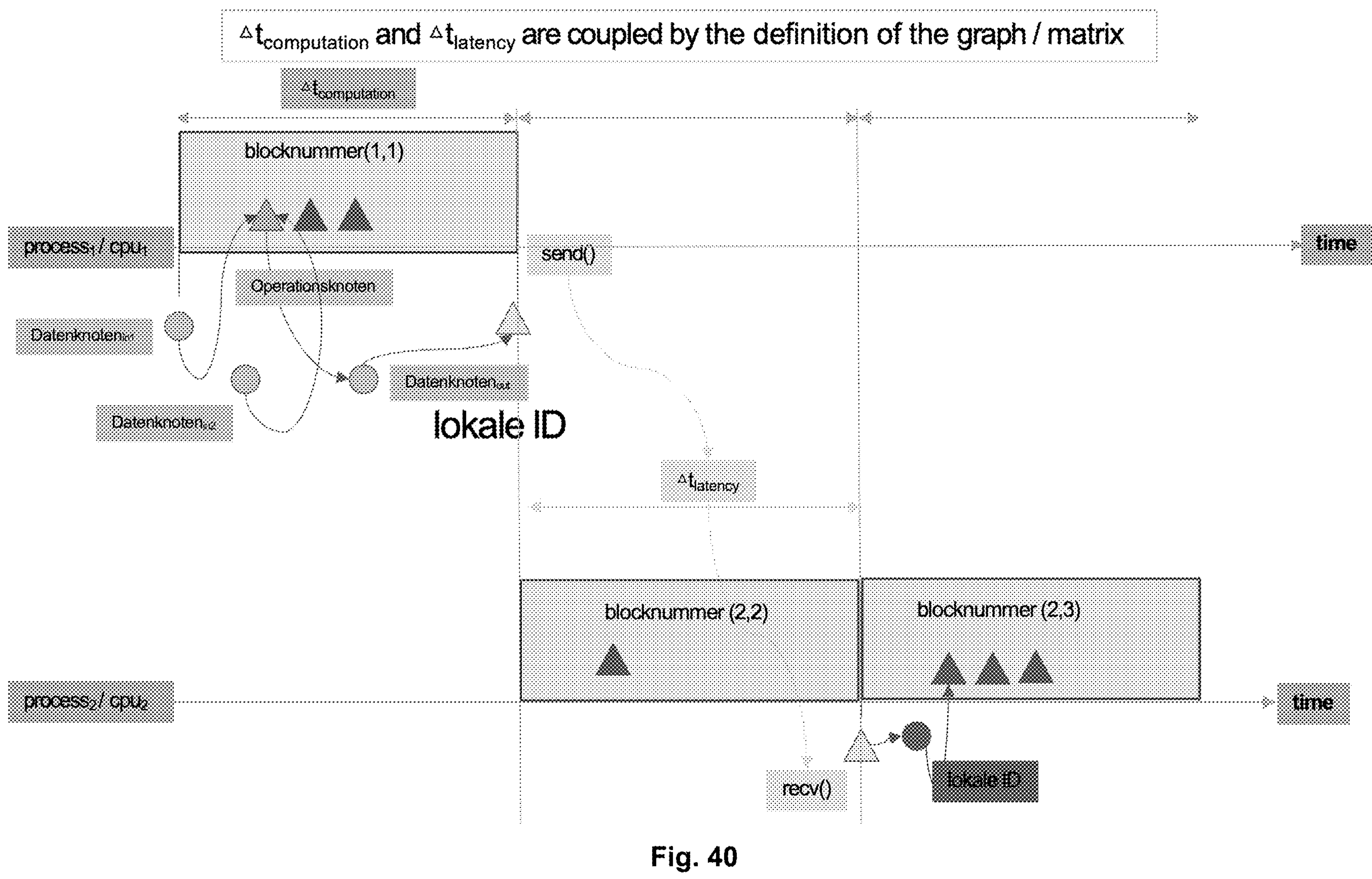

FIG. 40 shows a block diagram schematically illustrating exemplary code extraction. Code can be extracted from the matrices by a wide range of implementations: directly extract assembler code, write code files and compile them by state-of-the-art compilers, implement send and receive methods explicitly, e.g. for Message Passing Interface (MPI). The computation matrix cells have the code=statements in form of the operations, and each column has to be computed during the "same" time-intervals and each row is a separate process. The transfer matrix cells know what information has to be shared with what other cells.

Figure 41:
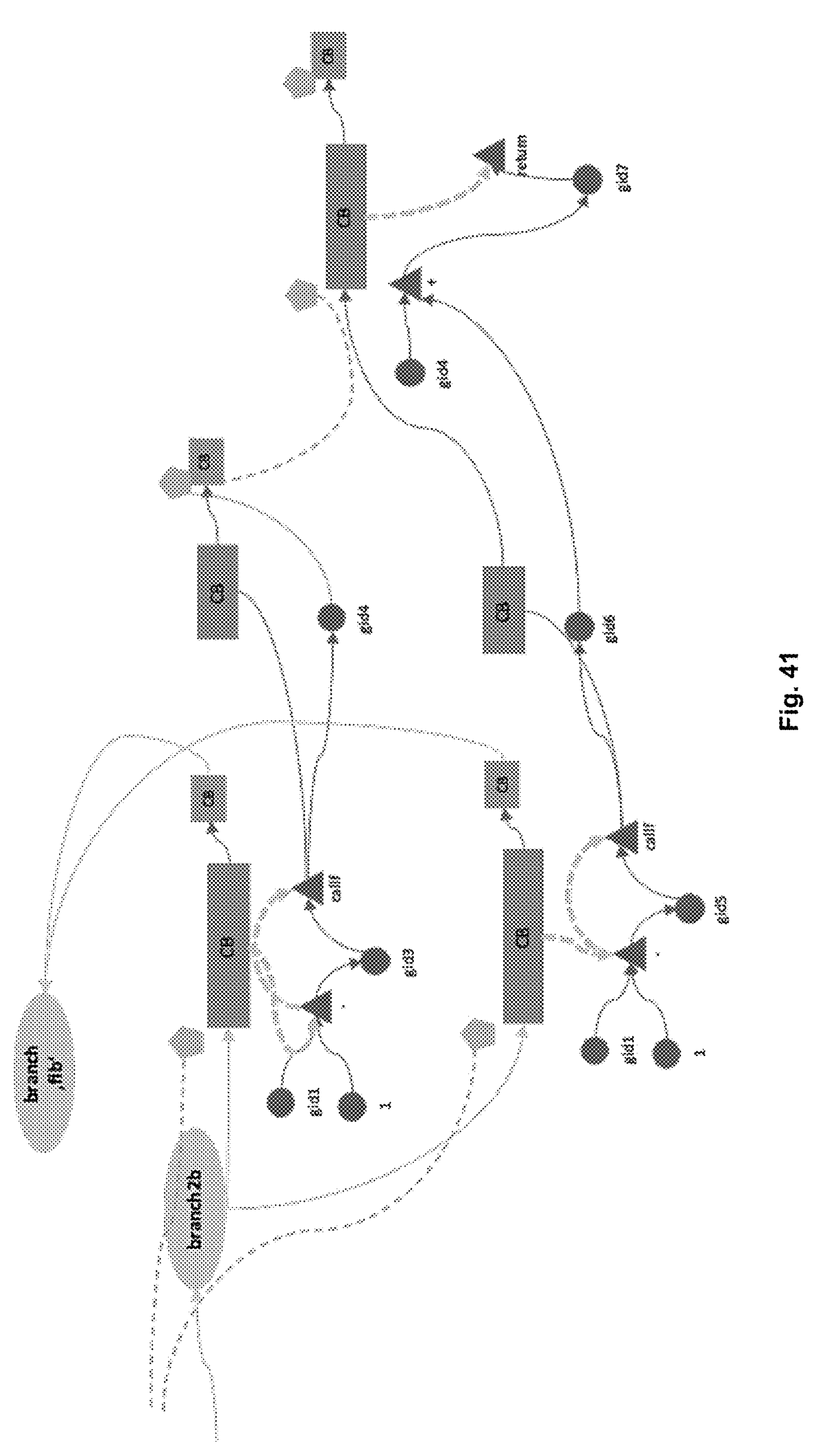

FIG. 41 shows a block diagram schematically illustrating the computation block nodes (CB) with the operation and corresponding data nodes (similar to the token in table 1) for a double recursive call of a function.

Figure 42:
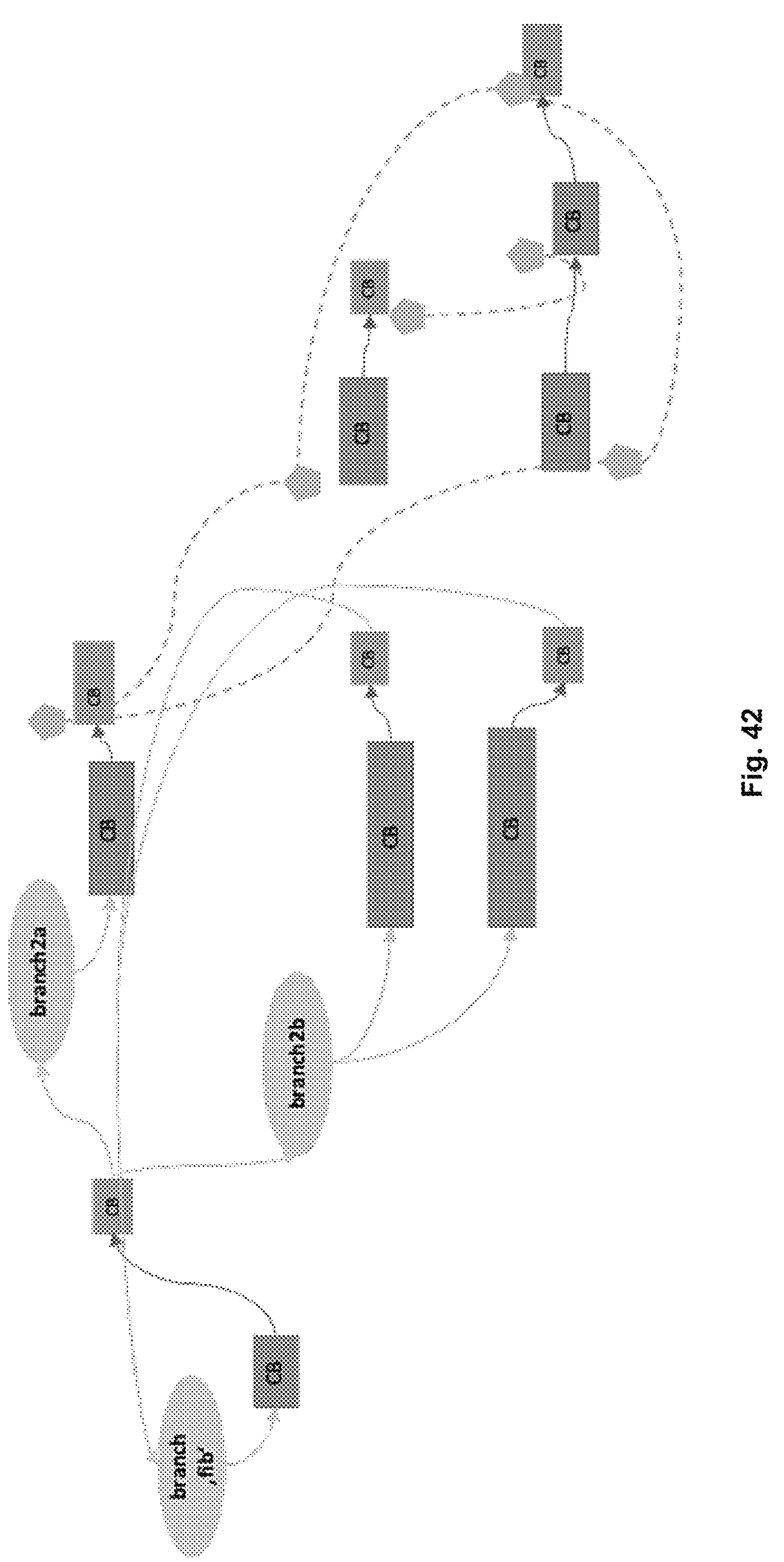

FIG. 42 shows a location in the computation block nodes (start- or end-point of the computation block nodes).

Figure 43:
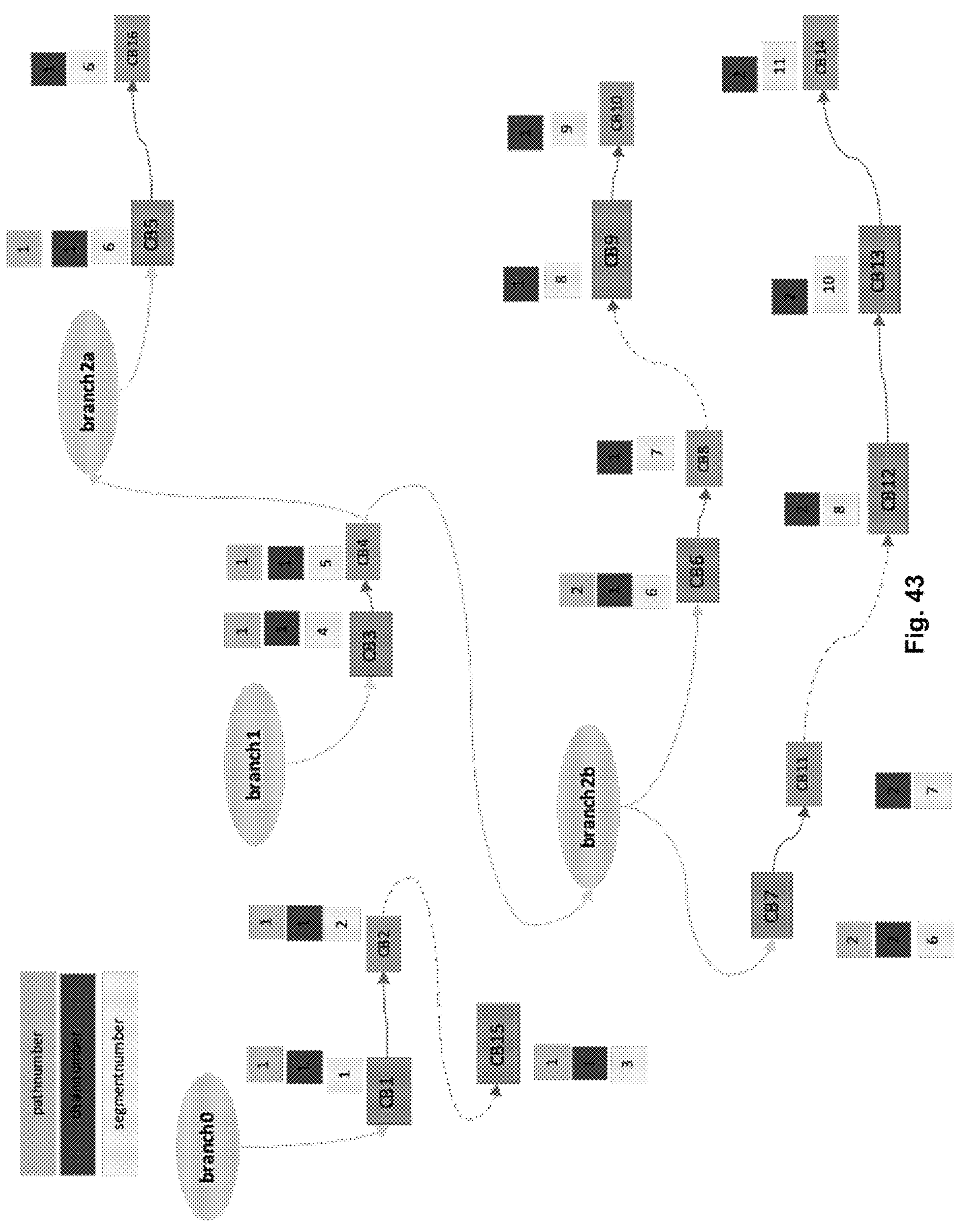

FIGS. 43, 44 and 45 show a block diagram schematically illustrating the step of numbering the computation block nodes depending on their call-position in the code, resulting in a pseudo graph like schematically represented in FIG. 43, which in return results in the computation and transfer matrix for each path number as shown in FIGS. 44 and 45. In the perspective to see a matrix as a m×n object, then there will be created one set of a computation and a transfer matrix per path number, resulting in 2 computation and 2 transfer matrices. The switch of the paths (or conditions) can be seen in FIG. 46, where the 'True'/'False' signaling is indicated.

Figure 46:
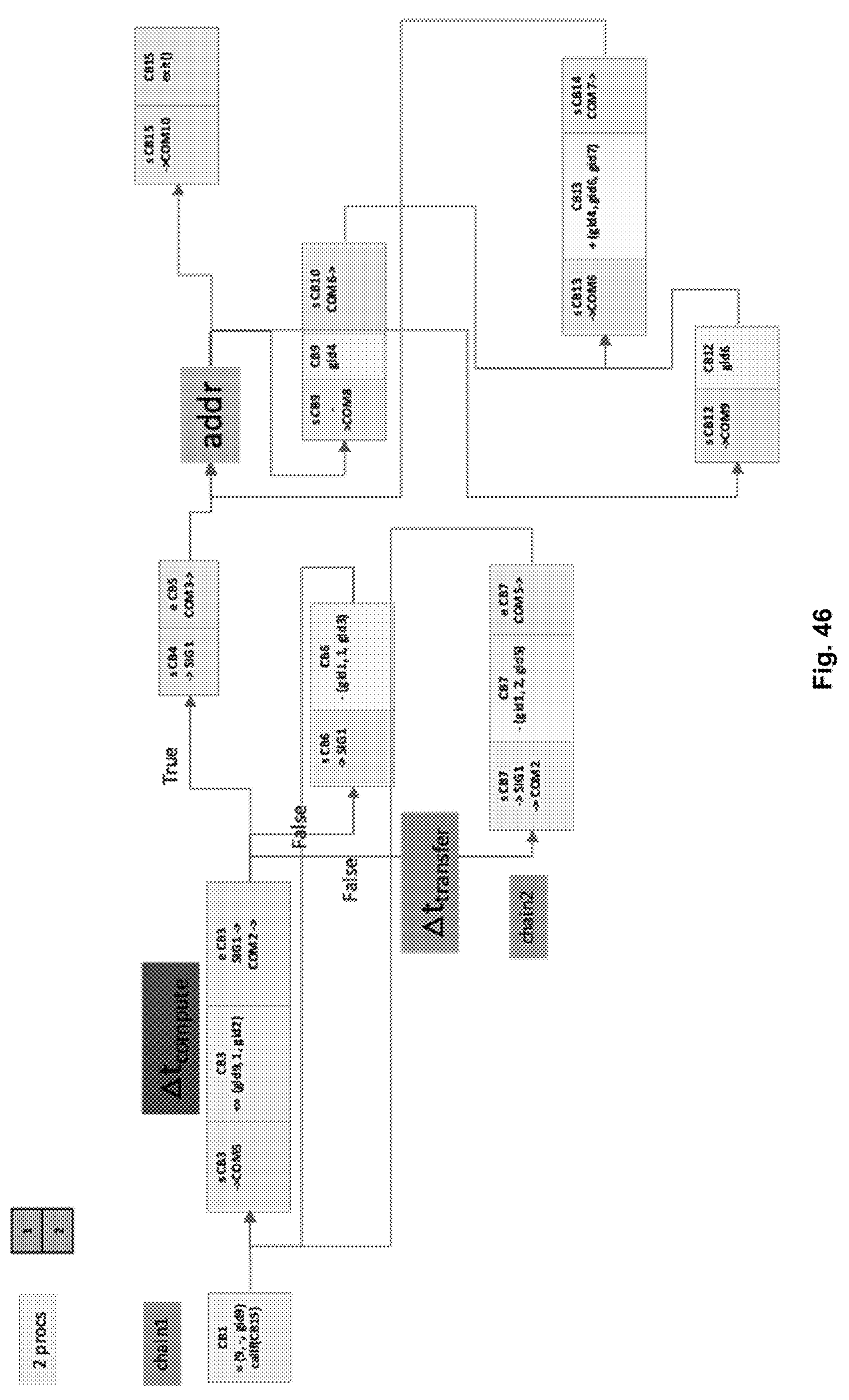

FIG. 46 shows a block diagram schematically illustrating the result of combining start- and end-communication cells in the transfer matrix and eliminating empty cells in the computation matrix (for each path) and bring them back to different code segments. Based on this code segments a code can be generated directly (as a compiler) or transferred back to code and then using a SOTA compiler to generate machine code (as a transpiler), e.g. to use the unit specific optimization techniques implemented in SOTA compilers, which target mostly on one unit compilations.

Figure 47:
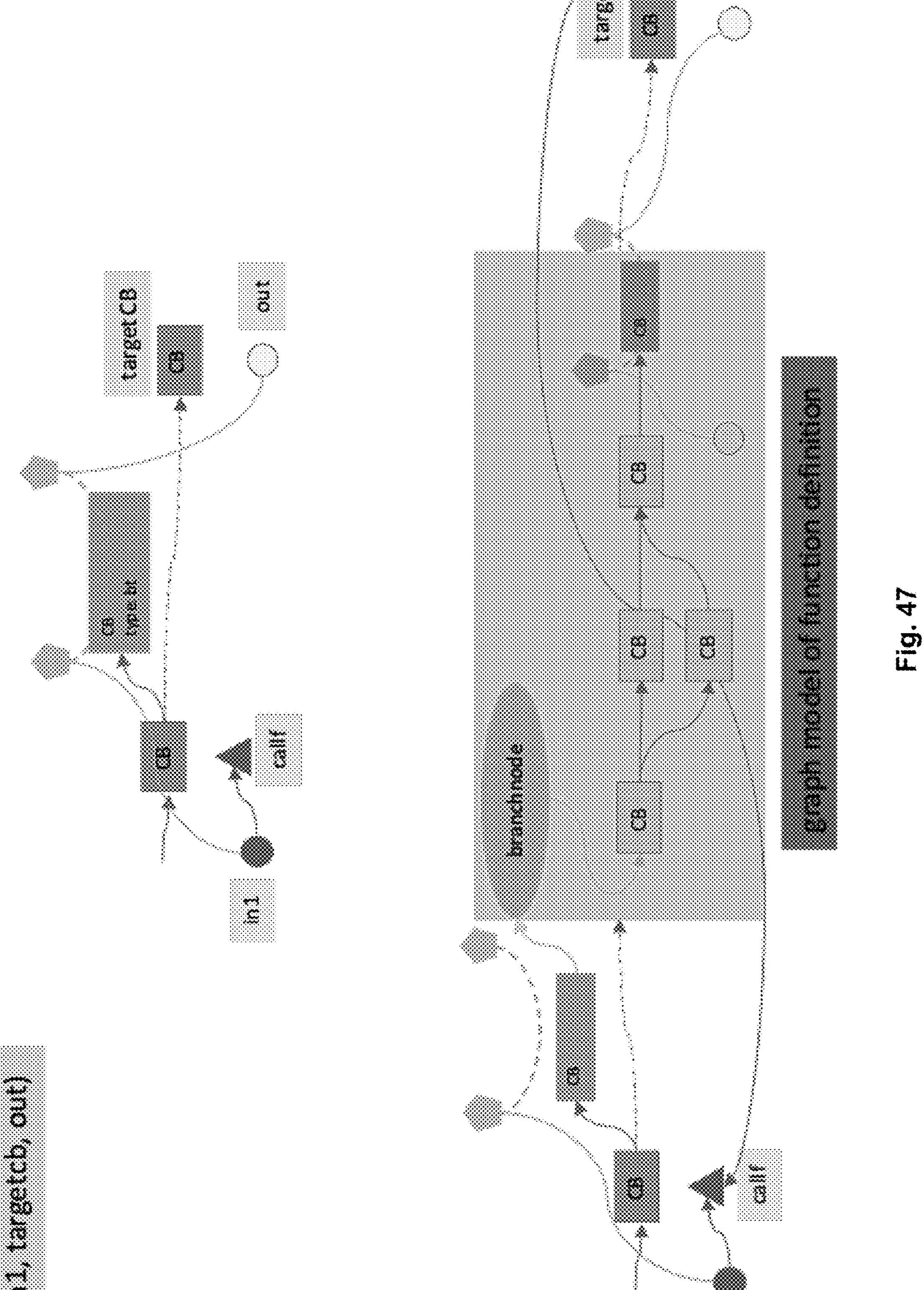

FIG. 47 shows a block diagram schematically illustrating how a function call in a parsed code can be handled with the presented method. After the parsing of the function definition the resulted computation block nodes (or matrix entries) can be "copied"/used at the position, where the function is called.

Figure 48:
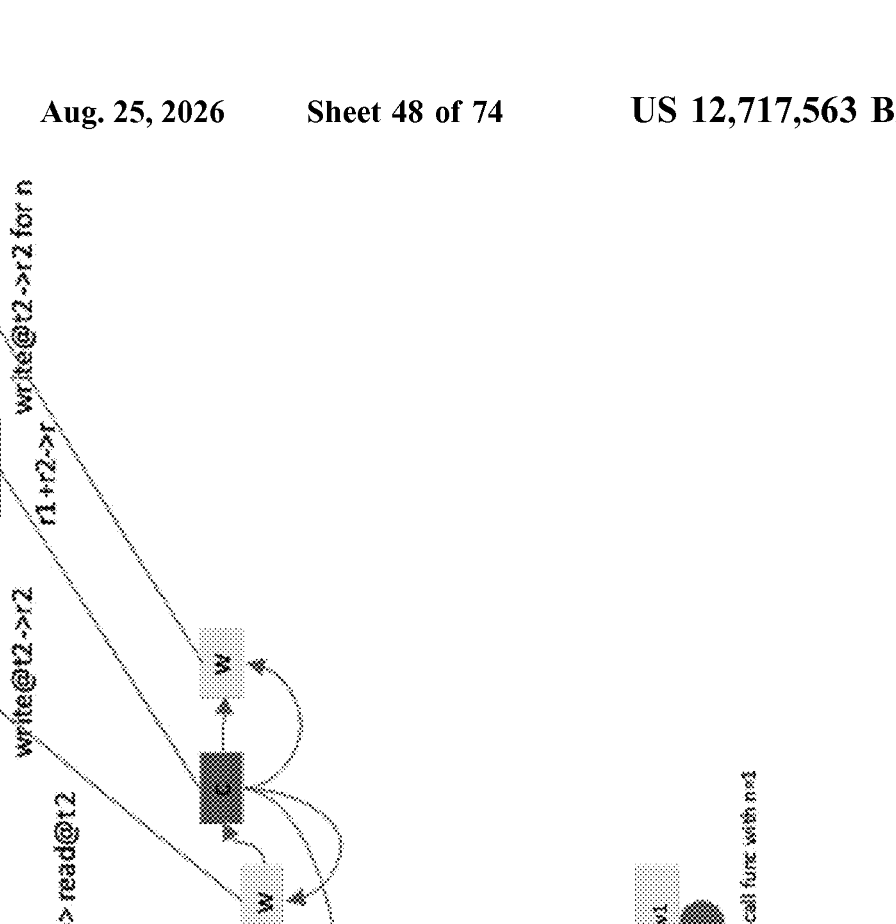

FIG. 48 shows a block diagram schematically illustrating how the inventive method maps and/or optimize the code in a more concurrent solution than the input code. As indicated to optimize the code it is the combination between the rows, the graph is shown with the combination of the con in the branch node marked as branch2b (see FIG. 43) and combine them, see FIG. 48. Calling a function is in the method placing the computation block nodes to the correct location in the matrices, respectively to apply the corresponding transfers as indicated in FIG. 47. With this in mind, the recursive call of the function can be seen with the inventive method as a transfer and 'read' and 'write' of the function parameters and result variables in a return statement, FIG. 48.

Figure 49:
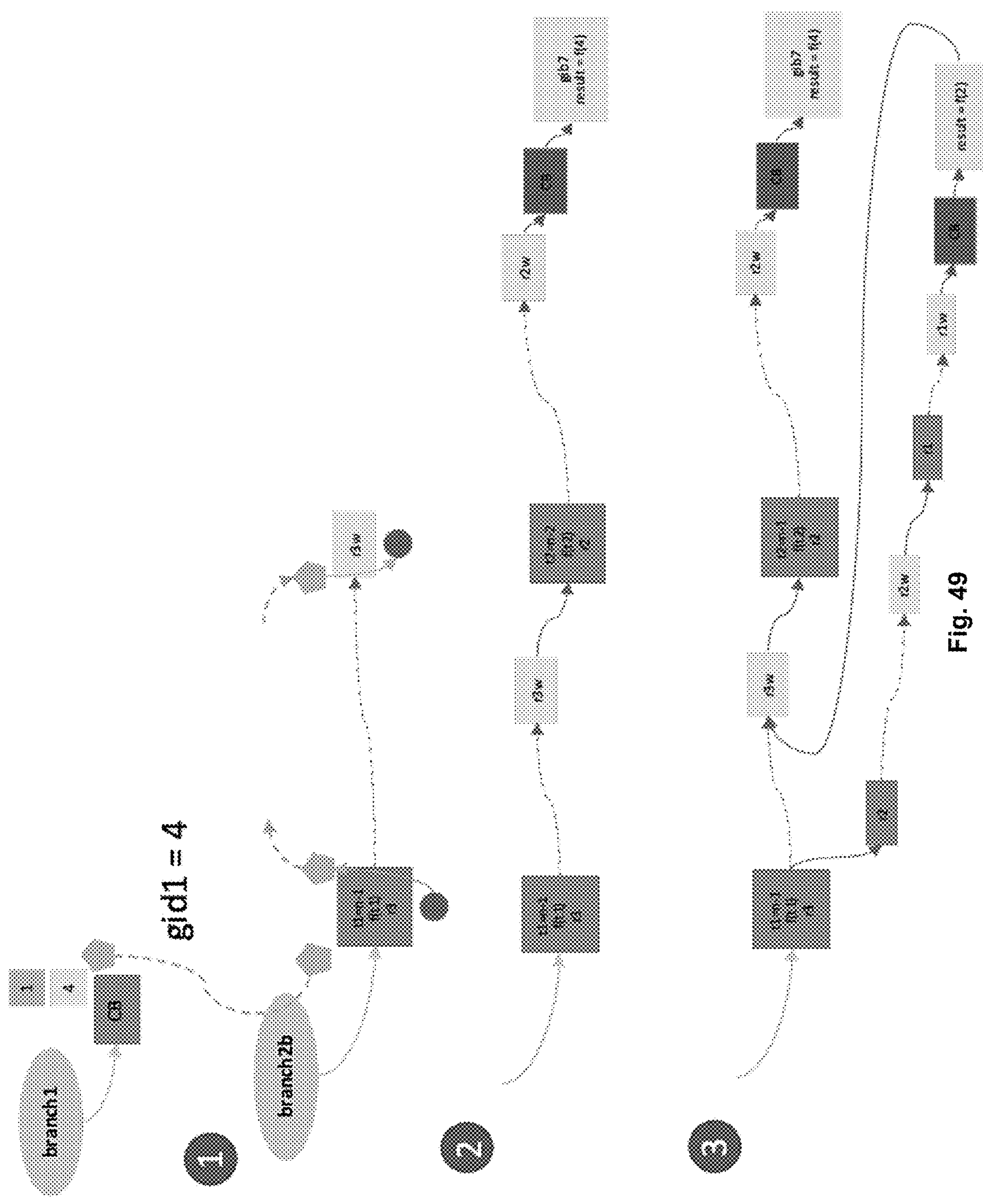

FIG. 49 shows a block diagram schematically illustrating, according to the example of a function call to calculate the Fibonacci number for input 4 (fib(4)), step-by-step how additional computational block nodes and the reducing of the transfers (as all is on one computation-chain) results in a more optimized source code.

Figure 50:
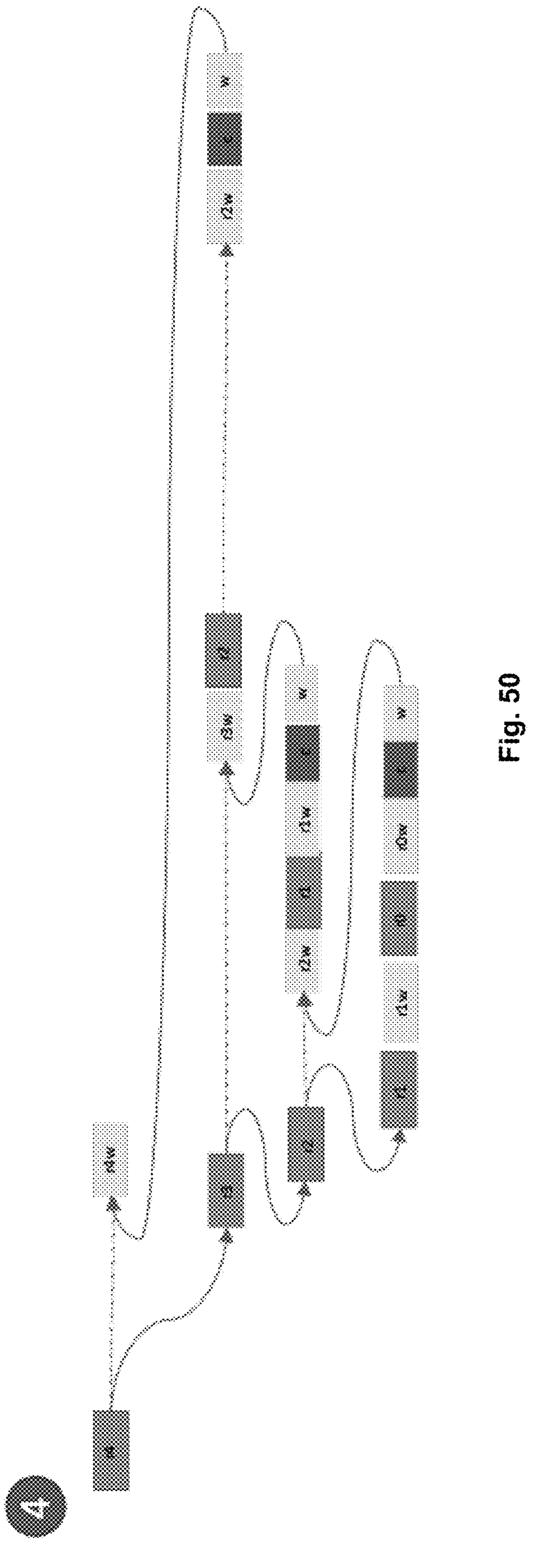

FIG. 50 shows a block diagram schematically illustrating step 4 showing the cbns for a call with 'n=4', where, as recursive calls can be very simply detected in the code, it is easy to not implement a recursive call in full dimension in a final application, as shown by FIG. 49-53 with some simplification, where the depth of this chain depends directly on the number n in fib(n).

Figure 51:
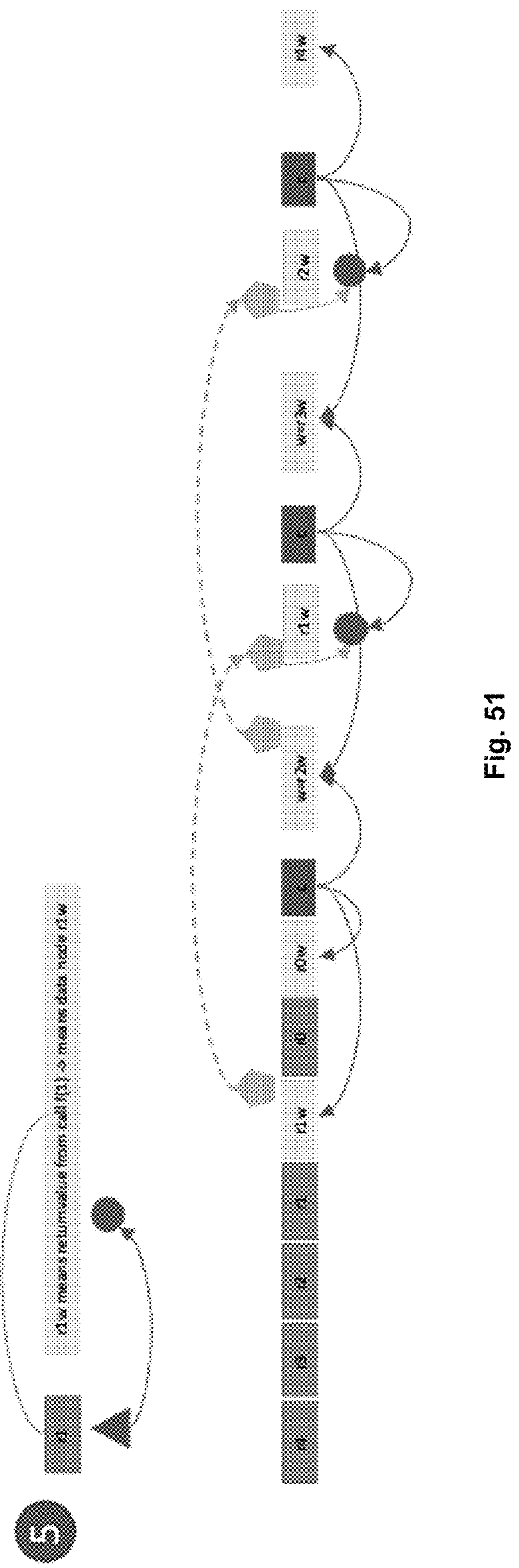

FIG. 51 shows a block diagram schematically illustrating step 5 showing the transfers, which will be occur (transport the information of the last "write" to a data node to the place where the "read" of a data node occurs and remember this information in the corresponding computation block nodes).

Figure 52:
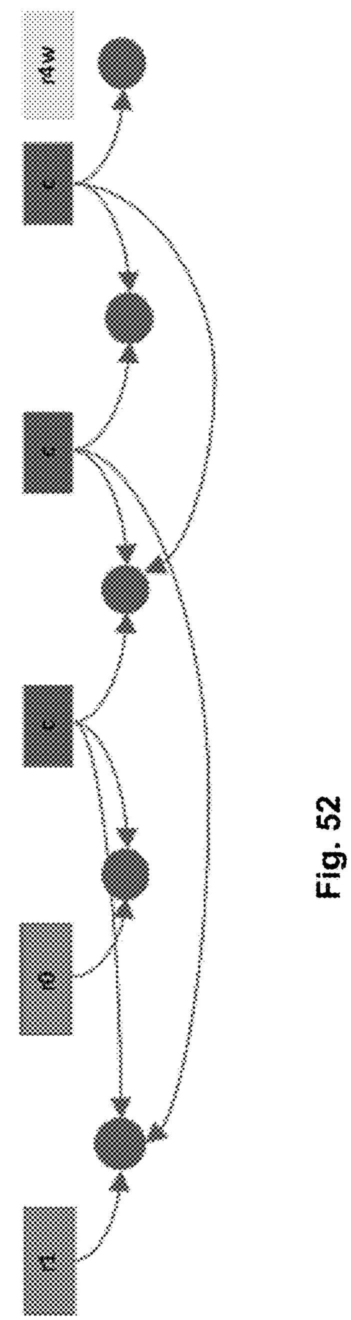

FIG. 52 shows a block diagram schematically illustrating, as all computations are on one chain, the transfers will vanish, as can be seen in FIG. 52.

Figure 53:
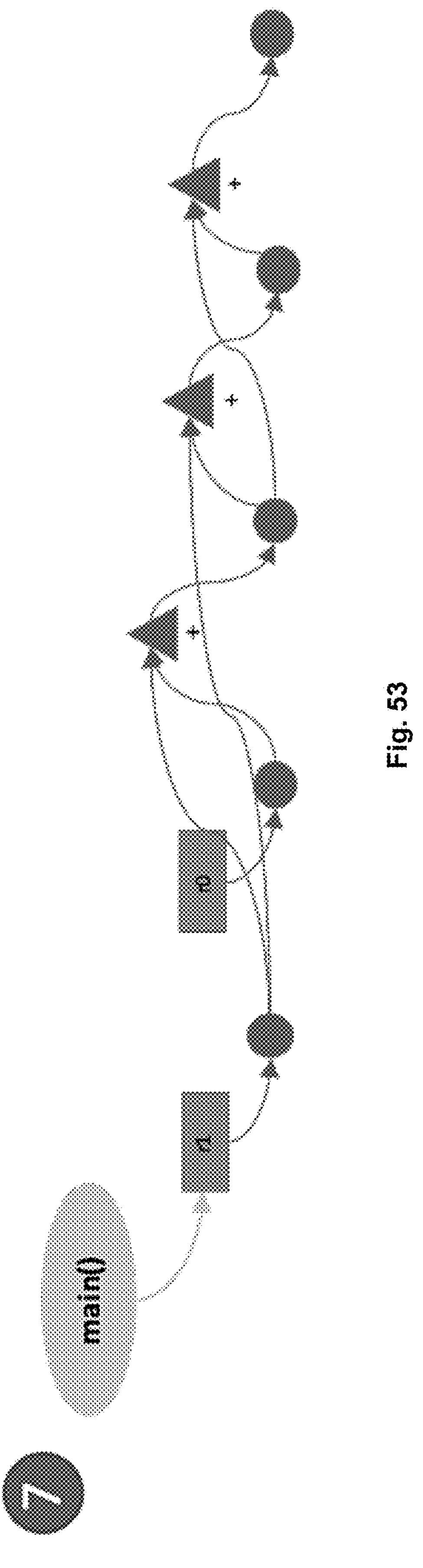

FIG. 53 shows a block diagram schematically illustrating that, when resolving every step, this leads to a program of the form in FIG. 53.

Figure 54:
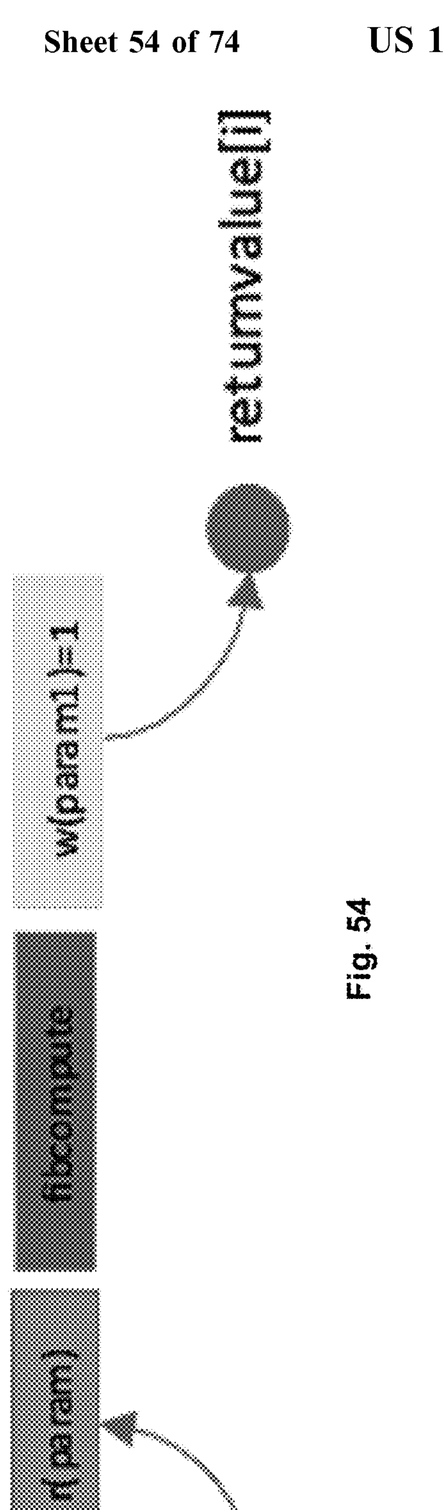

FIG. 54 shows a block diagram schematically illustrating that a function call and therefore a recursive call can also be interpreted like an array operation applying the inventive method, as it is transferring an information (function parameter param[i]) to the corresponding cons in the branch node of the function declaration and then transfer back the return value(s) to a[i].

FIGS. 55 and 56 show a block diagram schematically illustrating an implementation in python to solve a 2D heat equation. Each entry in an array is a data node. Reading from an array index is in the inventive method an operation node with data node of the index and the base address of the array. Array operations can be seen as operation nodes with corresponding data nodes, see FIG. 56.

Figure 57:
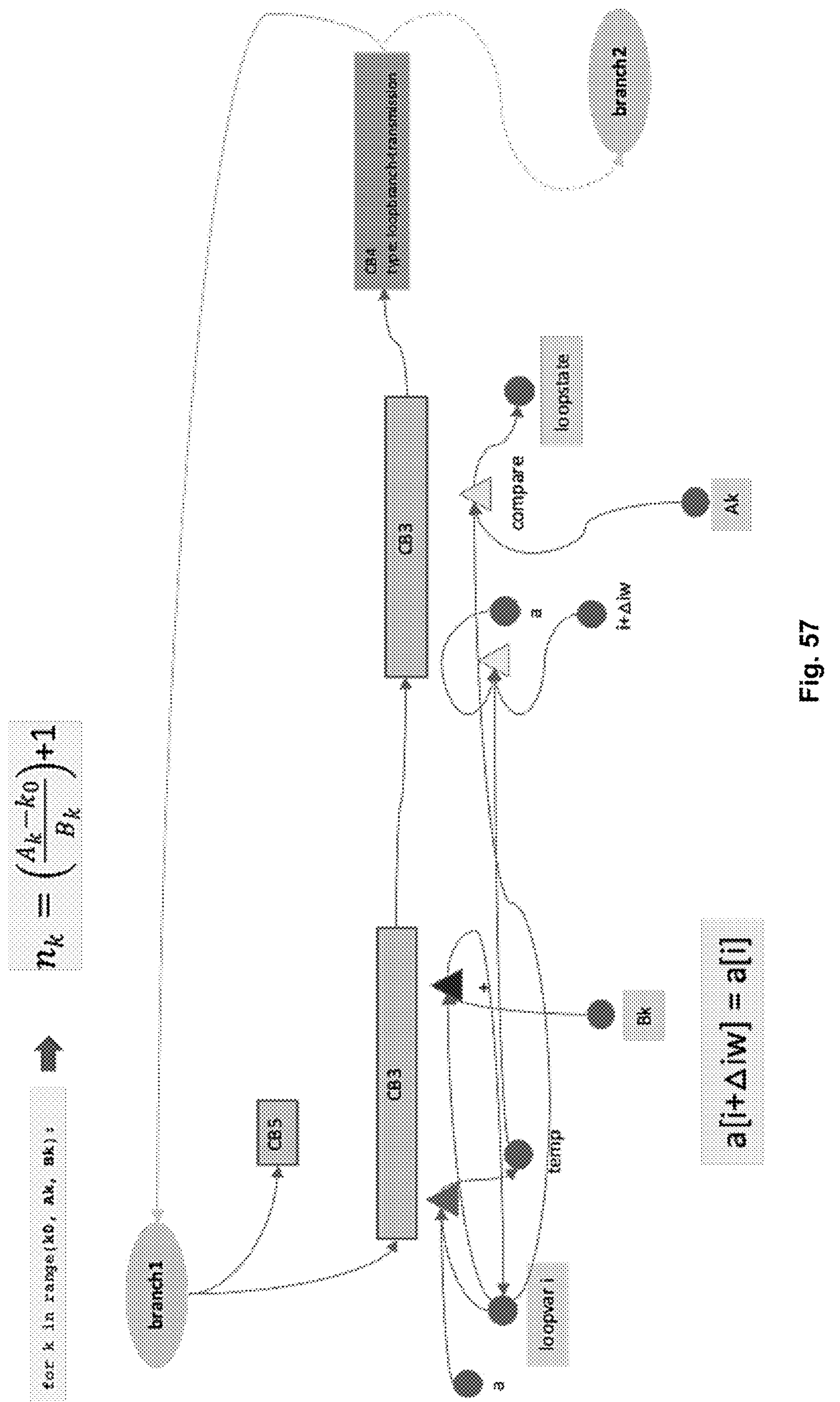

FIG. 57 shows a block diagram schematically illustrating, for the example of a loop array with an array operation a[i+Δiw]=a[i], the corresponding computation block nodes.

Figure 58:
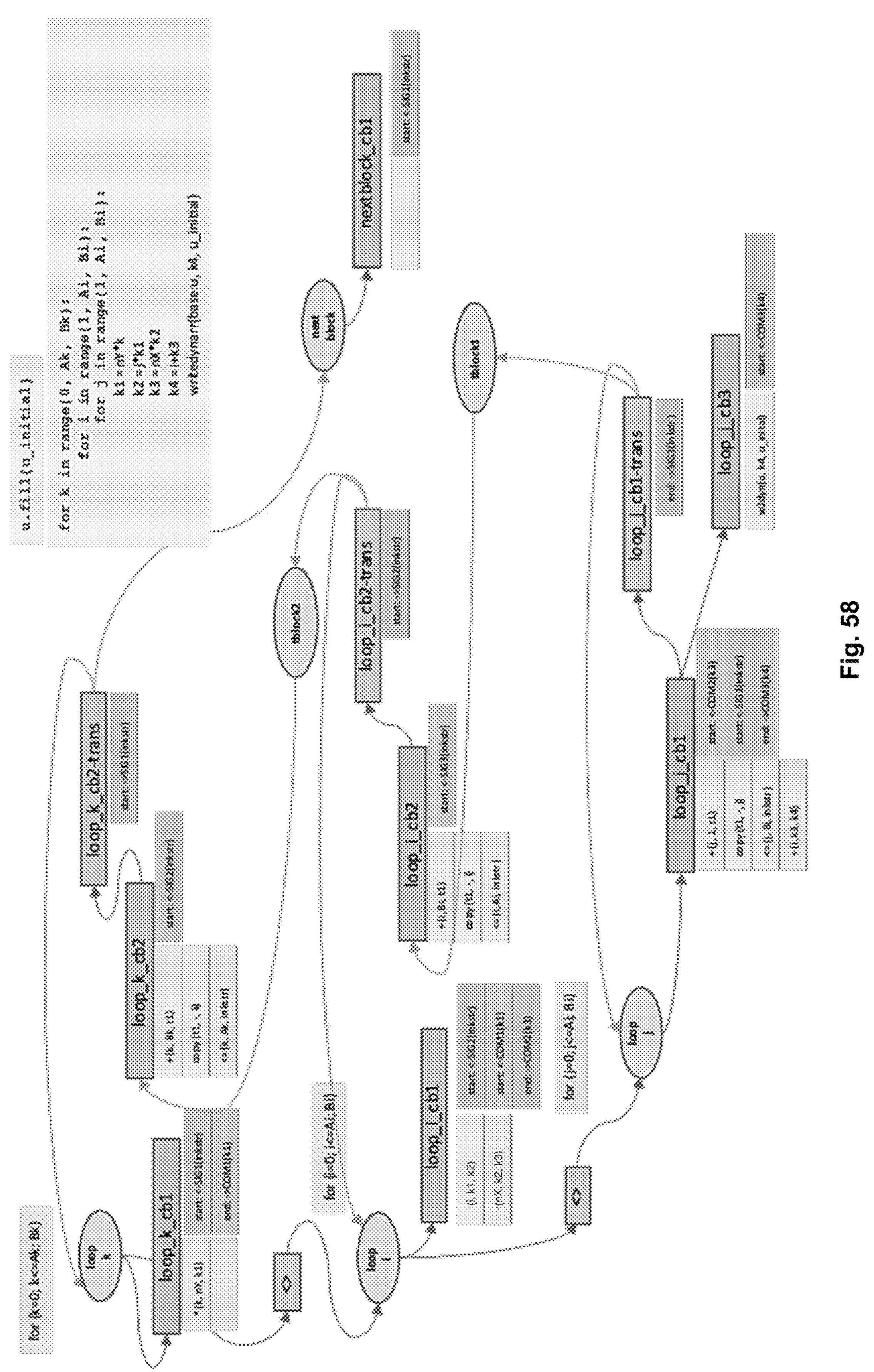

FIG. 58 shows a block diagram schematically illustrating the initial block (FIG. 55) being expressed in detail in the graph as shown in FIG. 58.

Figure 59:
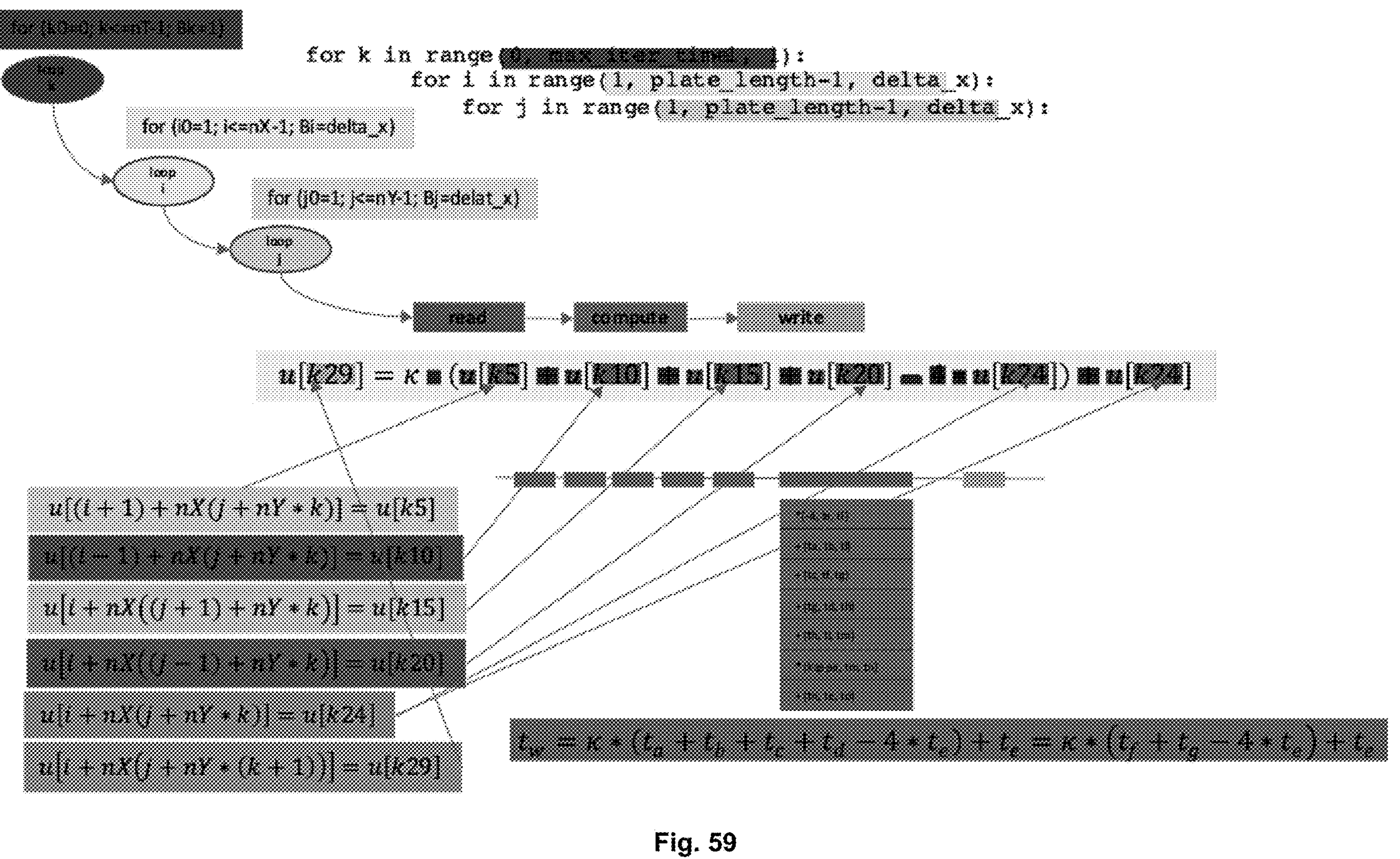

FIG. 59 shows a block diagram schematically illustrating that by using a 1D array notation and applying the fundamental rules of the method, a model approach is derived.

Figure 60:
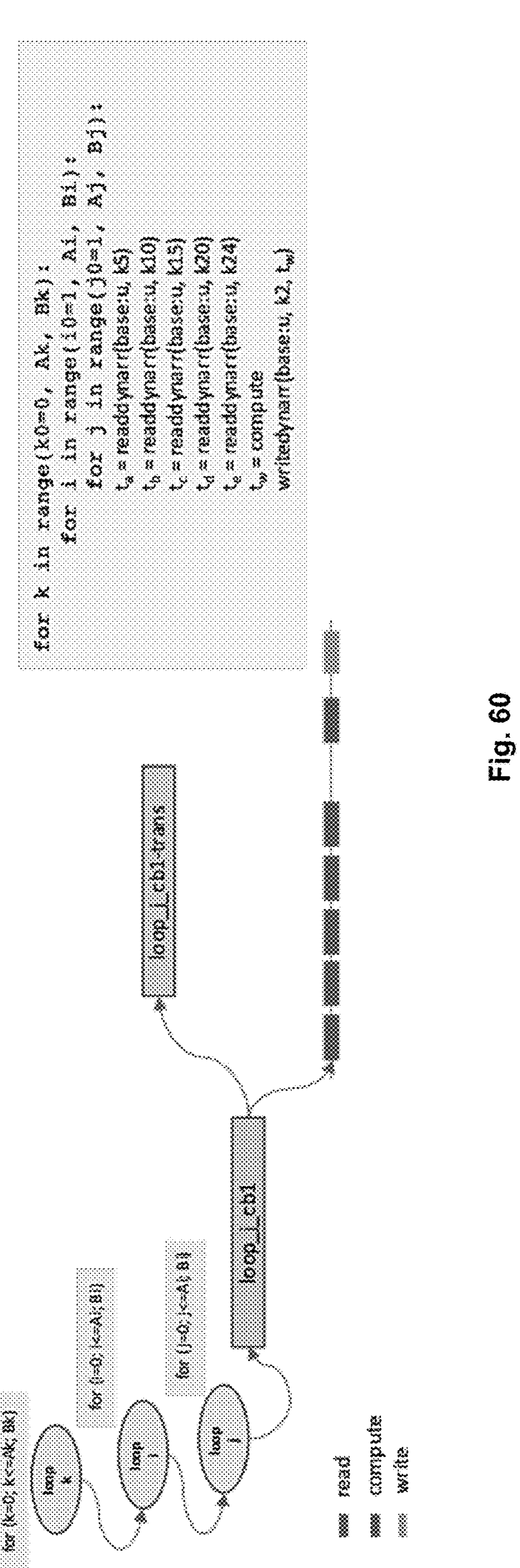

FIG. 60 shows a block diagram schematically illustrating that a statement such as the array operations in the j-loop (FIG. 55), result in 5 computation block nodes, representing "reading" operations of the array, then a computation block node which computes the arithmetic solution and then a computation block node with the write to the array at the position [k+1][i][j]. This form of representation is a schematic perspective to show more clearly how the method take such array operations into account, leading to a situation indicated in FIG. 60.

Figure 61:
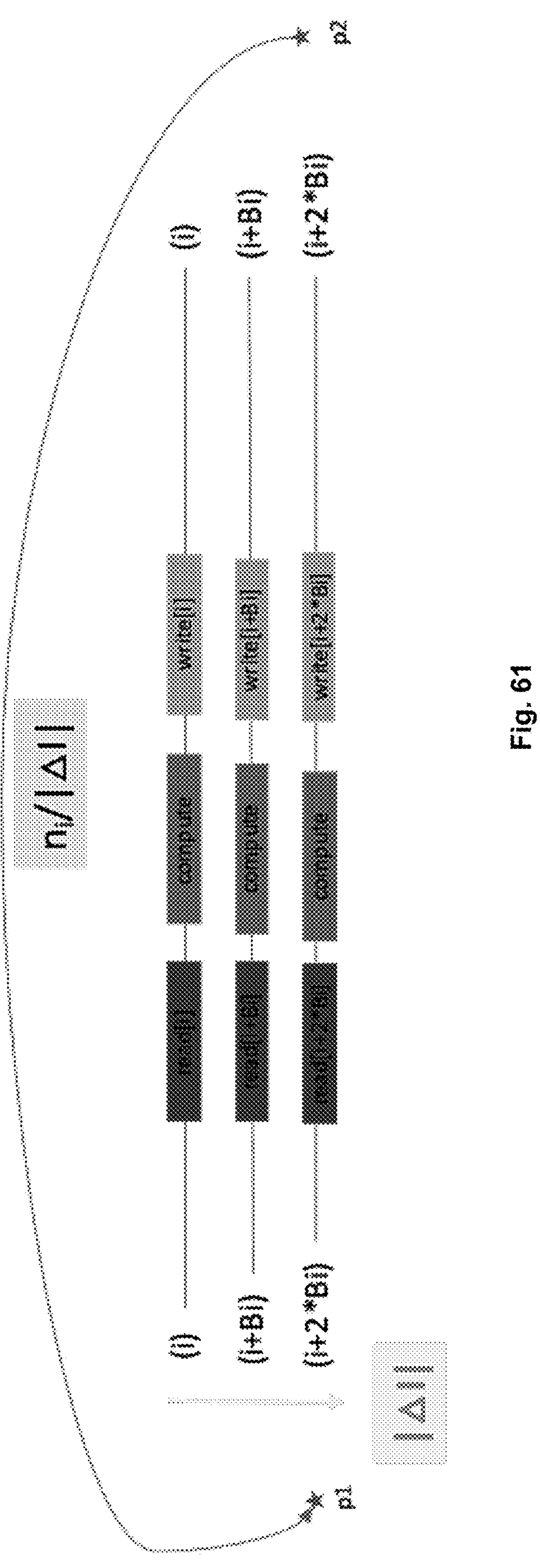

FIG. 61 shows a block diagram schematically illustrating a scheme that can be derived from the fact that each loop creates therefore a new computation block node with a "reading" or "writing" operation node and the corresponding transfers. So each loop iteration introduces the computation block nodes and form for one unit (later unit which computes the operations) a chain of read, compute, write steps. Transfer will be introduced in case between these computation block nodes "write" and "read" dependencies occur, see FIG. 62.

Figure 62:
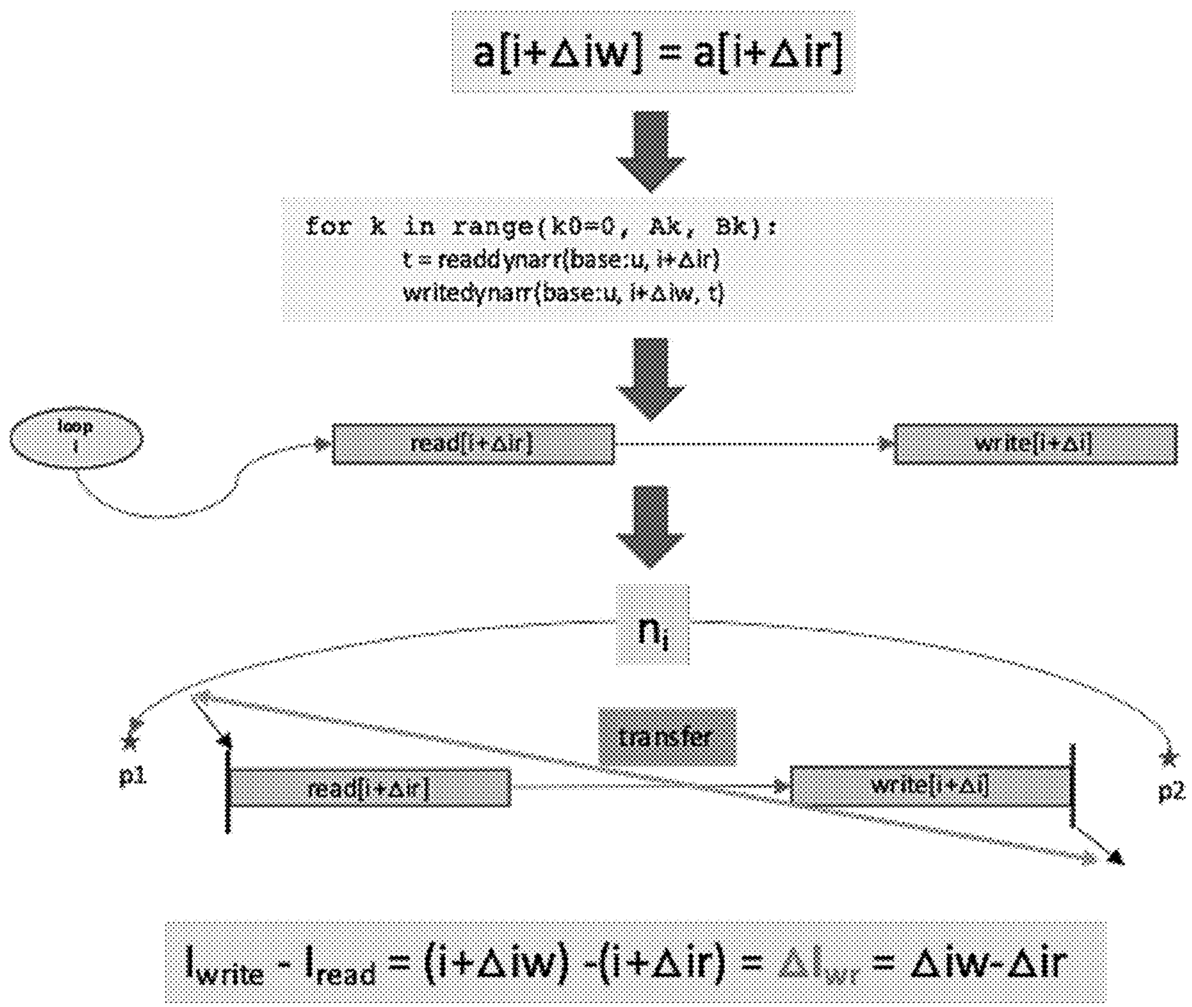

FIG. 62 shows a block diagram schematically illustrating that an offset in the index of the "reading", respectively "writing" operation can lead to a transfer between the computation block nodes containing the "reading", respectively "writing" operation nodes.

Figure 63:
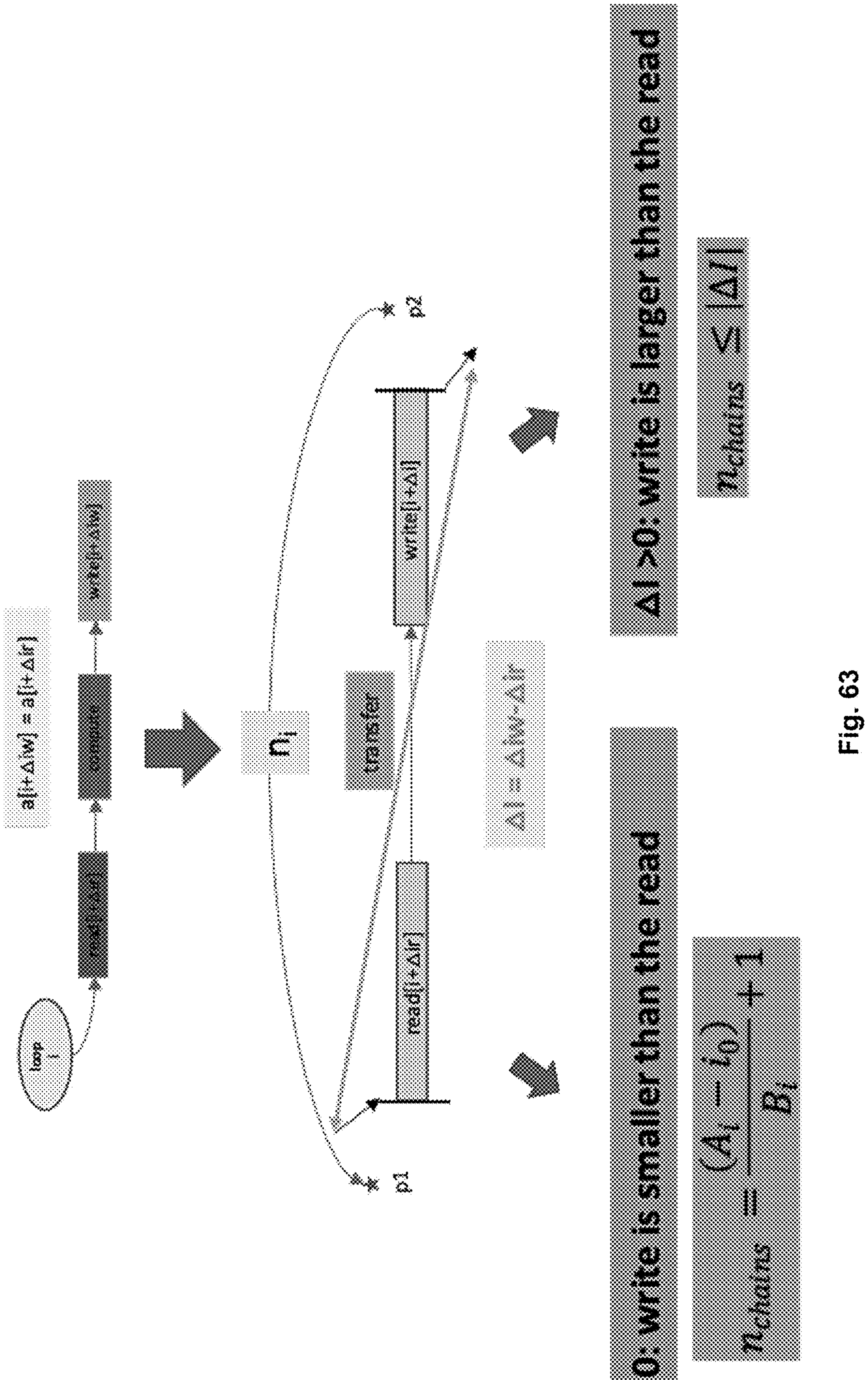

FIG. 63 shows a block diagram schematically illustrating the conclusion as derived from the dependencies in "reading" and "writing" of the data nodes of ana array indicated by indices in a loop.

Figure 64:
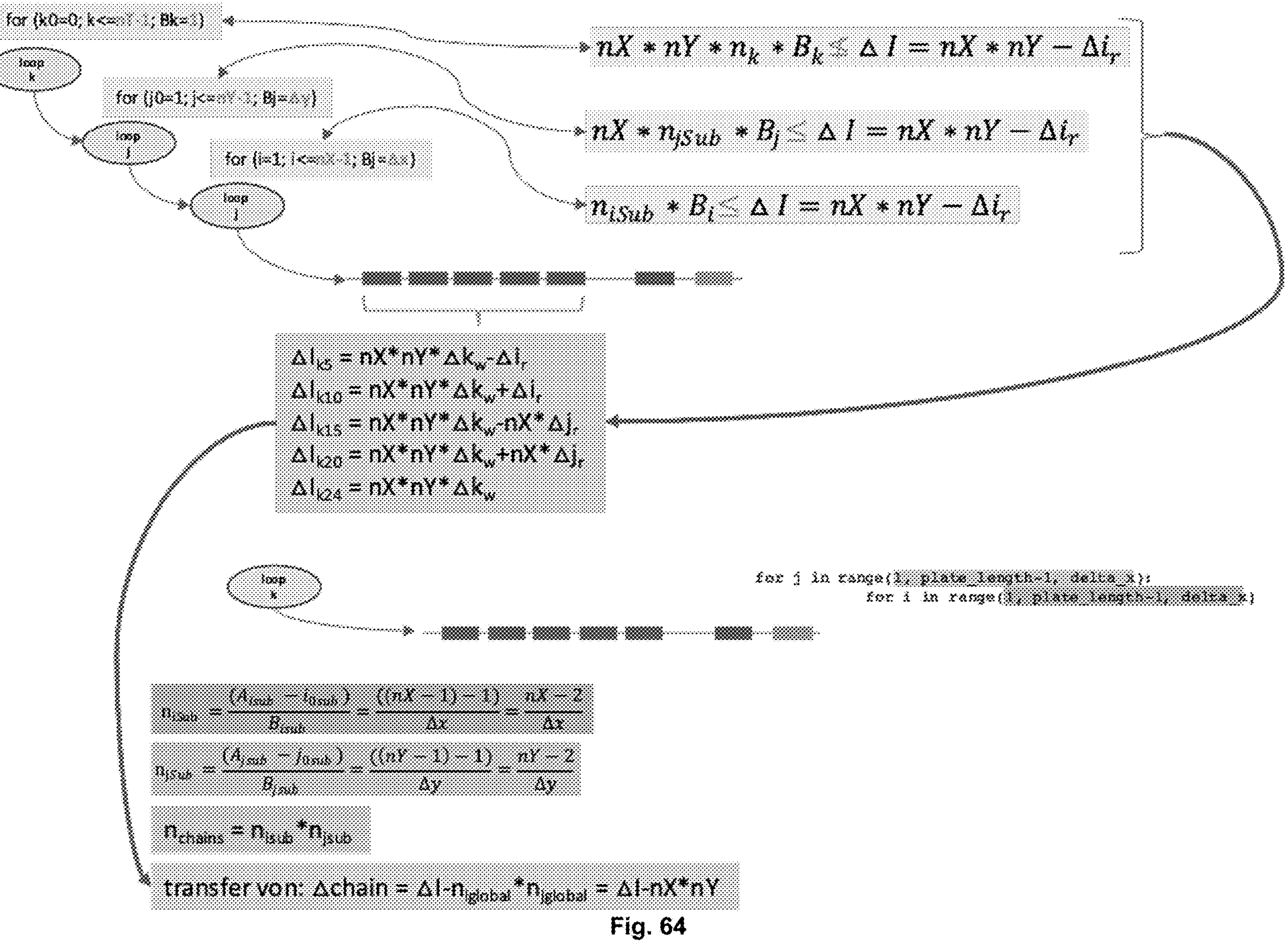

FIG. 64 shows a block diagram schematically illustrating the dependencies between "read" and "write" operations in the "read" and "write" computation block nodes and the size of the loops (in this case the mesh size) resulting from the 2D heat equation with Central Difference Scheme with a 3 nested loops implementation as indicated in FIG. 55.

Figure 65:
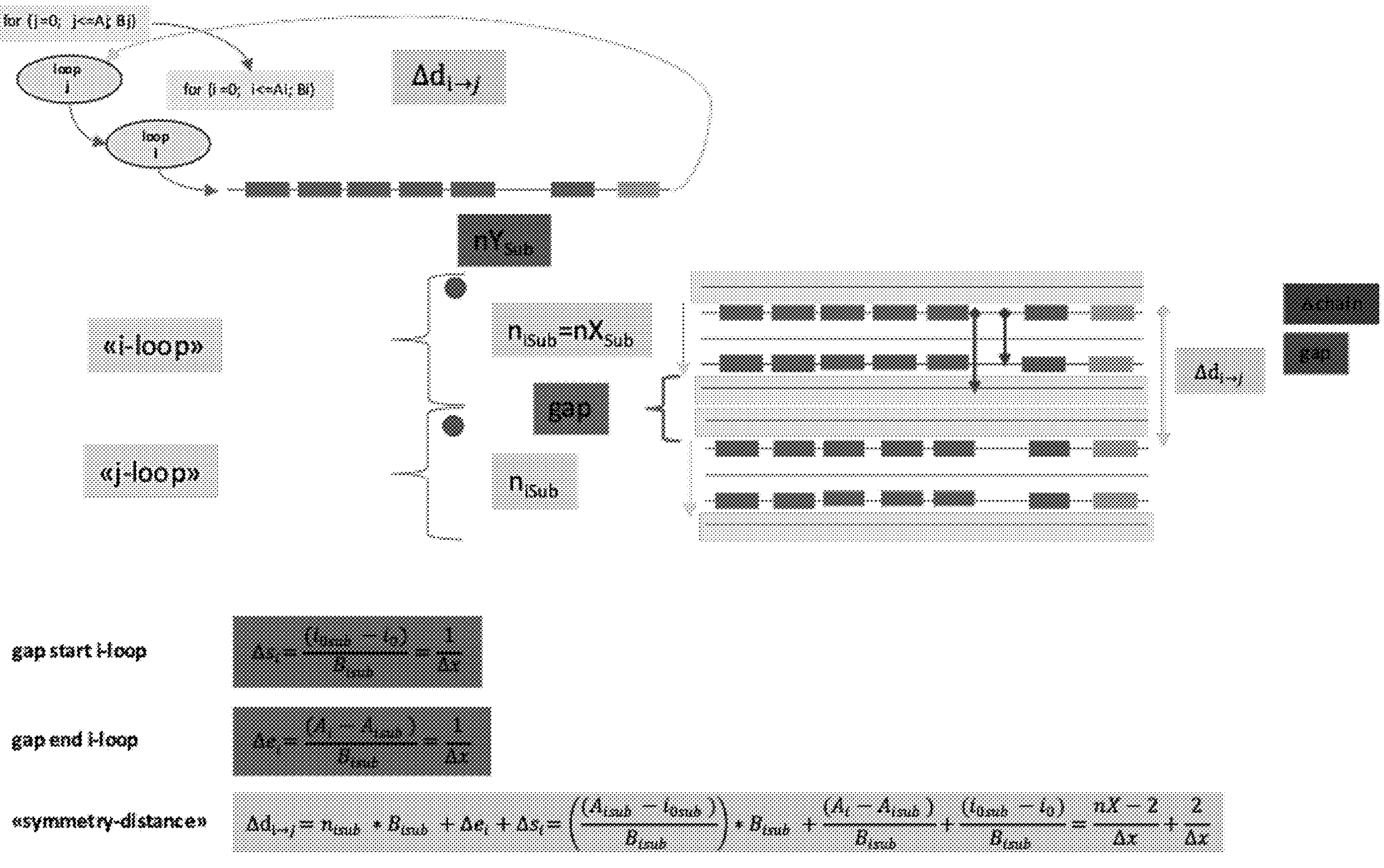

FIG. 65 shows a block diagram schematically illustrating for one nested loop, for each loop-nest a rule can be derived to handle the gaps and the consequence to the "transfers" in the proposed model. The gaps results from looping not over the complete array/mesh/dimension, indicated with j0 and Bi in the loop definitions.

Figure 66:
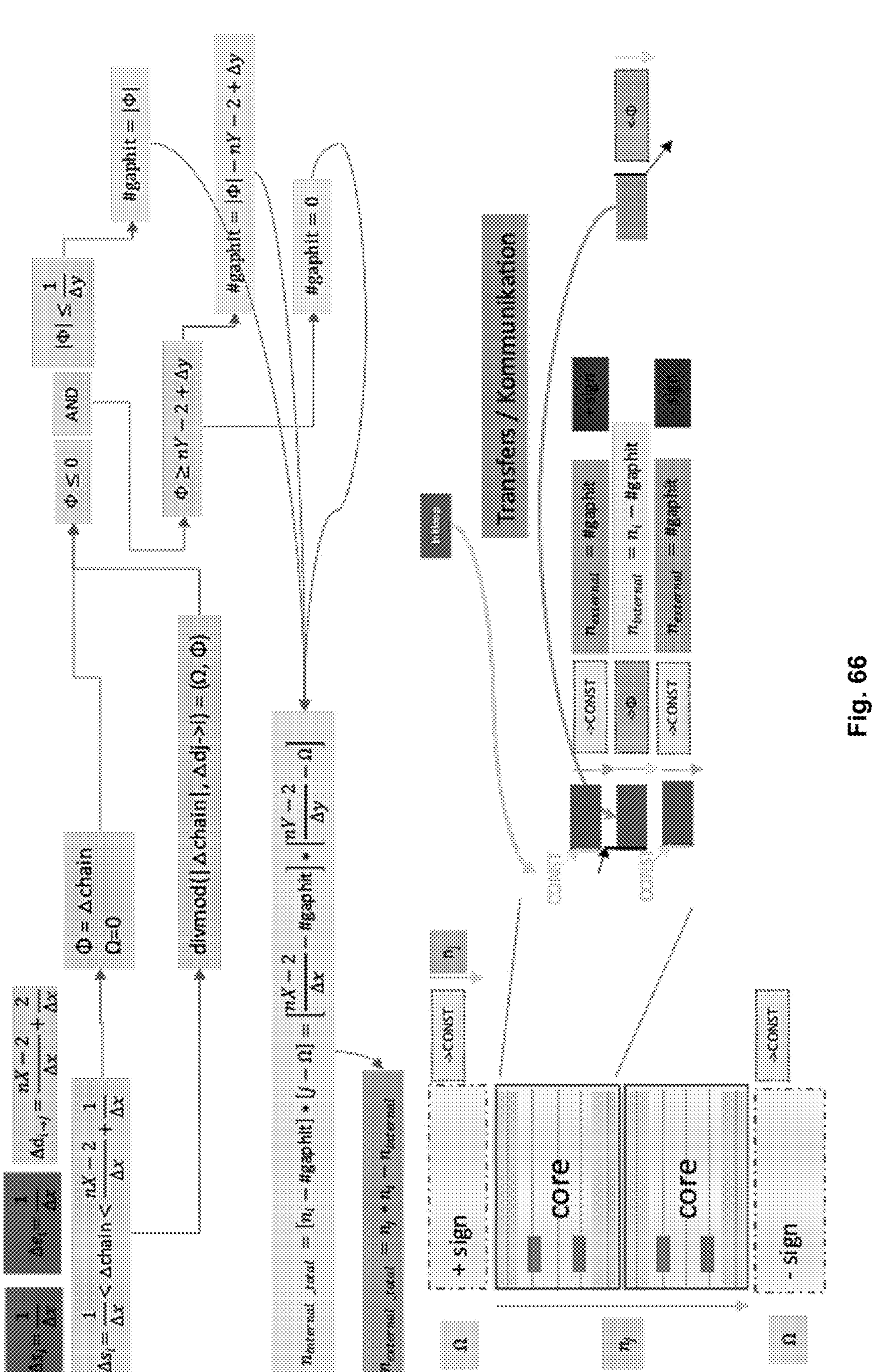

FIG. 66 shows a block diagram schematically illustrating that incorporating the gaps occurring by the looping over a subset of the array, the transfer pattern of a discretized equation can be derived, and a model can be built for the transfers, depending on the gap-sizes, sizes of the loops (=in this case meshes) represented by the computation block nodes of the inventive method. The method can also be applied for each iteration for each loop and add the corresponding elements to the graph/tree structure, but this could bring some performance issues to apply the method to large problems (e.g. large meshes).

Figure 67:
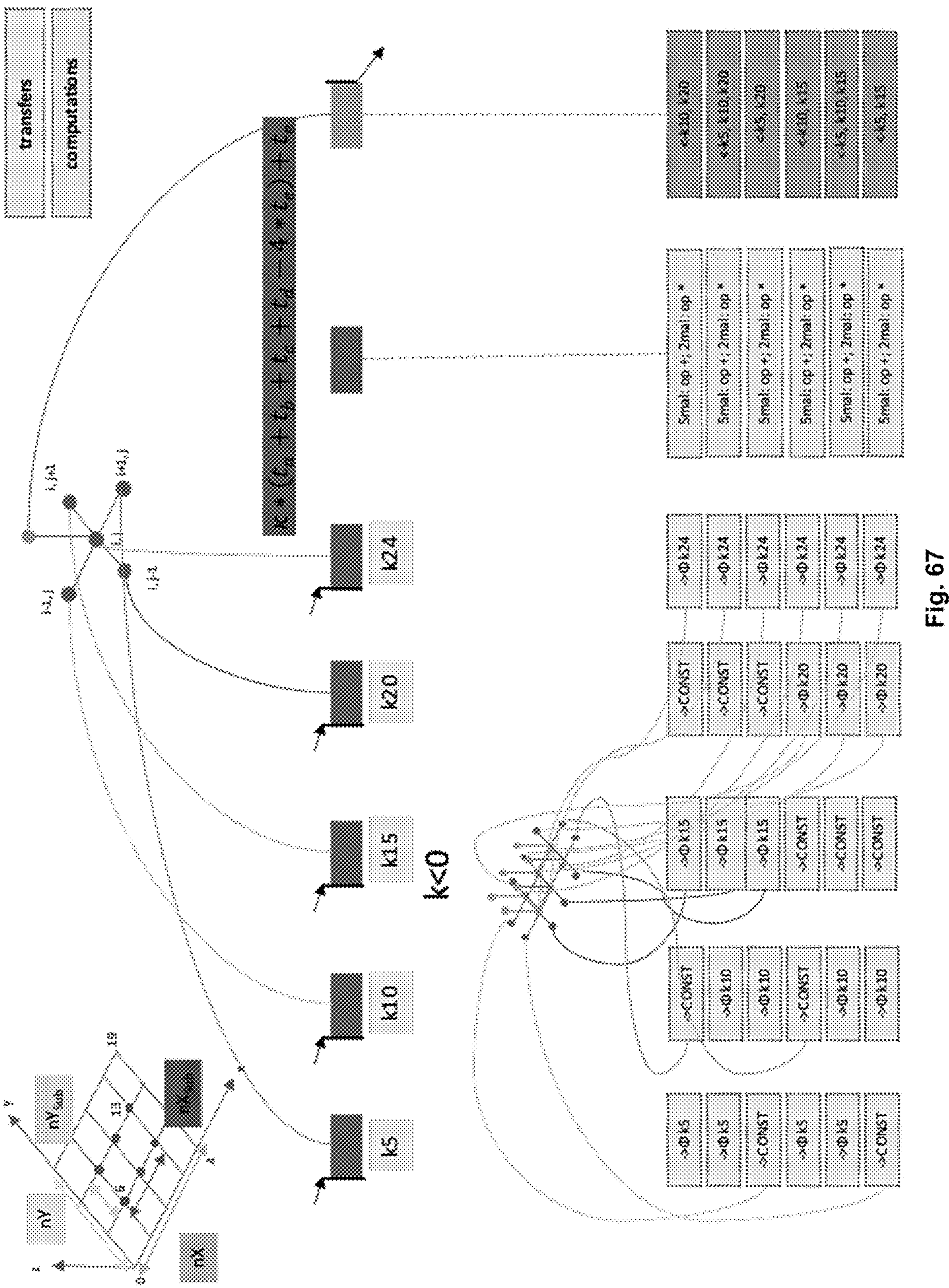

FIG. 67 shows a block diagram schematically illustrating that with a very small example of nX=5 and nY=4, this leads to the set of a computation and a transfer matrix as in FIG. 67. In the transfer matrix the arrows '→' indicate getting information and '←' indicating sending data to other computation block nodes.

Figure 68:
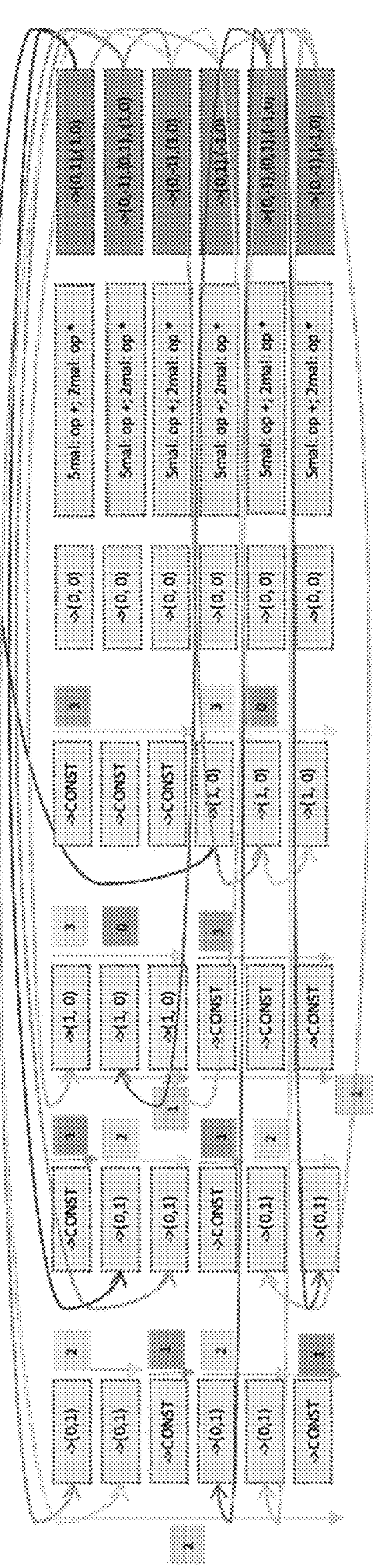

FIG. 68 shows a block diagram schematically illustrating the occurring transfers between the units, as each unit is represented by one row in the transfer matrix and the computations, represented in the computation matrix. In this illustration the entries of the computation and the transfer matrix are shown together. It is a combination of computation and transfer matrix.

Figure 69:
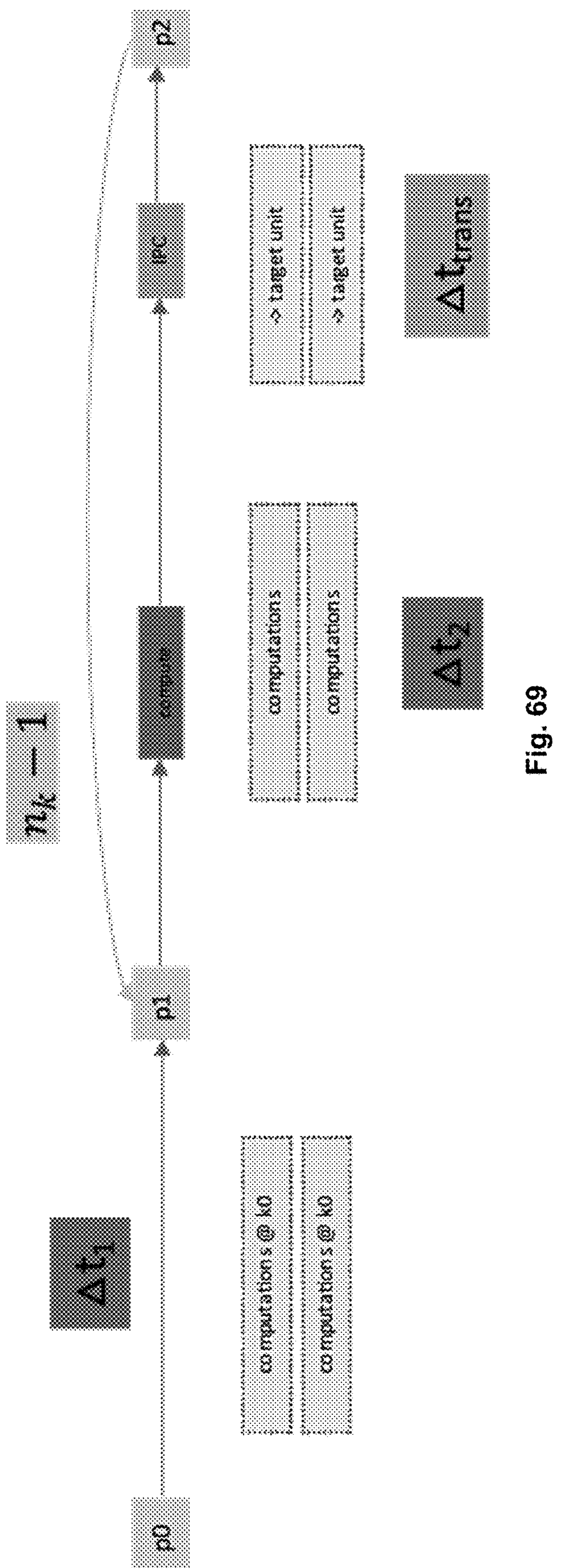

FIG. 69 shows a block diagram schematically illustrating that it is important to note at this point, that this does not mean it has to be sent and received, it also can be e.g. shared by a shared memory segment and guarded by a barrier or lock or vanish as it is shared by cache and therefore handled by a CPU—it depends on the used transfer/communication mechanisms. This can be transferred to a model, respectively leads to a code of the form as shown in FIG. 69. As the method is based on keeping all dependencies of "writing"→"reading" and a calculation of the form a[i1]=a[i2] is first "reading" an information with a [12] and then "writing" an information with a[i1], the operations of the first "reading" (p0-p1) are introduced.

FIG. 70 shows a block diagram schematically illustrating how the transfers can be used to create a time model. Grey are the meta values (e.g. known from variable type definitions or similar), which also can be used to map/optimize the matrices to a given hardware infrastructure. These values are not used in this example.

Figure 71:
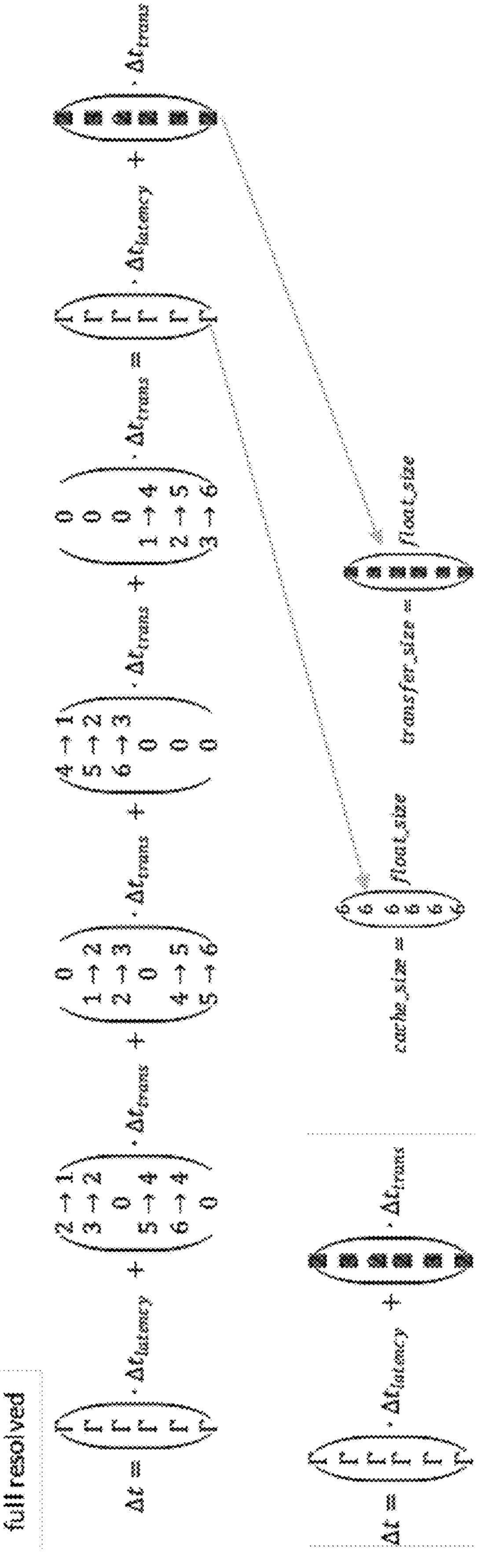

FIG. 71 shows a block diagram schematically illustrating a simple model fully resolved to illustrate possible optimizing steps.

FIG. 72 shows a block diagram schematically illustrating the behavior, which can be derived for a grid of nX=2048 and nY=1024 for Δt=computations in combined cbn*cpuPower+number of transfers*networkLatency with two different set of cpuPower and networkLatency.

FIG. 73 shows a block diagram schematically illustrating that the Fibonacci source can also be implemented using loops. According to the example with the 2D heat equation, this leads to the result in FIG. 73.

Figure 74:
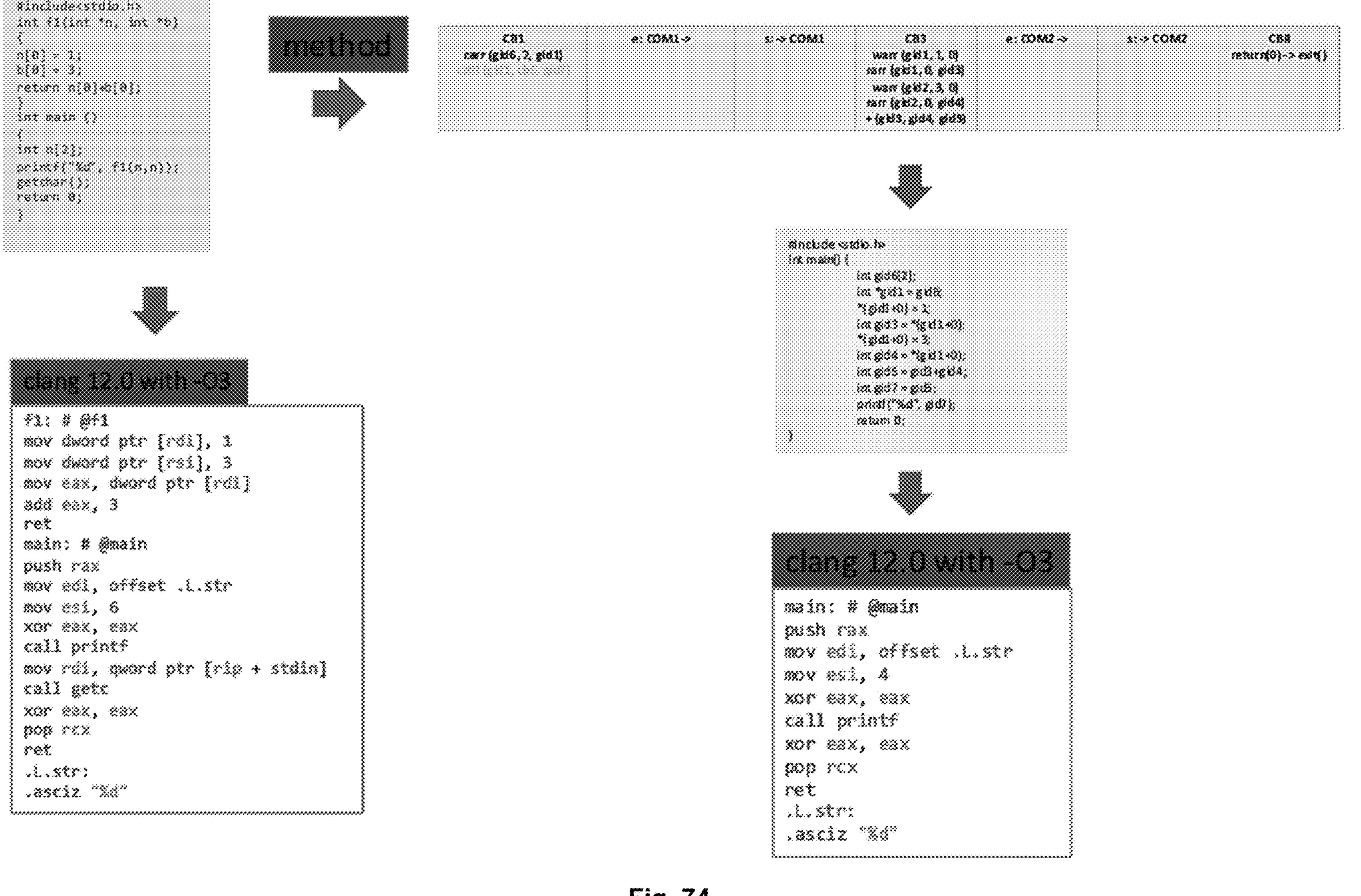

FIG. 74 shows a block diagram schematically illustrating that applying the inventive method to the technical problem of pointer disambiguation, it can be shown, that the inventive methodology resolves the disambiguation occurring by passing function parameters as pointers, because it takes the pointer as an information and this disambiguation will be resolved in the step of the transfer vanishing, as illustrated by FIG. 74. It is to be noted that the labels "Intel P5

Infiniband" and "Intel Haswell L3-cache" can generally denote a configuration 1 and a configuration 2.

DEFINITIONS (i) The "Computation Block Nodes"

The definition of the term "computation block nodes", which group the instructions and entail the communication/transfer data to other computation block nodes, is crucial for the present application. The term "computation block node", as used herein, differ from similar terms, used in the state of the art, though there is no generally recognized meaning.

The well-known basic blocks (e.g. see Proceedings of a symposium on Compiler optimization; July 1970 Pages 1-19 https://doi.org/10.1145/800028.808479) are a central definition in classical Control Flow Graphs (CFG). Simplified, they group statements, which have no jump or jump targets inside. Therefore, with a given input they can perform operations without interruption to the end, respectively to the output. This is a basic concept in compilers today. The definition for basic blocks is also historically targeted for single computation units and very well established. There exist optimization methods for a wide range of problems and it has been shown how they solve different technical problems. But seeing a code with the goal to split the statements to different dependent units (connected e.g. by a shared cache, via bus or network, etc.), this definition lacks in granularity and the classical scope prevent a broader perspective. Scoping the blocks on the bases of any unique information given in a code (see information as a bit-pattern) and combine this scope with the relevant times to compute and transfer of an information in a system, creates a different, but well physical based perspective on a given code. The alternative scope enables new option as well as solves some well-known technical problems of today's SOTA compilers (see following example for a PDE, Fibonacci or pointer disambiguations).

The term "computation block nodes", used in the present application, bases on a different and not in this way applied important unit in SOTA compilers: the interrelation of transfer and compute time for a given set of statements. These new defined "computation block nodes" group instructions together which use the same information, which is not changed by any other instructions (statements) in any other computation block node during a particular time in the complete code. In this way, they group instruction which can be processed or computed independently of any other statements with the scope on the information (information as a distinct bit-pattern), what is called in the present application "not-further splitable instructions chains". These chains of instructions in every computation block node have each a physical based "time" associated how long it takes a unit to process or compute them on a given hardware. As the hardware properties have a fundamental influence (as well as software components, such as OS, drivers, etc.) on the time needed to process or compute the instructions, the "computation block nodes" correlate them also to the time needed to possible transfers of any other information during a particular time—if needed during a particular program step—to another "computation block node" in the complete code. Each "computation block node" knows which and when the information for the own instructions has to be exchanged (communicated/transferred, respectively "received" or "send") to other "computation block nodes". Therefore, a "computation block node", as used in this application, brings a new scope and a decision criterion, meaning one of the central aspects of parallelism of a code, in relation: compute an information (bit-pattern) on a unit or transfer this information to another unit and compute it parallel. This decision can only be done, when it is guaranteed, that the used information is not changed during a particular program step (or time) in any other part of the program. Furthermore, building block nodes with this scope do not only bring advantages to parallelize a given code, this scope also shows some advantages for problems not well handled with SOTA compiler optimization techniques. Such problems and different solutions are well documented, for example, in the publication Modern compiler design by D. Grune. To show the technical benefits, some advantages resulting from using the new scope to some of these known technical problems, is shown below, such as pointer disambiguation and different performances for Fibonacci series codes, but also how the method solves up till now not solvable problems, like PDE parallelization.

First, the different scope is illustrated with a schematic example in FIG. 6. The illustration makes some adaption to show easier, what the inventive system and method does, such as the statement 'y>a' would not occur twice in the same computation chain, the resulting "compute"→"communicate" model would lead to a corresponding placing of a loop, jump or flow-control instruction. Nevertheless the example illustrates, what the different scope of the computation block nodes give compared to basic blocks: the fact that 'a' and 'b' do not change in block 1 and the information of the condition of 'y>a' is already known after the evaluation of the statement 'y:=a*b', the alternative scope of the computation block nodes take these properties into account. The proposed perspective of computation block nodes groups the statements in a new way together. This change in perspective results from the approach to group operations together, which rest on information, which is not changed at the same time-step in the code. In the example this is shown that two independent computation-chains evolve, which both are independent concerning the information of 'y'.

In the simplified, but more realistic example of FIG. 7, the inventive method exploits the fact, that a logarithmic instruction (as an example on a modern CPU: FYL2X) needs much longer then a floating point addition and/or multiplication instruction (e.g. FADD, FMUL). The inventive methods add the statement 'x:=a+b' und 'y:=a*b' to two different computation block nodes (cbn), as both are based on the same information 'a', and 'b'. The 'log 2(x)' statement is appended to the 'x=a+b' as it uses the information 'x'. The information 'y' is getting transferred, so the information is available to both, independent computation-chains.

(ii) The "Computation Matrices" and "Transfer Matrices"

Figure 8:
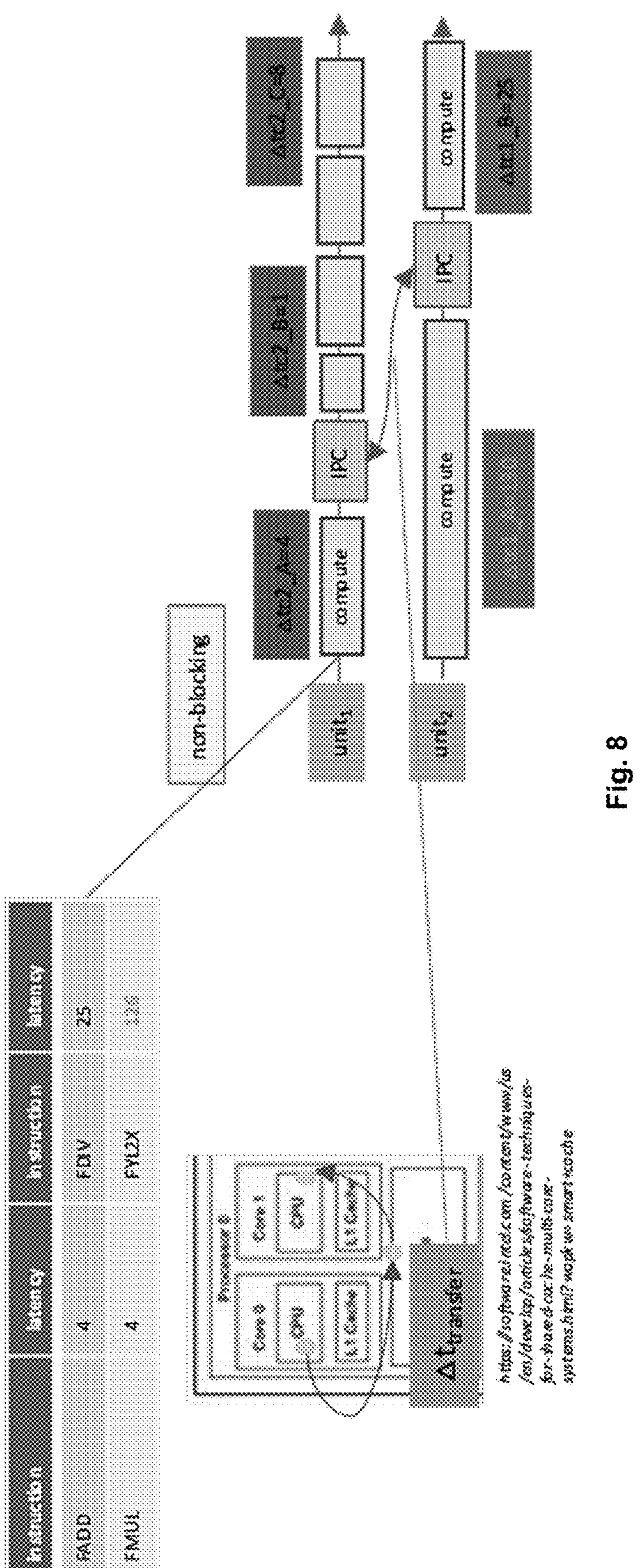
FIG. 8 shows an example how the code from FIG. 7 is split to machine code executable on two computation units synchronized by any form of IPC (it has to be annotated, that IPC is meant more to be a communication between two computing units than "InterProcessCommunication"). The matrix indicates the needed clock cycles needed to compute the different machine instructions as an example how to get a value for the time to compute the instructions. In this form, it is visible in FIG. 8, that unit 2 can compute the long running instruction of the statement 'log 2(x)' and unit 1 processes the loop with incrementing a ('a=a+1'), see FIG. 7.
Figure 9:
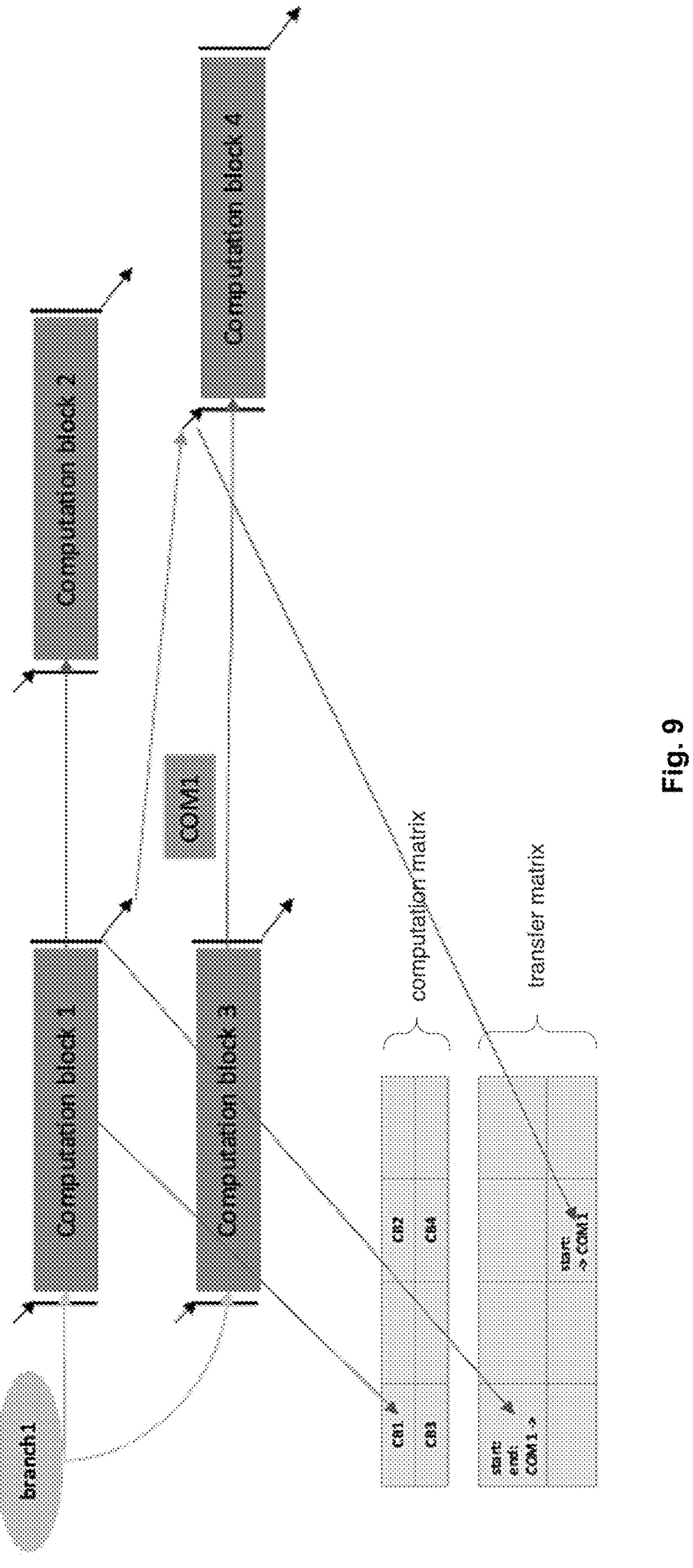
FIG. 9 shows a block diagram schematically illustrating the inventive method forming out of a flow-graph of computation block nodes two matrices, the herein called "numerical matrices" (it is to be noted, that as a variant "numerical" as may also refers to text data for particular cases, since all data on an IT infrastructure can be understood as numerical on a low level, e.g. binary). One contains the instruction chains and in the other the possible transfer properties (from and to other computation block nodes). Therefore, the code extracted from the matrices always forms a pattern "compute→communicate", as can be seen in detail in the following passages. Obviously, if code is mapped to one unit, the communicate part would vanish (and the computations (=chains of instructions) would sum up) and the inventive method would be reduced to the approach with "basic blocks", respectively can be handled with a SOTA compiler Furthermore, the matrices which represent a much more scalable form of accessing information than graphs, respective show the well-formed nature of the control flow graph. The definition of the computation block nodes (cbns) also indicates the generic nature of the inventive matrices: In one matrix, each row has an independent flow of instructions (=computations) and in the other, the needed transfers (=communications) to other cons. In consequence, this ensures that a) no further information is needed to compute all instructions in a computation block node, b) the used information is nowhere else changed during the same computation step in the whole code and c) that only information is transferred not affected of computations during this time-step are possible.

The inventive method forms out of such a flow-graph of computation block nodes, as discussed above, two technically defined matrices called "computation matrix" and "transfer matrix" in this application. Both are numerical matrices. The "computation matrix" contains the instruction chains and the "transfer matrix" the possible transfer properties (from and to other computation block nodes). Therefore, the code extracted from the matrices always forms a pattern "compute→communicate", as it is described in more detail in the following passages. If code is mapped to one unit, the communicate part would vanish and the inventive method would be reduced to the approach with basic blocks, respectively can be handled with a SOTA compiler. See the example from FIG. 7 in this form, it can be seen, that unit 2 can compute the long running instruction of the statement 'log 2(y)' and unit 1 processes the loop with incrementing a ('a=a+1'), see FIG. 8. To see how this works, in the next passages the matrix builder is shown in detail.

The name "matrices" is used to name a structure of the from (m×n×p), where m, n, p∈$N_0$. As m, n and p depend on the code, this can include different forms of a mathematical object, especially concerning dimensions like as a point, vector, a matrix, a tensor, etc., m is the number of the maximal number of computation blocks, respectively block numbers like in FIG. 43 the segment-numbers, n is the number of independent, but with the same segment number computation block nodes, like in FIG. 43 indicated as chain numbers. Depending on the maximal level of conditions in a code (or series of branch nodes like in FIG. 26), p is defined, indicated in FIG. 43 as path number. Therefore it could be said, that whenever the term 'matrix'/'matrices' is used, it can be a vector, a matrix or a tensor or any other object of the form (m×n×p) or with representation in from of a graph or tree. Therefore, optimization can also be done e.g. with one tensor by combining the computation and transfer matrices into one structure, or that a transfer and computation matrix each can be a tensor, or they both can be a vector, in a code with only one block/segment number. The dimension of these "matrices" depend on the form of the code and the way of handling/representing the information in the way the method is applied.

So called "numerical matrices" can also include forms of text, like for a transfer '1→2'. Depending on the used optimizing/mapping techniques, the text in the matrices will be or can be reduced to a numerical value (depending on the used character encoding) so they can be e.g. searched or compared. Or the textual transfer '1→2' can be represented/encoded by a numerical value from the beginning and directly be compared with other transfers and therefore omitting character encoding.

As the "numerical matrices" can be used as another well-formatted form of representing a graph/tree alike structure, it is also possible to work without the "numerical matrices" and do all optimization/mapping in graph/tree form. Whatever form of mathematical or computational form of representing the groups of instructions (here named computation block nodes) and their transfer dynamic represented here with the e.g. in FIG. 23 mentioned "transmission packages", based on the physical based dependency of transfer and computing latency occurring in all binary based electronic computing systems. It is based on grouping instructions (any form of instruction/operation, e.g. representing a form of electronic circuit) in a code (any form of code (high level, assembly, etc.)) on the rule to place an instruction "reading" an information A in the same group (here named with computation block node) where the instruction is located which "writes" the information A. This is significant different to group instructions with the well-known basic blocks. If the dependency is not clear (indicated in FIG. 21 in the case of graph elements with 2 "reading" and one "writing" node per instruction) a "transfer" is introduced between the two computation block nodes (on holding the instruction, which "writes" to one holding the instruction which "reads"). In this form the code can be represented in form of computation blocks nodes connected by their needed transfers. This information can be enclosed in graph/tree or array or any structure suitable. To run these instructions on a given hardware the well-known methods in SOTA compilers can, but must not, be used to optimize the chain of the computation block nodes grouping instructions and for each unit then to run on the involved computing units (would in this case called transpiling).

(iii) The "Matrix Builder" and the Way Back to Code

After parsing the code and adding all instructions to computation block nodes (cbns), each computation block node can be enumerated depending on its position in the flow graph. This leads to a similar form of a Control Flow Graph, given by the edges between the cons as well as the connection of the defined branch nodes. Using these positioning numbers, the unique positions in the flow of the code is used to place the information of what to compute and what to transfer in the two matrices "computational matrix" and "transfer matrix", the "computational matrix" for the computation and the "transfer matrix" for the transfers. It is obvious that meta data, such as size of the data needed for each cbn, the size of the transfer between the cbn, etc. can easily be derived.

Matrices represent a much more scalable form of accessing information than graphs, respective show the well-formed nature of the control flow graph. They are not absolutely essential for the method and this step could also be performed directly on the graph/tree structure. But the definition of the block nodes also indicates the generic nature of the inventive matrices: Each row has an independent flow (dependency by transfers) of instructions (=computations) and needed transfers (=communications) to other cons. It is guaranteed that a) no further information is needed to compute all instructions in a computation block node (this is similar to a basic block, but the scope of the independencies is quite different), b) the used information is nowhere else changed during the same computation step in the whole code and c) that only information is transferred not affected of computations during this time-step are possible. With this fact, each cell in the computation matrix has all instructions, which can be independently computed concurrent with all instructions in the other cells in the same column. In the transfer matrix in each cell, the needed transfers at the beginning and at the end of each computation step (corresponding cell in the computation matrix) is now known. Getting back code to run on the different units results in a representation in the form "communicate→compute→communicate→compute" and so on. Each row represents a chain of computation and communication properties forming a series of computations coupled by communication with the other rows=chains of computations. The needed information to communicate with the other rows=chains is in the transfer matrix. Each row in the computation matrices (and the same combination in the transfer matrix) can also be combined (compute all instructions of both, combined cells and make the necessary transfers of both cells based on the transfer matrix) with any other row in the matrices to create a new combination of computation<→transfer behavior of a given code. In this step the computations sum up and transfers on the same unit (by combination) vanish. This will lead later to a simple form of optimization, as well as the fact, that the optimization/mapping step results definitely in a runnable code, as no iterative or similar solution methods are needed. This is also a technical well known-problem parallelizing code, as debugging of parallel code is very complex (for example, see "ParaVis: A Library for Visualizing and Debugging Parallel Applications", A. Danner et al.).

Figure 10:
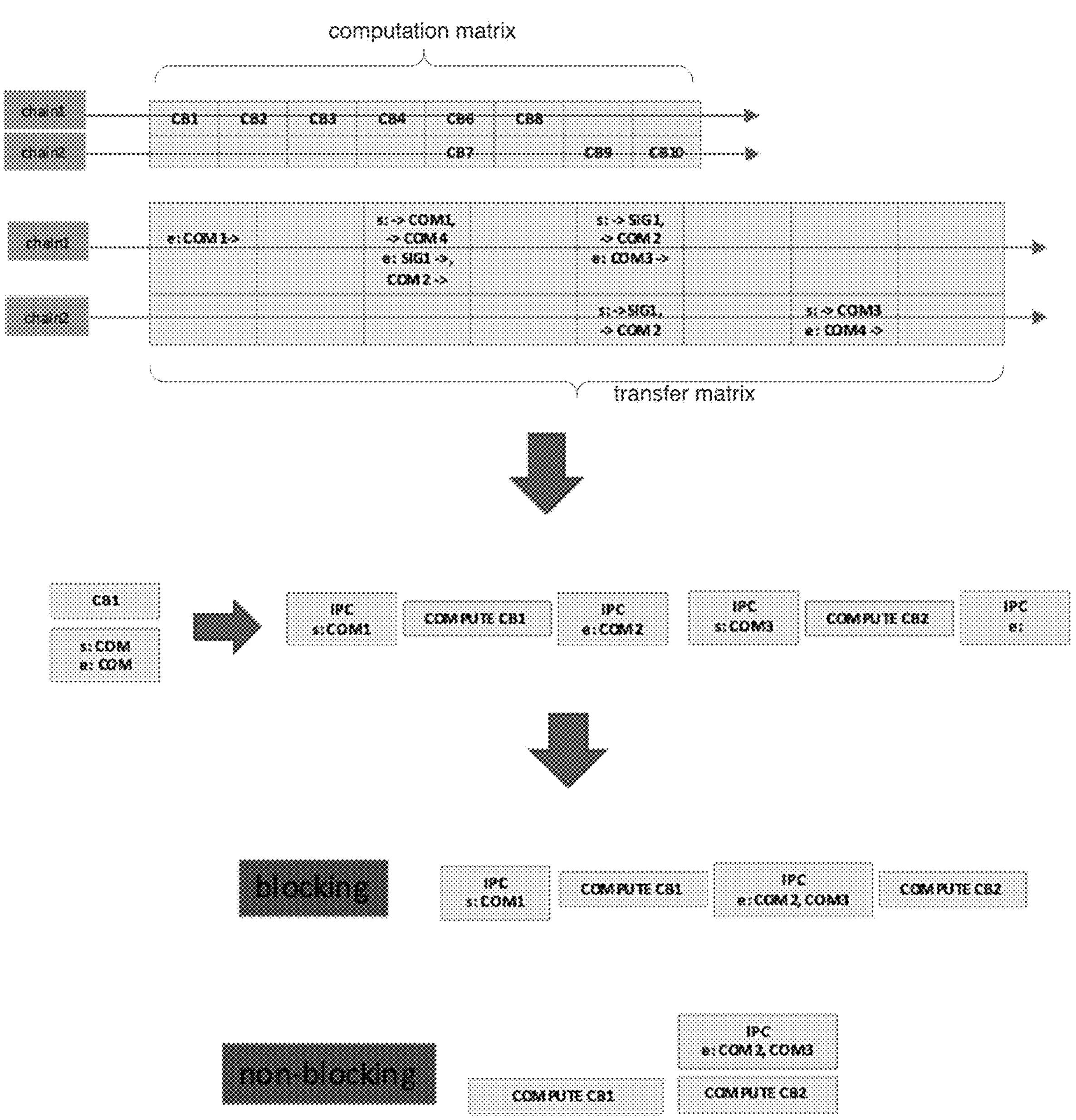
FIG. 10 shows a block diagram schematically illustrating how each row of the computational and transfer matrix together, represents a combination of a chain of instructions and communication entries for one unit. Units are depending on the level of implementation (e.g. bare assembly, threads, processes, compute-nodes, etc.). Obviously empty computation cells or not used communication entries (empty cells in the computation and/or transfer matrices) vanish, as well as start- and end-communication link together as can be seen in FIG. 10.

Each row of the computation matrices, as defined herein, represents a chain of instructions for one unit. Units are depending on the level of implementation (e.g. bare assembly, threads, processes, compute-nodes, etc.). Obviously empty blocks (empty cells in the computation matrix) or not used communication entries (empty cells or transfer on same units in the transfer matrices) vanish, as well as start- and end-communication link together as can be seen in FIG. 10. This results in case there is no transfer if the code is run on a single unit and all transfers will vanish by reassigning/renaming of variables, respectively applying well known optimizing methods in SOTA compilers to get an optimized code for a given unit.

Depending on the method to implement the communication, non-blocking or blocking mechanisms can be used, as it is guaranteed, that during a computation block node no information will be transferred used in the instructions at the same time, respectively another con with same number. Depending on the level the computation and communication part can be implemented, resulting to use the method as a compiler or transpiler. The transfer back to code of the form "computation→communication" approach makes it also easy to use languages (e.g. C, C++, python) suiting best for an application and depending on the target infrastructure, such as IPC (InterProcess Communication) methods (e.g. queue/pipe, shared memory, MPI (Message Passing Interface), etc.), libraries (e.g. eventlibs, multiprocessinglibs, etc.) and the use of available SOTA compilers, etc.

(iv) "Optimizations"

Figure 11:
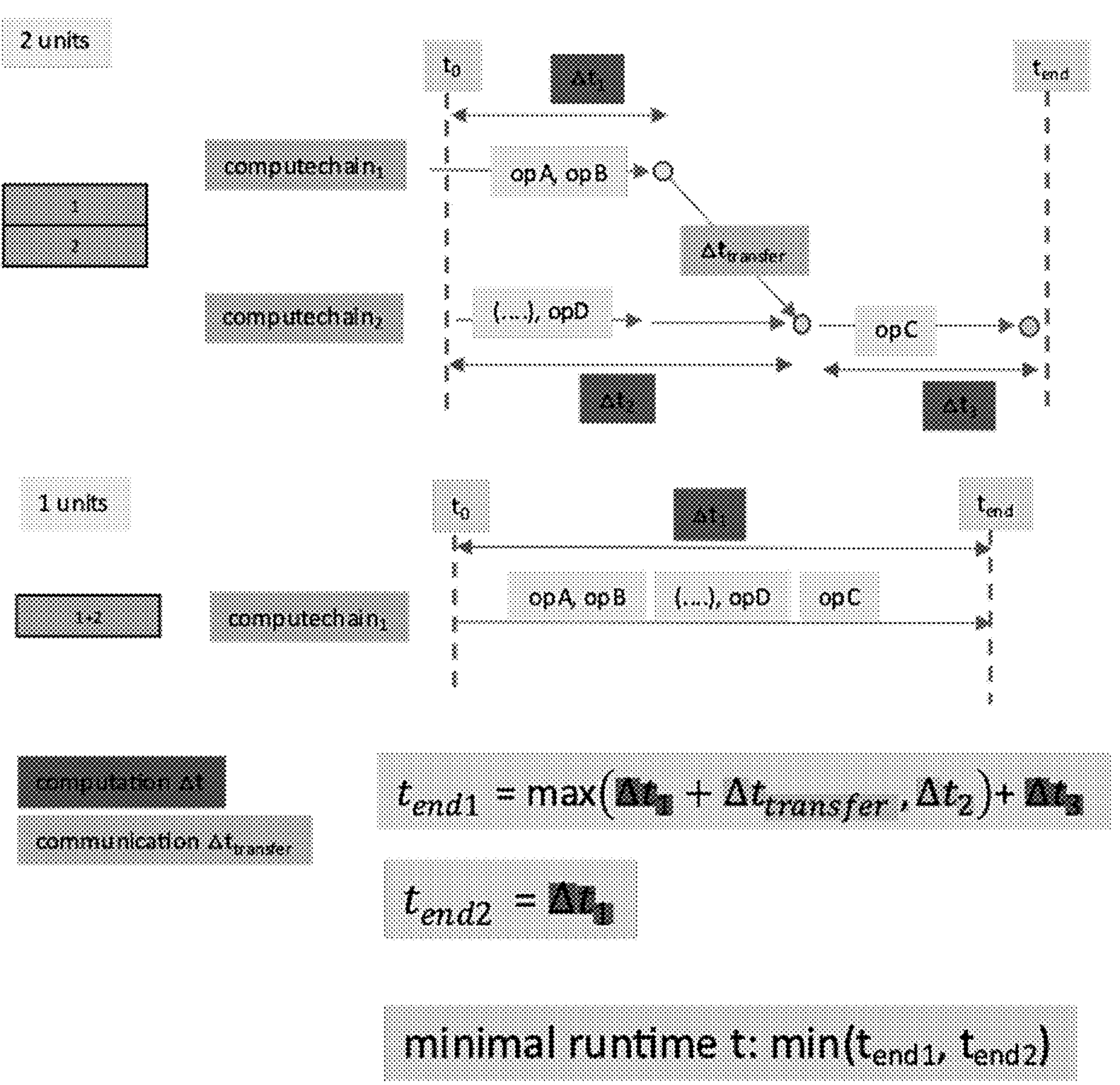
FIG. 11 shows a block diagram schematically illustrating one possible optimization by the inventive system providing an optimized and ideal hardware to a technical computing and processing problem. The most obvious way for such an optimization is by building different combination of rows from the computation and the transfer matrices and each combination is one possible new, parallel/concurrent code (as the transfer on same units vanish and the computations sum up) and then assess its properties on the target infrastructure, as shown by FIG. 11 for a simple example.

The generic, well defined nature of the matrices is the unique base for a wide range of possibilities to map/optimize a code to a given hardware or evaluate an optimal hardware configuration for a given code. The structure guarantees as a result a runnable code. Each hardware infrastructure has its own performance properties and in combination with the available software layer, a modern ICT (Information and Communications Technology) infrastructure is very complex. The inventive method allows to optimize the code to the hardware or allows to give out an ideal hardware. The most obvious is by building different combination of rows from the computation and the transfer matrix, whereby it is important that in both matrices the same combinations are built. Each combination (e.g. combine row 1 and 2 in computation AND transfer matrix) is then a new version of a parallel/concurrent code for the given input code and then its properties on the target infrastructure, see FIG. 11 for a simple example, can be assessed.

By different combinations of the rows in the matrices (e.g. combine row 1 and 2 in computation and transfer matrix or row 2 and 5) different combinations of computation<→communication ratios are retrieved. Each of the combinations then can be examined including other known meta-data for a given hardware/software infrastructure. For example data types of the data nodes ( ) can be used to evaluate for hardware properties, such as cache-lengths, available memory or other properties of a target platform. This form of combining and searching for an optimal compute/communication ratio for a given code and a given hardware results always in a runnable, concurrent code, because no iterative solution method or similar approach is needed to find a solution in the optimizing step, nor solution with e.g. race-condition, dead-lock, etc. can occur, respectively dead-locks can be detected.

The grouping of the instruction is based on the inherent physical constraint that transfer is normally a magnitude larger than to compute at the same "location", the method spawns a form of optimal solution space for the most splitable form of a code and results in a well-defined way and search space for a unique way to find an optimal map for a given hardware, or the ideal hardware for a given code. This makes this method quite generic and solves the technical problem to adapt a given code to a target platform automatically. In case the method is used as a transpiler, SOTA compiler could be used to optimize then the code to a target hardware/unit.

Other methods do not exploit the inherent time properties and dependencies given in a code and do not produce this form of unique solution space to optimize, in the form the method's definition of the computation block nodes (by grouping by the scope of no changing information)—this solves technical problems directly in many ways. The examples in the detailed description will show this in more detail.

(v) "Computation Block Nodes" According to the Invention and "Basic Blocks or Slices" of the Prior Art Computation block nodes are NOT the same as basic blocks or slices: They have a different scope. They do not follow the definition of basic blocks, e.g. by connecting independent program parts based on their jump/branching. Instruction chains in computation block nodes have an elementary data dependency, meaning that the information used in these chains is nowhere else in a given code changed nor transported at the same time/program step.

So the time, respectively the place of an instruction in a program is brought into dependency in the computation block nodes. The computation block nodes consist of a chain of instruction, which is based on the same information, whereby information is defined as every form of bit-pattern (e.g. data variable, a pointer-address, etc.). By introducing a transfer/communication, where an information is not only used by a time-step in a code and coupled with the instruction, a correlation of these both physical based times are reached in a computation block node. The method places the computation blocks in such a way, that to all timepoints is definite which information can be transferred and where to and which information can be computed in parallel. This gives a different perspective, especially for optimization techniques. A wide range of technical problems exists, which can be solved by this change in perspective. The computation block nodes connect the location of an information (bit-pattern) in a computation framework with the time this information is used in a program. This is backed by the elementary physical principles of computing in a classical infrastructure. The following example with nested loops and arrays shows this effect good: the branches in the loop definitions can be translated to a read and write of data points with according to arrays when distributed over parallel computation block nodes.

The inventive method splits a code into segments of computation and where the resulted information has to be transported. Therefore, by the definition of the computation block nodes the inventive method generates a matrix system where it is given, that instructions are grouped which base on the same information and the constraint that during any given timepoints nowhere else the same information is needed in the infrastructure. The grouped instructions are not further splitable, because as it is not possible to reach a faster computation for a particular group of instructions, because the transport in any form would be longer then to compute this given chain in the computation block nodes. As shown the generic nature of the computation and transfer matrices makes it possible to optimize the split code to a most concurrent as possible solution for a given hardware. The ratios of computations and transports are depending on the target hardware and the method provides different solutions to split to different ratios for a given code. By translating the graph of dependencies into matrices these can be used in a more effective way to map/optimize the split code to a target platform, including the specific properties of this infrastructure (e.g. GPU need another handling of transfer/computation distribution, than CPUs). But it is not essential to use the matrices and the optimization/mapping could be done directly on the graph/tree structure.

(vi) "Idle Time"-"Latency Time"

The latency times, as defined herein, is given by the idle time of a processing units 21 between transmitting data back to the parallel processing system 2 after having processed a specific block of instructions of the processing code 32 on data by a processing unit 21 and receiving data (i.e. after retrieving and/or fetching the data) necessary for execution of a consecutive block of instructions of the processing code 32 by the same processing units 21. In contrast, idle time of a processing unit can be defined herein as the amount of time the processing unit is not busy between two computational block nodes, or, otherwise, the amount of time it executes a system's idle process. Thus, idle time allows to measure unused capacity of a processing unit of the parallel processing system. Maximum speed-up, efficiency and throughput are the ideal cases of parallel processing but these are not achieved in the practical cases, as the speedup is limited due to various factors contributing to the idle time of a processing unit. Idle time of a processing unit, as used herein, can find its origin in various causes, inter alia, comprising: (A) Data dependency between successive computational block nodes, (i.e. tasks which cannot further be split up framed by read/write operation): There may be dependencies between the instructions of two computational block nodes. For example, one instruction cannot be started until the previous instruction returns the results, as both are interdependent. Another instance of data dependency will be when that both instructions try to modify the same data object, also referred to as data hazards; (B) Resource Constraints: When resources are not available at the time of execution then delays are caused in pipelining. For example, if one common memory is used for both data and instructions and there is need to read/write and fetch the instruction at the same time then only one can be carried out and the other has to wait. Another example is of limited resource like execution unit, which may be busy at the required time; (C) Branch instructions and interrupts in the program: A program is not a straight flow of sequential instructions. There may be branch instructions that alter the normal flow of program, which can delay the execution and affect the performance. Similarly, there can be interrupts that postpones the execution of next instruction until the interrupt has been serviced. Branches and the interrupts can have damaging effects on the minimization of the idle times.

It is to be noted, that the task of minimizing idle times is also sometimes referred to as "load balancing", which denotes the goal of distributing the work among the processing units so that all processing units are kept busy in the ideal case all of the time.

(vii) "Elementary Instructions"

The term "elementary operations", as used herein, refers to machine operations that contains no simpler operations. The execution of an instruction consists typically in the successive execution of some number of operations, including such operations as resetting a register, resetting memory storage, shifting a character in a register left or right by one place, and transferring data between registers as well as the comparing of data items and logical addition and multiplication. A set of elementary operations can provide a structure for executing a specific instruction. Elementary operations comprise basic logical functions of logic gates comprising AND, OR, XOR, NOT, NAND, NOR and XNOR. Such elementary operations can be assumed to take a constant amount of time on a given processing unit and may change only by a constant factor when run on a different processing unit 21 or parallel processing system 2.

In a first step, described more detailed below, the present inventive system transforms a source code into a sequence or code 32 of elementary operations 321, . . . 325 structured in loops, branches and sequences. It is independent from platform and compiler optimization level, and hence the same transformation can be used to optimize execution time on any platform.

The present approach is based on decomposing a piece of source code 31 written in a programming language to elementary operations 32/321, . . . 325, i.e. distinct transformed parts of the source code 31. The set of elementary operations is finite for each processing unit with several subsets: integer, floating point, logic and memory operations. These sets are corelated to parts of the architecture of a processor and the memory data-paths. The elementary operations, as used herein, can e.g. be classified in various levels as follows: The top level contains four operation classes: INTEGER, FLOATING POINT, LOGIC and MEMORY. Second level of classification can be based on the origin of operands (i.e. location in memory space): local, global or procedure parameters. Each group can show different timing behavior: local variables, being heavily used, are almost always in cache, while global and parameter operands must be loaded from an arbitrary address and can cause a cache miss. Third level of classification is by operand type: (1) scalar variables and (2) arrays of one or more dimensions. Pointers are treated as scalar variables when the value of pointer is given using a single variable, or as arrays when the value of pointer is given using multiple variables. Operations which belong to INTEGER and FLOATING POINT classes are: addition (ADD), multiplication (MUL) and division (DIV). LOGIC class contains logic operations (LOG): (i.e. AND, OR, XOR and NOT) and shift operations (SHIFT): operations that perform bitwise movement (e.g. rotation, shift, etc.). Operations in MEMORY class are: single memory assign (ASSIGN), block transaction (BLOCK) and procedure call (PROC). MEMORY BLOCK represents a transaction of a block of size 1000 and it can only have array operands. MEMORY PROC represents a function call with one argument and a return value. Arguments can be variables and arrays, declared locally or given as parameters of the caller function, but not global.

DETAILED DESCRIPTION OF THE PREFERRED EMBODIMENTS

Figure 12:
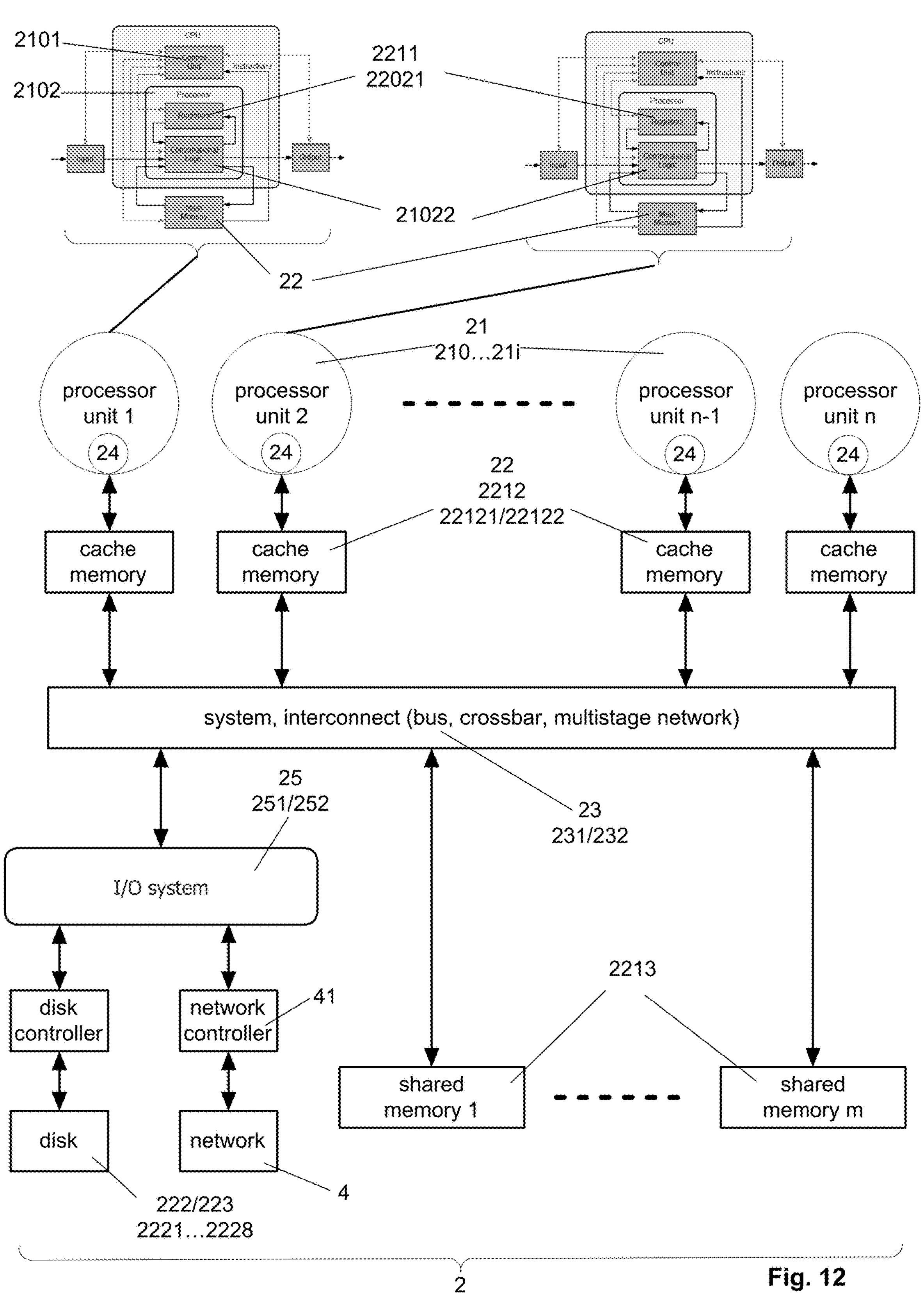
FIG. 12 shows a block diagram schematically illustrating an exemplary multiprocessor system 2 having two or more processing units 21 (multiple processors) each sharing main memory 22/221/222/223 and peripherals 25, in order to simultaneously process program codes 3.
Figure 13:
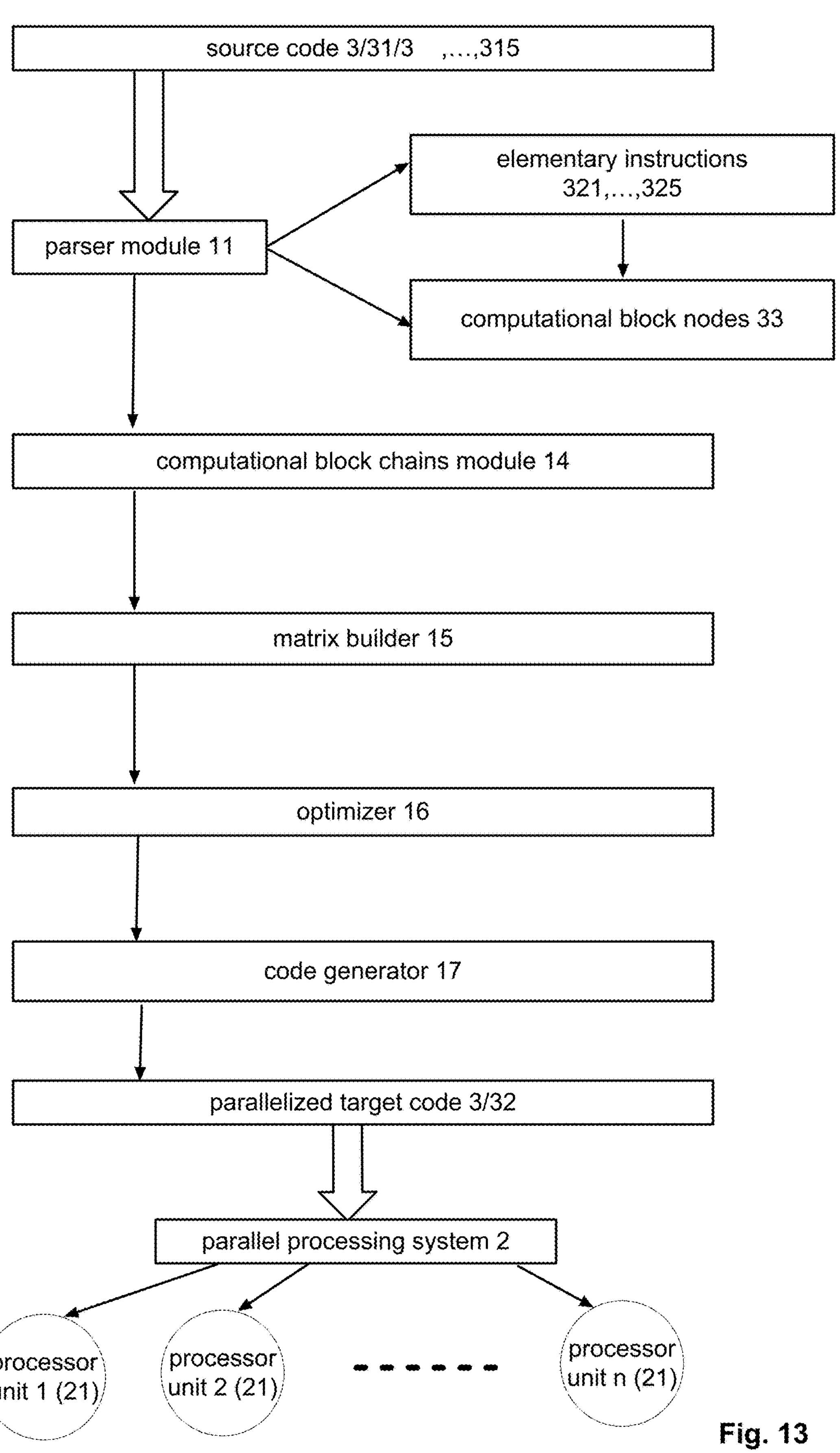
FIG. 13 shows a block diagram schematically illustrating an exemplary embodiment variant according to the present invention with the source code 31 as input code to the auto-parallelizing compiler system 1 comprising the parser 11, the computational block chains module 14, the matrix builder 15, the optimizer 16, the code generator 17, the auto-parallelizing compiler system 1 generating the parallelized and optimized target code 32 as machine or assembler code for execution by the parallel processing system 2 having a plurality of processing units 21 according.
Figure 14:
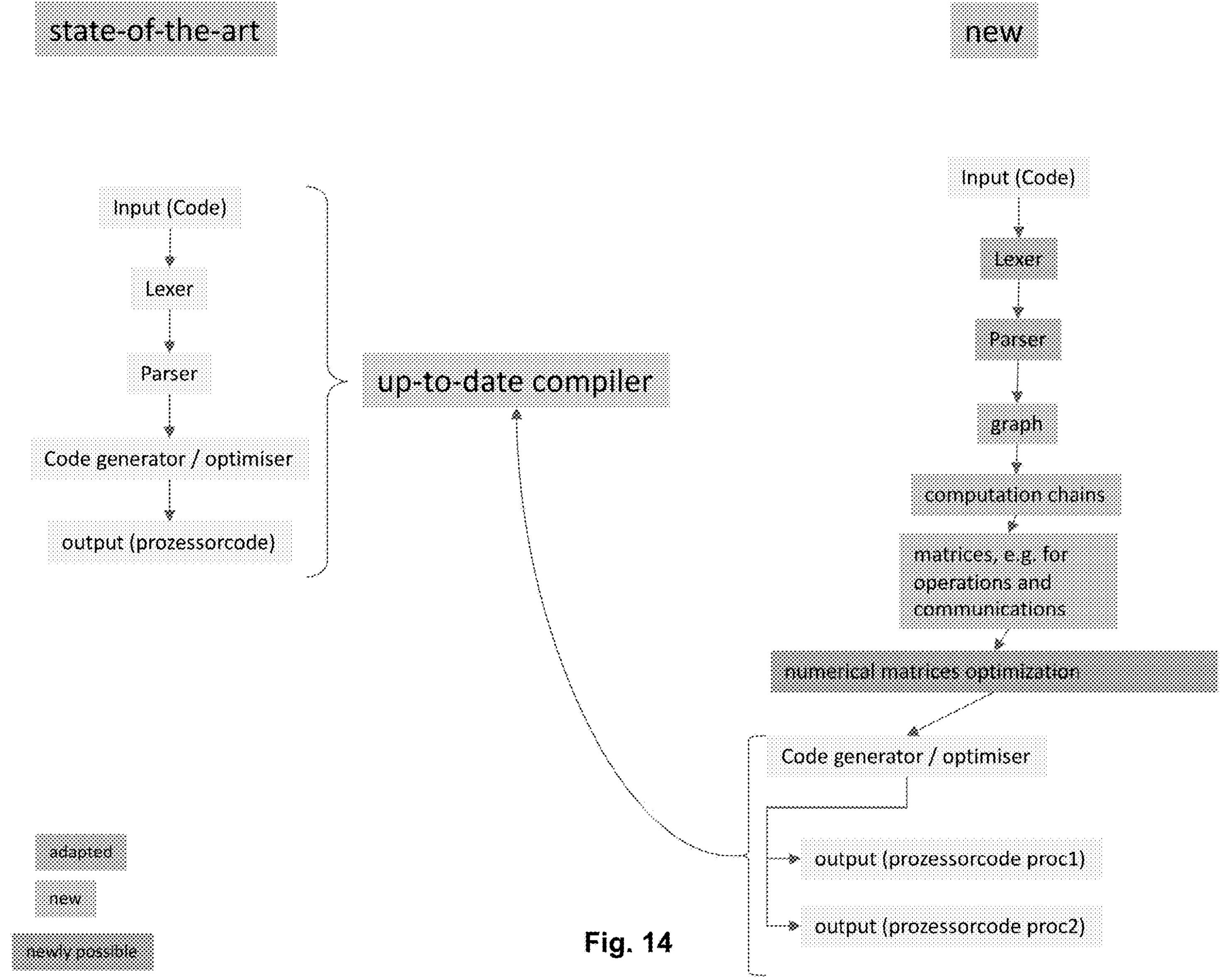
FIG. 14 shows a block diagram schematically illustrating an exemplary compiler system as known by the prior art systems, in comparison to the inventive auto-parallelizing compiler system 1.

FIGS. 12 and 13 schematically illustrate an architecture for a possible implementation of an embodiment of the compiler system 1 for optimized compiling of a program code 3 for execution by a parallel processing system 2 having a plurality of processing units 21. It has to be noted that, herein, when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Further, some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, method, logic block, process, or the like, is conceived to be a self-consistent sequence of steps or instructions leading to a desired result. Embodiment variants described herein may be discussed in the general context of processor-executable instructions residing on some form of non-transitory processor-readable medium, such as program codes or code blocks, executed by one or more processors or other devices. Generally, program codes include routines, programs, objects, components, data structures, etc., that perform particular tasks or implement particular abstract data types. The functionality of the program codes may be combined or distributed as desired in various embodiments. The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product. For a firmware or software implementation, the methodologies may be implemented with modules (e.g., procedures, functions, etc.) having instructions that perform functions described herein. Any machine readable medium tangibly embodying instructions may be used in implementing methodologies described herein. For example, software codes can be stored in a memory and executed by one or more processors. Memory can be implemented within the processors, as e.g. registers, or external to the processors.

The various exemplary logical blocks, modules, circuits and instructions described in connection with the embodiments disclosed herein may be executed by one or more processors or processor units 21, such as one or more Central Processing Units (CPU) 210, e.g. comprising a control unit 2101, a processor 2102 with registers 21021 and combinational logic 21022, and/or Graphics Processing Units (GPU) 211, and/or Sound chips 212 and/or Vision Processing Unit (VPU) 213, and/or Tensor Processing Units (TPU) 214 and/or Neural Processing Units (NPU) 215, and/or Physics Processing Units (PPU) 216, and/or Digital Signal Processors (DSP) 217, and/or Synergistic Processing Units (SPU) 218 and/or Field-Programmable Gate Arrays (FPGA) 219 or any other processor units 21 known in the art as e.g. motion processing units (MPUs) and/or general purpose microprocessors and/or Application Specific Integrated Circuits (ASIC) and/or Application Specific Instruction Set Processors (ASIP), or other equivalent integrated or discrete logic circuitry. The term "processor" or "processor unit" 21 as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor 21 may be a microprocessor, but in the alternative, the processor may be any conventional processor, controller, microcontroller, or state machine. In the described embodiments, processing elements refers to a plurality of processors 21 and the associated resources such as memory or memory units 22. Some example methods and apparatuses disclosed herein that may be implemented, in whole or in part, to facilitate or support one or more operations or techniques for processing code in a plurality of processors. The multi-processing system 2 can also comprise processor arrays comprising a plurality of processors 21. Each processor 21 of the processor array may be implemented in hardware or a combination of hardware and software. Processor arrays can be representative of one or more circuits capable of performing at least a portion of information computing technique or process. By way of example but not limitation, each processor of a processing array can include one or more processors, controllers, microprocessors, microcontrollers, application specific integrated circuits, digital signal processors, programmable logic devices, field programmable gate arrays, or the like, or any combination thereof. As mentioned, the processors 21 can be any of general purpose Central Processing Unit (CPU), or special purpose processors such graphics processing unit (GPU) s, Digital Signal Processors (DSP), video processors or any other special purpose processors.

The invention comprises a compiler system 1 with sub-systems 11, . . . , 16. In a non-limiting embodiment, the sub-systems comprise at least lexer/parser 11 and/or an analyzer 12 and/or a scheduler 13 and/or a matrix module 14 and/or an optimizer module and/or a code generator 16. Further, they can also comprise processor arrays and/or memory. Compiler 1 segments code into code blocks. For the described embodiments, block or code blocks refer to a section or portions of code grouped together. Grouping enables groups of statements/instructions to be treated as if they were one statement, and to restrict the scope of variables, procedures and functions declared in a block so that they do not conflict with variables having the same name used elsewhere in a program for different purposes.

Figure 1:
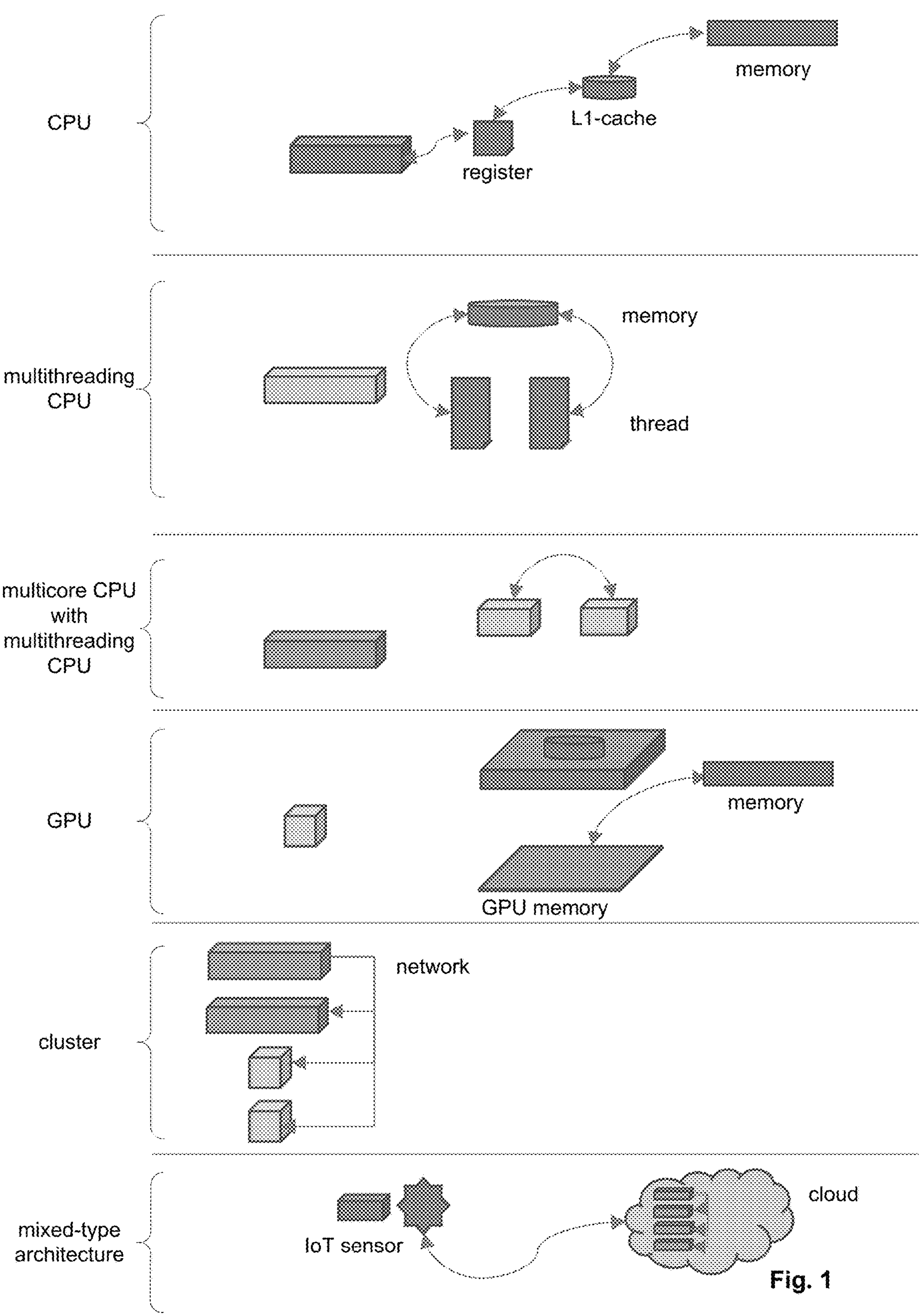
FIG. 1 shows a diagram schematically illustrating the formation of latency times under different modern computation infrastructures. (Micro-) processors are based on integrated circuits allowing to perform arithmetic and logical operations based on two binary values. For this, the binary values must be available for the processor's calculating unit. A processor unit needs to get the two binary values to calculate the result of an expression a=b operand c. The time it takes to retrieve the data for these operations is known as the latency time. There is a wide hierarchical range for these latency times from the register, L1-cache, memory access, I/O Operation or a network transfer, as well as processor configuration (e.g. CPU vs. GPU). As every single component has a latency time, the overall latency time for the calculation is a combination mainly of hardware components needed to get the data from one location to the other in a modern computation infrastructure.
Figure 2:
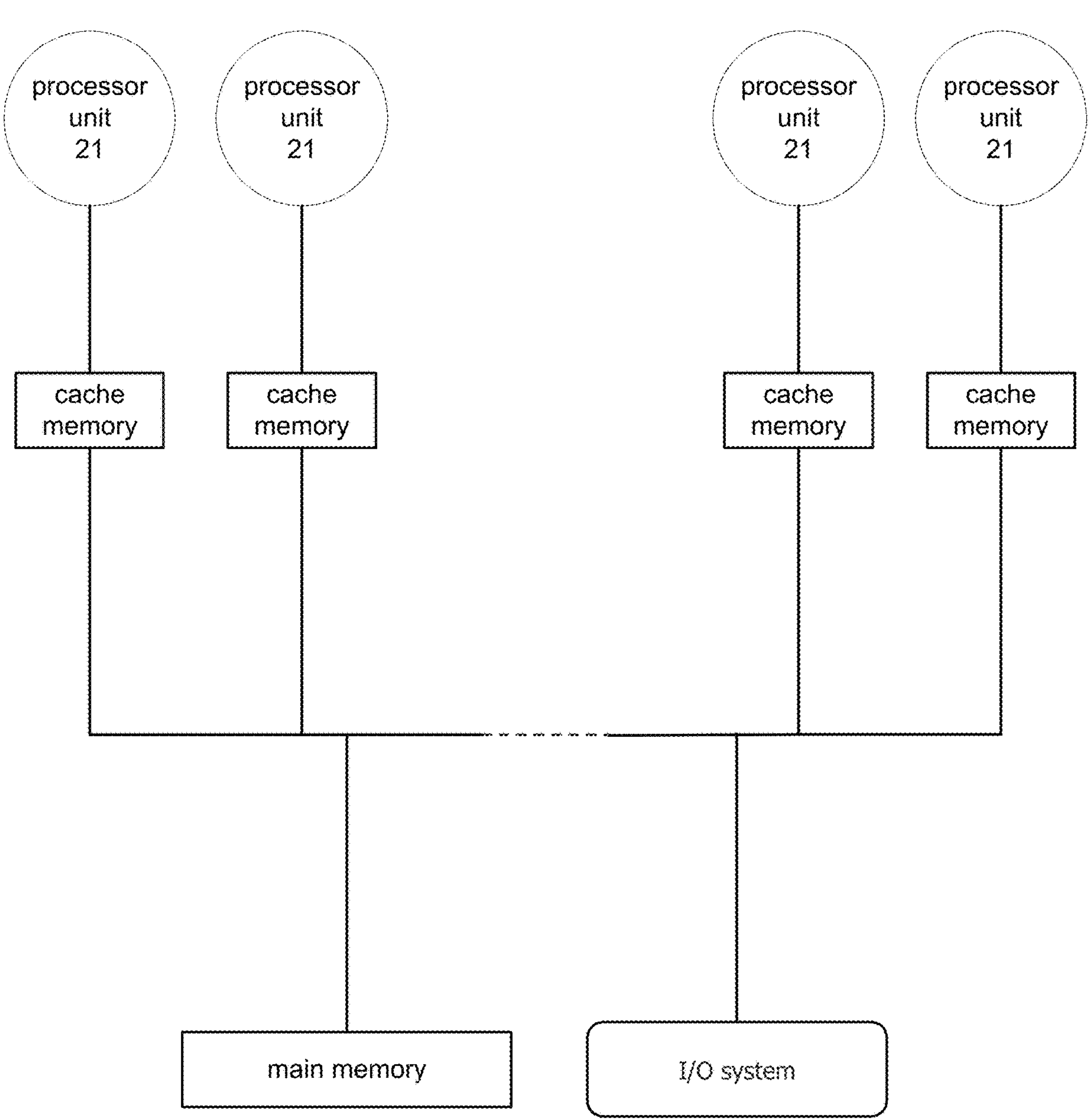
FIG. 2 shows a block diagram schematically illustrating shared memory multiprocessors as one class of parallel machines giving basis to the shared address programming model as top layer parallel programming. In the shared memory multiprocessors architecture, the assumption is taken that in this computer system a processor and a set of I/O controller are allowed to access a collection of memory modules by some hardware interconnection. The memory capacity is increased by adding memory modules and I/O capacity is increased by adding devices to I/O controller or by adding additional I/O controller. Processing capacity can be increased by waiting for a faster processor to be available or by adding more processors. All the resources are organized around a central memory bus. Through the bus access mechanism, any processor can access any physical address in the system. As all the processors are assumed to be or in fact equidistant from all the memory locations, the access time or latency of all the processors is same on a memory location. This is called a symmetric multiprocessor.
Figure 3:
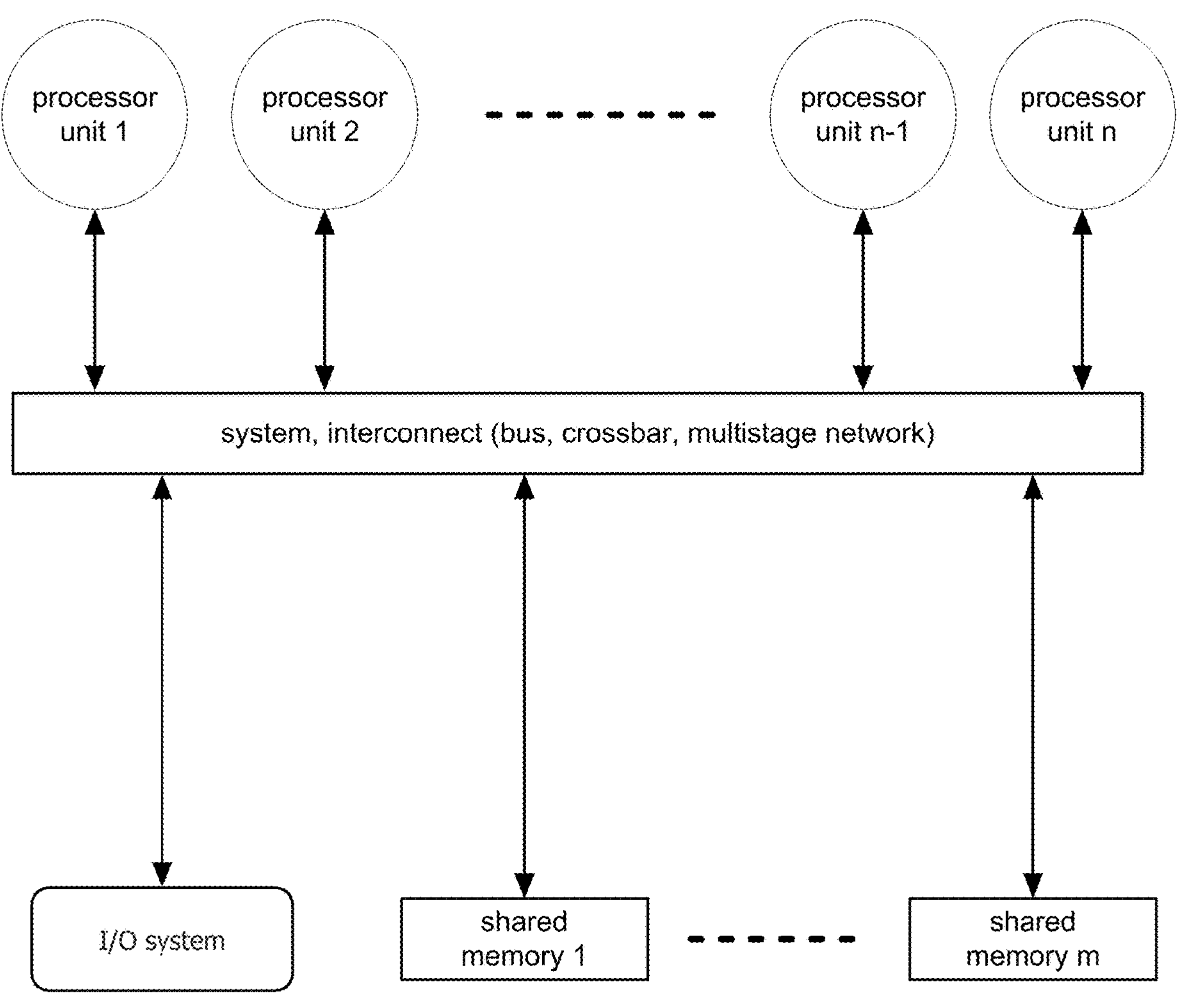
FIG. 3 shows a block diagram schematically illustrating an UMA-architecture, In the UMA-architecture, all the processors share the physical memory uniformly. All the processors have equal access time to all the memory words. Each processor may have a private cache memory. Same rule is followed for peripheral devices. When all the processors have equal access to all the peripheral devices, the system is called a symmetric multiprocessor. When only one or a few processors can access the peripheral devices, the system is called an asymmetric multiprocessor.
Figure 4:
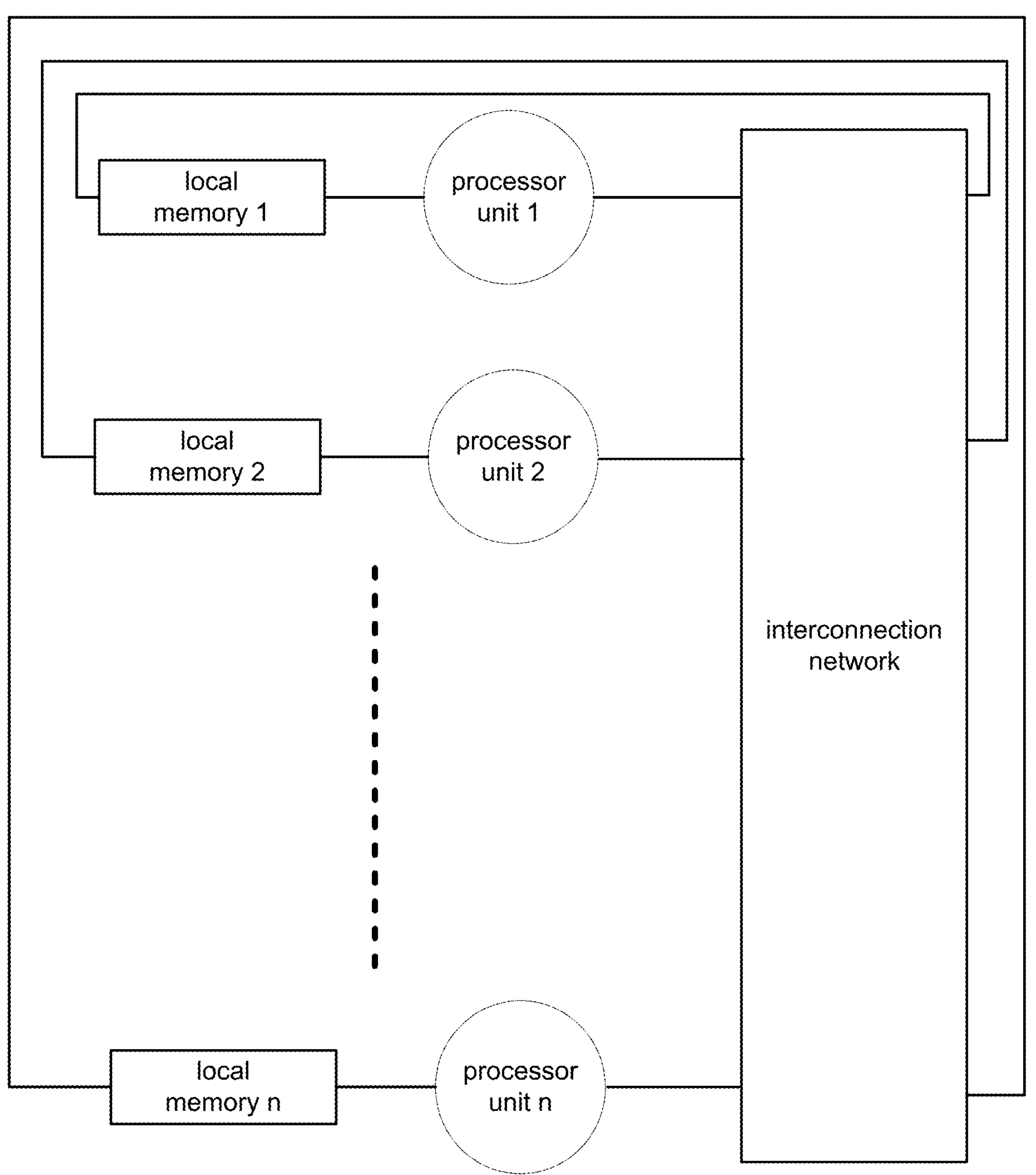
FIG. 4 shows a block diagram schematically illustrating a NUMA multiprocessor architecture. In the NUMA multiprocessor architecture, the access time varies with the location of the memory word. The shared memory is physically distributed among all the processors, called local memories. The collection of all local memories forms a global address space which can be accessed by all the processors.
Figure 5:
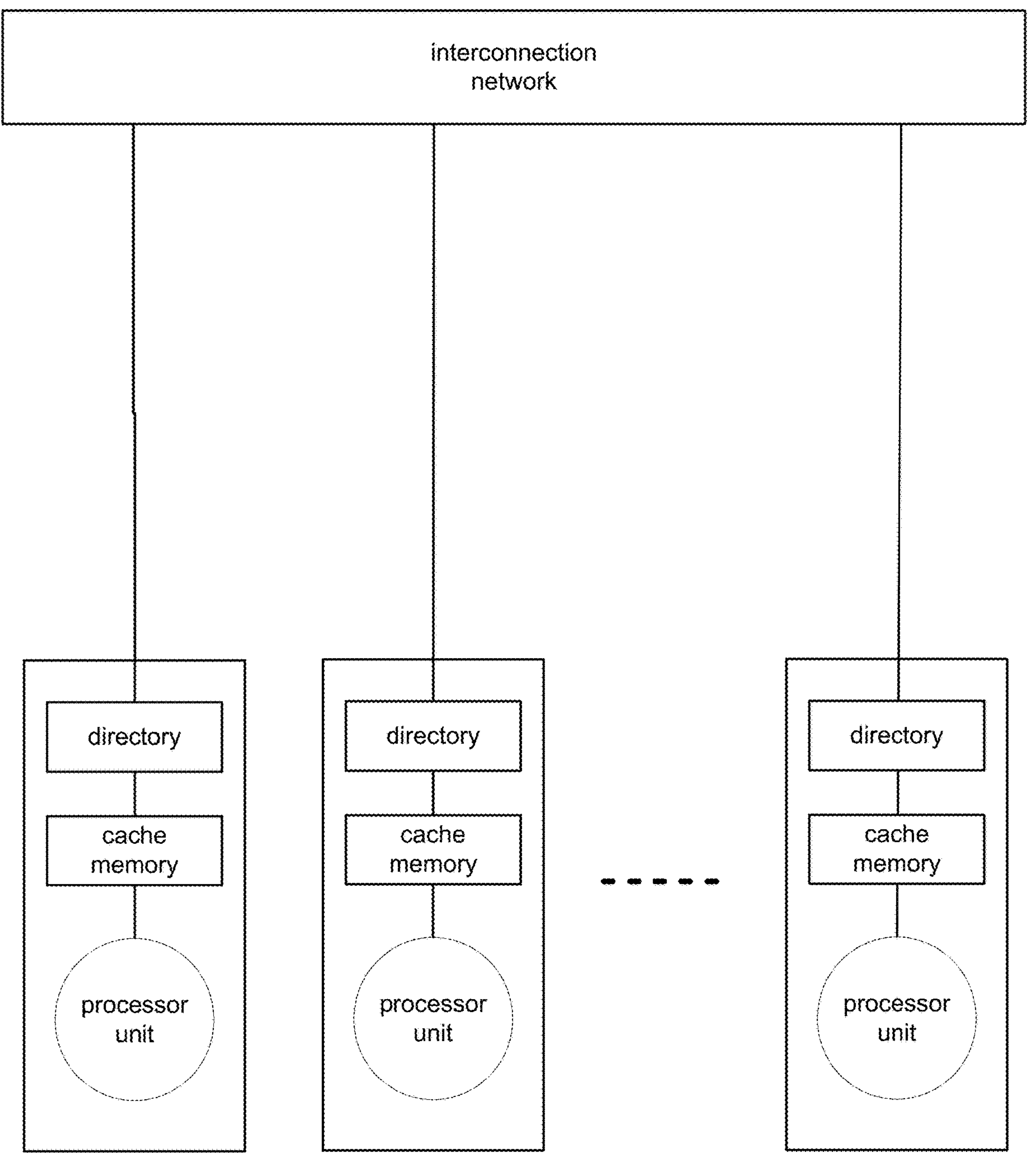
FIG. 5 shows a block diagram schematically illustrating a COMA multiprocessor architecture. The COMA multiprocessor architecture is a special case of the NUMA multiprocessor architecture, where all the distributed main memories are converted to cache memories.

The above-mentioned memory or memory units 22 of the parallel processing system 2 can comprise any memory to store code blocks and data. Memory 22 may represent any suitable or desired information storage medium. Memory may be coupled with processor units 21 and/or processing array. As used herein the term "memory" 2 refers to any type of long term, short term, volatile, nonvolatile, or other memory and is not to be limited to any particular type of memory or number of memories, or type of media upon which memory is stored. Memory 2 can e.g. comprise primary storage units 211 as processor registers 2111 and/or processor caches 2112 comprising multi-level caches as L1-cache 21221, L2-cache 21222, etc. and/or Random Access Memory (RAM) units 2113. In respect to this application, it has to be noted that the issue of the multi-level caches lies in the tradeoff between cache latency and hit rate. Larger caches have better hit rates but longer latency. To address this tradeoff, multiple levels of cache can be used, with small fast caches backed up by larger, slower caches. Multi-level caches generally operate by checking the fastest, level 1 (L1) cache first. If it hits, the processor can proceed at the higher speed. If that smaller cache misses, the next fastest cache (level 2, L2) is checked, and so on, before accessing external memory. As the latency difference between main memory and the fastest cache (cf. FIG. 1) has become larger, some processors have begun to utilize as many as three levels of on-chip cache. The memory 2 can further e.g. comprise secondary storage units 212 and/or third storage units 213 (e.g. tape backup etc.), the secondary storage units 212 comprising e.g. Hard Disk Drives (HDD) 2121 and/or Solid-State Drives (SSD) 2122 and/or Universal Serial Bus (USB) memory 2123 and/or flash drives 2124 and/or optical storage devices (CD or DVD drives) 2125 and/or floppy disk drives (FDD) 2126 and/or RAM disks

2127 and/or magnetic tapes 2128 etc. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information. As such, in a particular implementation, such a change of state of the portion of the storage media to store a signal representative of information constitutes a transformation of storage media to a different state or thing. As mentioned above, memory 2 can e.g. comprises random access memory (RAM) such as synchronous dynamic random access memory (SDRAM), First-In-First-Out (FIFO) memory, or other known storage media.

(Micro-) processors are based on integrated circuits, which makes it possible to do arithmetic and logical operations based on (two) binary values (in the simplest 1/0). For this, the binary values must be available for the processor's calculating unit. A processor unit needs to get the two binary value to calculate the result of an expression a=b operand c. The time it takes to retrieve the data for these operations is known as the latency time. There is a wide hierarchical range for these latency times from the register, L1-cache, memory access, I/O Operation or a network transfer, as well as processor configuration (e.g. CPU vs. GPU). As every single component has a latency time, the overall latency time for the calculation is a combination mainly of hardware components needed to get the data from one location to the other in a modern computation infrastructure. The difference between fastest location for a CPU (or GPU) to get data and the slowest can be huge (in the range of factor>10^9).

Latency from a general point of view is the time delay between the cause and the effect of some physical change in a system being observed or measured. The latency, as used herein, is directly related to the physical structure of the multi-processing system 2. Multi-processing systems 2 comprise processor units 21 based on integrated circuits, which makes it possible to do arithmetic and logical operations based on (two) binary values (in the simplest 1/0). Those binary values must be available for the processor's calculating unit. A processor unit needs to get the two binary value to calculate the result of an expression a=b operand c. The time it takes to retrieve the data for these operations is known as the latency time. There is a wide hierarchical range for these latency times from the register, L1-cache, memory access, I/O Operation or a network transfer, as well as processor configuration (e.g. CPU vs. GPU). As every single component has a latency time, the overall latency time for the calculation is a combination mainly of hardware components needed to get the data from one location to the other in the multiprocessing system's infrastructure. It is worth noting that the speed of microprocessors has increased by more than a factor of ten per decade, but the speed of commodity memories (DRAMs) has only doubled, i.e., access time is halved. Therefore, the latency of memory access in terms of processor clock cycles grow by a factor of six in 10 years. Multiprocessor systems 2 intensify the problem. In bus-based systems, the establishment of a high-bandwidth bus between the processor and the memory tends to increase the latency of obtaining the data from the memory. When the memory is physically distributed, the latency of the network and the network interface is added to that of the accessing the local memory on the node. Latency usually grows with the size of the multiprocessing machine 1, as more nodes imply more communication relative to computation, more jump in the network for general communication, and likely more contention. The main goal of parallel computing hardware design is to reduce the overall used latency of the data access by maintaining high, scalable bandwidth while the main goal of parallel processing coding design is to reduce the overall idle time of the processor units 21. In general, idle time of the processor units 21 may have several causes, as the latency of memory access, deadlocks or race conditions, e.g. if the sequence or timing of the code blocks or threads processed by the processor units 21 depend mutually, i.e. depend on the relative timing between interfering threads. As used herein, deadlock is a state in which a member of the processor units 21 is waiting for another member's output, e.g. the output of an instruction block processed by another processor unit 21, to take action. Deadlock is a common problem in multiprocessing systems 1, parallel computing, and distributed systems, where software and hardware locks are used to arbitrate shared resources and implement process synchronization. Thus, a deadlock, as used herein, occurs when a process or thread enters a waiting state because a requested system or data resource is held by another waiting process or not yet achieved by the process, which in turn can be waiting for another resource or data held by another waiting process. If a processor unit 21 is unable to further process because the resources requested by it are being used by another waiting process (data access or output of an not yet finished process of another processor unit 21), then this is denoted herein as a deadlock leading to idle time of the respective processor unit 21.

The compiler system 1 comprises means for translating a source programming language 31 of the computer program 3 into a machine code 32 as target programming language generating a processing code 3.1, . . . , 3.*n* comprising a number of instructions executable by the plurality of processing units 21 of the parallel processing system 2 or controlling the operation of the plurality of processing units 21. The source programming language can e.g. be a high-level programming language 31. The high-level programming language 31 can e.g. comprise C and/or C++ 311 and/or python 312 and/or Java 313, Fortran 314, OpenCL (Open Computing Language) 315 or any other high-level programming language 31. It is important to note, that the auto paralleling compiler system 1 can also be applied to machine code 31 or assembler code 31 as source code to achieve parallelization of the code. In this case, the translation of the high-level language to machine code instructions does not have to be performed by the compiler system 10.

The parallel processing system 2 comprise memory units 22 comprising at least main execution memory units 221/2212 comprising a plurality of memory banks for holding data of at least parts of the processing code 32, and transition buffer units 221/2211 comprising high speed memory for storing starting locations of the processing code 32 and data segments at least comprising branch or jump instructions and/or used memory references and data values, wherein the main execution memory units 2212 provide a slower access time than the transition buffer units 2211. The transition buffer units 2211 can e.g. comprise cache memory modules 2211 and/or L1-cache 22121.

The execution of the processing code 32 by the parallel processing system 2 comprises an occurrence of latency times 26, the latency times being given by idle time of a processing units 21 for retrieving and/or saving data necessary for execution of a specific block of instructions of the processing code 32 by the processing units 21. The latency time can e.g. comprise register 2211 access time and/or L1-cache 22121 access time and/or memory 2213 access time and/or I/O operation time and/or data network transfer time and/or processor configuration time.

The compiler system 1 comprises a parser module 11 for translating the source programming language 31 into a code 32 of elementary instructions directly executable by the processing units executable by the number of processing units 21, the elementary instructions selectable out of a processing unit specific set of elementary instructions comprising arithmetic operations 321 and/or logic operations 322 and/or control operations and/or I/O operations, in particular variable and array declarations instructions 323, compare operation instructions 324, and code flow instructions 325, for the number of processing units 21. The arithmetic operations 321 can e.g. comprise the operations addition, subtraction, multiplication and division. The logic operations 322 can e.g. comprise a number of logical expressions like equal, not equal, greater than, less than, greater than or equal, less than or equal. The control operations can e.g. comprise a "branch expression" and/or a "loop expression".

As an embodiment variant, at least two of the processing units can e.g. have different sets of elementary instructions. The different processing units having different sets of elementary instructions can e.g. comprise Central Processing Units (CPU) 210, Graphics Processing Units (GPU) 211, sound chips 212, Vision Processing Unit (VPU) 213, Tensor Processing Units (TPU) 214, Neural Processing Units (NPU) 215, Physics Processing Units (PPU) 216, Digital Signal Processors (DSP) 217, Synergistic Processing Units (SPU) 218, Field-Programmable Gate Arrays (FPGA) 219 etc.

The parser module 11 comprises means for partitioning the code of elementary instructions into computation block nodes 333 each consisting of a smallest possible segmentation of non-further decomposable units each comprising a sequence of the elementary instructions requiring the same input data. Two or more computation block nodes 333, each with chains of elementary instructions, form a computation chain 34 creating an ordered flow of operations/instructions on the input data. The chains in the computation block nodes 333 (sequence of the elementary instructions) are built by a fixed rule: The instruction is placed at the position in the chain 34 where the new elementary instruction READs after the elementary instruction that WRITES the data point. This automatically forms a chain 34, which is data centered and maps the necessary, physically limited READ and WRITE operations in a computational register 2211, L1-cache 2212, network I/O or similar of a CPU 21.

The compiler system 1 comprises a matrix builder 15 for generating a number of numerical matrices 151, . . . , 15*i* out of the computation chains 34 depending on the latency times 26. In the graph from the computation chains 34, the dependencies of the system can be assessed, however they cannot simply be broken down into individual independent chains. There exist fusion and split situations of computation block 333 chains in the chains 34, resulting from data dependencies and/or code branches. The latency to distribute information in the hardware system is introduced as a physical time. By assigning each computation block node 333 at least this time interval length, each computation block node 333 in the graph or tree structure can be numbered according its position in the graph and given a block number and therefore giving computation block nodes 333 with same "temporal position" in the graph the same number. If a computation block node 333 has to be at least the length of the time it would take to distribute information in the system and should as many as instructions as possible have to be calculated during this time and each computation block node 333 has a number based on its position in the graph depending on the program flow, a set of matrix 151, . . . , 15*i* can be build.

The matrix 151, . . . , 15*i* also shows that they can be mathematically captured (a graph model based on CBs, CCs, etc. is not simply captured as a table/matrix). Thus, the data operations and communication are given and build numerical matrices, which can be optimized (changed) e.g. by using ML or AI, depending on the target platform and/or hardware setup.

The compiler system comprises a numerical matrix optimization module 16 using a numerical matrix optimization technique minimizing an overall occurring latency time as aggregated latency times 26 by providing an optimized structure of computational chains 34 being processed by the plurality of processing units 21, wherein by means of a code generator 17 an optimized machine code is generated for the plurality of processing units of the parallel processing system having an optimized overall latency times 26. The optimization can now be applied to the hardware infrastructure. The quantities that are important for the optimization are known in numerical form in the matrices 151, . . . , 15*i* for each time unit and for each independent chain and branch: E.g. from the contents in the matrices: (i) number of elementary instructions, which must be sequential, (ii) size of the data transfer from the computational block x in computation chain u and when this transfer is needed again on computational block y in computation chain v (where y>than x) (e.g. possible via network or combine computation blocks to let data be on the same cacheline). As an example: for a GPU the data should be copied from memory to GPU memory in one process step and then all elementary instructions with the same properties should be executed at once, but on CPU, operations with the same data should be on the same cache-line (CPU dependent) or operations of specific data types can be calculated on the corresponding CPUs with the necessary better instruction sets. In the inventive system, this always lead to a parallel code even without optimization, because the elementary elements are grouped in sequential groups in the CBs.

In summary, since (micro-) processors understand only elementary instructions, the source code 31 is split into these elementary instructions in order to achieve the most basic level of parallelization. (It is to be noted, that the present invention is also applicable to the technical problem of optimization of (micro-) processors being based on the principle of integrated circuits (IC), which are a set of electronic circuits. The mentioned instructions are linked with the configuration of the electronic circuits on the (micro-) processor and therefore the following topics are also applicable to any form of integrated circuits or vis-versa can be used to derive optimized integrated circuits (or configuration of electronic circuits or directly electronic circuits) for a given code, as a instruction can be seen as a form of a configuration of an electronic circuit representing a computation operation (e.g. +, −, manipulate data, etc.)). The following core points are key to the inventive system: (1) Elementary instructions of a processor system are combined according to their unique "READ" and "WRITE" behavior, i.e. forming a chain of instructions according to the rule: "an instruction writes to X1, a new instruction which reads to X1 is appended after the last instruction which writes to X1", in a chain of nodes and links to computation blocks 333; (2) If it is necessary to propagate an information/ data in the multiprocessor system 2, a new computation block 333 starts; (3) Each computation block 333 has a minimum time length. This is proportional to the length of time (latency), which is needed to propagate information (data or signal) to/from the block 333 in the hardware system; (4) In case of a graph model with two read data nodes, instruction node, and one write data node, which are connected by links, chains from the computation blocks 333 have places where two chains: (a) meet (e.g. because an instruction reads from two data points, which are written in two different computation blocks 333 or because a branch exists), (b) occur, e.g. if two computation blocks 333 can be started by reading simultaneously. If necessary, a graph model could e.g. also be based on more than 2 read nodes and several write nodes or combining several instructions in one operation/instruction node; and (5) These chains 34 can be broken down and the instructions and the necessary information transfers per discrete time interval could be captured in matrices. For example, each row is divided into columns (time interval one column) and contains the independent chains of instructions and the necessary information transfers to others. These are thus tangible for auto-optimization processes, in particular numerical optimization processes. This provides the basis for a fully automatic parallelization of source code. It has to be noted, that in the present auto-parallelization system 1, the graph model is not just based on a matrix or table representation but provides, inter alia, a multi-dimensional nested tree structure of a computation block graph, as task graph, associated to computation parallel chains 34, allowing the system 1 to assess properties that can be exploited for auto-parallelization, code optimization, computation block 333 scheduling, and even automated cost estimation or automatic mapping to different architectures of multi-processing system 2.

As mentioned, in the computation matrix, the cells containing the chain 34 of instructions given by the sequence of computation block nodes 333 forming the chain 34, and in the transfer matrix, the cells contain the transfer properties, i.e. the needed transfers to and from other computation block node 333. It is to be noted, that the transfer properties comprise of what information is needed in another computation block node 333. Depending on the level of the target infrastructure, this can be solved by classical compilation/controlled by the processor=transfer in cache (classic compiler distribute the data to register and cache) or explicitly shared by shared memory and guarded by a lock or explicitly send and received from/to different nodes in a cluster using e.g. the Message Passing Interface (MPI) protocol or send and received by a socket in a multicore Inter-Process Communication (IPC), etc., The transfer properties may have any form of communication, ranging from handled by the processor (cache) or explicit by a communication pattern (e.g. IPC via queue, MPI, etc.). This makes the inventive method scalable to a wide range of platforms and/or infrastructures. Thus, the transfer properties, for example, may comprise information as send data %1 (integer) to cell (1,7). Transfers and/or communications need a certain time, which typically directly dependent on the (transfer/communication) latency times in a particular system. Finally, it has to be noted, that, as mentioned, in a specific row of the computation matrix, the column cells comprise the flow or sequence of instructions wherein each column cell of the row comprises one computation block node 333 of the sequence of computation block nodes 333, forming the chain 34 of the specific row. However, in specific embodiment variants, not each cell of a row necessarily needs to comprise a sequence of instructions or an instruction. One or more of the cells of one or more specific rows of a computation matrix can also be empty. This is also true for the transfer matrix. Computation matrix and transfer matrix are normally equal in their size, i.e. number of rows and columns. The computation matrix and the matrix and transfer matrix providing a possible technical structure for the auto-parallelization.

Technically, the matrix builder connects the computation block nodes 333 according to the program flow (e.g. FIG. 35) and/or the code 32, respectively, from the parser module 11. The program flow is represented by connecting the computation block nodes 333 (similar to basic blocks), e.g. when adding a new instruction (=operation node), a new computation block node 333 can e.g. be generated, where, in general, there is no clear dependency (cf. FIG. 21), the new computation block node 333 being positioned after another computation block node 333 or under a branch node. After adding all instructions, it is possible to numbering each computation block node 333 along the program flow forming the sequence of the so generated chain 34. These numbers (block numbers) are equal to the column of the matrix. Computation block nodes 333 with same block numbers are distributed to different rows in the same column of the computation matrix.

Application of the Invention to Well-Known Technical Problems

In the following, it is illustrated how to derive a technical solution to well-known technical problems in the field of parallel processing by means of the inventive system and method.

(i) Computation of the Fibonacci Series

To generate and compute the Fibonacci series, different parallel-processing implementations with different performance properties are known. In the following, it is illustrated how the invention is applied to an implementation using a) recursive functions calls and b) loops. Both implementations show different performances. For understanding the processing problem, reference can, for example, be taken to https://www.geeksforgeeks.org/program-for-nth-fibonacci-number/. Below, there is an example of a processing code generating Fibonacci series using recursion.

```
//Fibonacci Series using Recursion
#include<studio.h>
int fib(int n)
{
  if (n <= 1)
    return n;
  return fib(n−1) + fib(n−2);
}
int main ( )
{
  int n = 9;
  printf("%d", fib(n));
  getchar( );
  return 0;
}
```

Further, below it is shown how parsing the function code of the fib(n) declaration results in a pseudo token language, with the function code of the fib(n). given by

```
int fib(n)
{
  if (n <= 1)
    return n;
  return fib(n−1) + fib(n−2);
}
```

and the pseudo token language given by the following table 1:

TABLE 1

| | |
|---|---|
| n, −, −, cfuncdef | cfuncdef (gid1, −, −) |
| n, 1, cmpV, <= | <=(gid1, 1, gid2) |
| cmpV, −, −, if | if (gid2, −, −) |
| n, −, −, return | return (gid1, −, −) |
| t1, n, 1, − | −(gid3, gid1, 1) |
| t1, 'fib', t2, callf | callf(gid3, tcbid, gid4) |
| t3, n, 2, − | −(gid5, gid1, 2) |
| t3, 'fib', t4, callf | callf(gid5, tcbid, gid6) |
| t2, 14, 15, + | −(gid4, gid6, gid7) |
| t5, −, −, return | return(gid7, −, −) |
| −, −, −, efuncdef | efuncdef(−, −, −) |

functions results in additional transfers, as can be seen in FIG. 42.

The next step is to number the computation block nodes depending on their call-position in the code. This results in a pseudo graph like schematically represented in FIG. 43, which in return results in the computation and transfer matrix as shown in FIGS. 44 and 45.

By combining start- and end-communication cells in the transfer matrix and eliminating empty cells in the computation matrix and bring them back to different code segments, results in FIG. 46. Based on this code segments a code can be generated directly (as a compiler) or transferred back to code and then using a SOTA compiler to generate machine code (as a transpiler).

To show how the inventive system and method brings advantages to the compiling of a recursive implementation according to the Fibonacci series, the following passages explain how the inventive method maps and/or optimize the code in a more concurrent solution than the input code. As indicated to optimize the code it is the combination between the rows, the graph is shown with the combination of the cbn in the branch node marked as branch2b (see FIG. 43) and combine them, see FIG. 48. Calling a function is in the method placing the computation block nodes to the correct location in the matrices, respectively to apply the corresponding transfers as indicated in FIG. 47. With this in mind, the recursive call of the function can be seen with the inventive method as a transfer and 'read' and 'write' of the function parameters and result variables in a return statement, FIG. 48.

According to the example of fib(4), FIG. 49 shows step-by-step how additional computational block nodes and the reducing of the transfers (as all is on one computation-chain) results in a more optimized source code.

The depth of this chain depends directly on the number n in fib(n). As recursive calls can be very simply detected in the code, it is easy to not implement a recursive call in full dimension in a final application. To make it understandable, FIG. 50 shows this with some simplification. Step 4 shows the cons for a call with 'n=4'.

The next step in FIG. 51 shows the transfer, which will be occur (transport the information of the last "write" to a data node to the place where the "read" of a data node occurs and remember this information in the corresponding computation block nodes). As all computations are on one chain, the transfers will vanish, as can be seen in FIG. 52. When resolving every step, this leads to a program of the form in FIG. 53.

Bring this using the matrix representation back to code, it can be seen as a result the code below. This results in a more efficient code, than the original fib(n=4) implemented by table 1, above. Respectively compiling this code with a SOTA compiler will result in a better optimized code, than without applying the method.

```
f(n) {
  if (n <= 1):
    return n;
  t1 = n−1
  t2 = f(t1)
  t3 = n−2
  t4 = f(t3)
  t5 = t2+t4
  return t5
}
main( ) {
  r1w = f(1)
  r0w = f(0)
  r2w = r1w+r0w
  r3w = r2w+r1w
  r4w = r3w+r2w
}
```

The recursive call can also be interpreted like an array operation applying the inventive method, as it is transferring an information (function parameter param[i]) to the corresponding cons in the branch node of the function declaration and then transfer back the return value(s) to a[i], see FIG. 54. This would lead to a perspective seen also in partial differential equation. This form of the implementation of the Fibonacci series will be references more below. However, as a next step, the next paragraphs will show the handling of Partial Differential Equation, which mostly result in nested loops and heavy use of array operations.

(ii) Partial Differential Equation (PDE)

With the rule to place an operation node in dependency of the "reading" and "writing" pattern and resolving not clear dependencies by a transfer, according to the patent application, it is possible to derive a compute- and communication-model for a freely given discretized implementation of a PDE. The PDE of a 2D heat equation will be used herein, with the 2D heat equation given by:

$$\frac{\partial u}{\partial t} - \alpha\left(\frac{\partial^2 u}{\partial x} + \frac{\partial^2 u}{\partial y}\right) = 0$$

Using a finite difference scheme to discretization:

$$u_{i,j}^{k+1} = \gamma\left(u_{i+1,j}^{k} + u_{i-1,j}^{k} + u_{i,j+1}^{k} + u_{i,j-1}^{k} - 4u_{i,j}^{k}\right) + u_{i,j}^{k}$$

FIG. 55 shows part of an implementation in python. Each entry in an array is a data node. Reading from an array index is in the method an operation node with data node of the index and the base address of the array. Array operations can be seen as operation nodes with corresponding data nodes, see FIG. 56.

For the example of a loop array with an array operation a[i+Δiw]=a[i] FIG. 57 shows the corresponding computation block nodes. With this in mind, the initial block (FIG. 55) can be expressed in detail in the graph like in FIG. 58. All computations in the computation block (see FIG. 55) happen in the j-loop. By using a 1D array notation and applying the fundamental rules of the method, a schematic form for the computation block node in the loop is derived as indicated in FIG. 59.

An array read (e.g. u[k][i+1][j]) would create a computation block node and the meta-data to transfer of the value to this index would be added to both cons, the one which the "reading" node and the one where the last time this data node was written (e.g. at a[k+1][i][j]). This leads to the fact, that a statement such as the array operations in the j-loop (FIG. 55), result in 5 computation block nodes, representing "reading" operations of the array, then a computation block node which computes the arithmetic solution and then a computation block nodes with the write to the array at the position [k+1][i][j]. This form of representation is a schematic perspective to show more clearly how the method take such array operations into account. This leads to a situation indicated in FIG. 60.

One of the most fundamental principles of the proposed method is to find the last operation node A, which "writes" to a data node B, and then place a new operation node C, which "reads" from B, after the operation node A. If it is not a clear 0- or 1-dependency, add a transfer to the computation block nodes containing the operation node A, respectively C. Therefore, a[i1]=a[12] is "reading" of data node with base-address 'a' and index 'i2' and "writing" to data node with base-address 'a' and index 'i1', see FIG. 56. Each loop creates therefore new computation block nodes with a "reading" or "writing" operation node and the corresponding transfers. It can be derived the following scheme, FIG. 61.

As a loop can be seen as in FIG. 61, showing that every loop passage is a new computation block node on a new computation-chain (row in matrix). As long as there are no transfers, these computation block nodes will be at the same time (results in the same block or segment number in the numbering process step), as empty computation block nodes and entries in the transfer matrix vanish. If a transfer occurs, the cons-numbers would be different, and they would not be computable in the same step. An offset in the index of the "reading", respectively "writing" operation can lead to a transfer between the computation block nodes containing the "reading", respectively "writing" operation nodes as can be seen in FIG. 62.

The dependencies in "reading" and "writing" of the indices in a loop leads to the conclusions in FIG. 63. If ΔI is smaller than 0, shows that the loop can be enrolled on as many computation block nodes as the loop is long. Long meaning the number of iterations defined by the start value 'i0' and the maximal value 'Ai' as well as the increment value 'Bi' in a loop definition, e.g. 'for i=i0; i< > Ai; Bi'. if ΔI is larger than 0, only ΔI computation block nodes can be run in parallel. If less than this number are used, transfer will occur. If the loop is resolved on more than ΔI units, the computation block nodes would not be parallel (meaning have the same number in the flow graph). Therefore, ΔI is a unique number to decide how a "reading", meaning using the information in an array at an index, but not change it, can be distributed on different computation units.

This has some important consequences: It is possible to extract from nested loops one single dimension to decide for each "reading" to an array, which of these readings lead to a "writing" within the loop, and which values are "readings" from data nodes before the loop. Therefore, for each "reading" it can be derived if there is a transfer to the computation block node (=computation-chain) of the "writing" part. This can be implemented as a model and leads to a new, pretty generic perspective on arrays in nested loops. Furthermore, it can be derived which of the nested loops can be resolved, means in the method to be computed parallel, because there is no transfer between a "reading" and a "writing" data node, according to the concept in FIG. 63. For the 2D heat equation with Central Difference Scheme, this results in the dependencies shown in FIG. 64. This means, that the i and j loop can be resolved, as ΔI are always smaller or equal than the number of iteration in the i- and j-loop, but not in the k-loop. Meaning the i- and j-loop can be resolved in the method. This means the "reading" and "writing" in the array will be distributed in computation block nodes, which can run parallel, but the k-loop has to be iterative. And after each k-loop transfers between the units will occur. At this point, keep in mind, that the method eliminates transfers in the mapping/optimization step, if they are on the same unit.

In most implementation to solve a PDE, computations occur only on a subset of an array (e.g. by handling boundary conditions differentially), what makes this step a bit cumbersome. With the example of two nested loops, for each loop-nest a rule can be derived to handle the gaps and the consequence to the "transfers" in the proposed model, as shown in FIG. 65. The const values are values from computations or definitions of operations before the loops in the "computation block" (see FIG. 55).

Incorporating the gaps occurring by the looping over a subset of the array, the transfer pattern of a discretized equation can be derived and a model for the transfers, depending on the gap-sizes, sizes of the loops (=in this case meshes) results and represents the computation block nodes of the method, as in FIG. 66.

Showing with a very small example of nX=5 and nY=4, this leads to the computation and transfer matrices as in FIG. 67. In the transfer matrix the arrows '→' indicate getting information and '←' indicating sending data to other computation block nodes.

The inventive method brings out all the necessary transfers/communication between the grid elements in the grid needed for the discretized PDE. FIG. 68 shows the occurring transfers between the units, as each unit is represented by one row in the matrices. In FIG. 68 it can be seen an extract of the transfer- and the computation-matrix, with dark grey the "receiving" side of a transfer and light grey the "sending" part of the transfer. It is important to note at this point, that this does NOT mean it has to be sent and received, it also can be e.g. shared by a shared memory segment and guarded by a barrier or lock or vanish as it is shared by cache and therefore handled by a CPU—it depends on the used transfer/communication mechanisms. This can be transferred to a model, respectively leads to a code of the form as shown in FIG. 69. It has to be noted, that the computations between p0 und p1 evolve, because the method is defined to add transfer from the "written" data nodes to the "reading" data nodes and as the array operations in the nested loop start with a "reading" operation node, this situation happens.

FIG. 70 shows how the transfers can be used to create a time model. Grey are the meta values (e.g. known from variable type definitions or similar), which also can be used to map/optimize the matrices to a given hardware infrastructure.

3 procs→(1,2), (3,4), (5,6)

$$\Delta t = \begin{pmatrix} \underline{2 \to 1} & 3 \to 2 \\ 0 & 5 \to 4 \\ \sout{6 \to 5} & 0 \end{pmatrix} \cdot \Delta t_{trans} + \begin{pmatrix} 0 & \underline{1 \to 2} \\ 2 \to 3 & 0 \\ 4 \to 5 & \sout{5 \to 6} \end{pmatrix} \cdot \Delta t_{rans} +$$

$$\begin{pmatrix} 4 \to 1 & 5 \to 2 \\ 0 & 6 \to 3 \\ 0 & 0 \end{pmatrix} \cdot \Delta t_{trans} + \begin{pmatrix} 0 & 0 \\ 0 & 1 \to 4 \\ 2 \to 5 & 3 \to 6 \end{pmatrix} \cdot \Delta t_{trans} + \begin{pmatrix} \Gamma & \Gamma \\ \Gamma & \Gamma \\ \Gamma & \Gamma \end{pmatrix} \cdot \Delta t_{latency}$$

-continued $$\Delta t = \begin{pmatrix} 3 \\ 4 \\ 3 \end{pmatrix} \cdot \Delta t_{trans} + \begin{pmatrix} 2*\Gamma \\ 2*\Gamma \\ 2*\Gamma \end{pmatrix} \cdot \Delta t_{latency} \text{ cache\_size} = \begin{pmatrix} 8 \\ 9 \\ 8 \end{pmatrix} \text{float\_size} \text{ transfer\_size} = \begin{pmatrix} 3 \\ 4 \\ 3 \end{pmatrix} \text{float\_size}$$

These values are not used in this example. To illustrate possible optimizing steps, a very simple model is shown fully resolved in the following FIG. 71, where a combination of row (1,2), (3,4) and (5,6) resulting in 3 units computing:

a combination of row (1,2,3) and (4,5,6) resulting in 2 units computing:

$$2 \ procs \ -> (1, 2, 3), (4, 5, 6)$$

$$\Delta t = \begin{pmatrix} \cancel{2 \to 1} & \cancel{3 \to 2} & 0 \\ \cancel{5 \to 4} & \cancel{6 \to 4} & 0 \end{pmatrix} \cdot \Delta t_{trans} + \begin{pmatrix} 0 & \cancel{1 \to 2} & \cancel{2 \to 3} \\ 0 & \cancel{4 \to 5} & \cancel{5 \to 6} \end{pmatrix} \cdot \Delta t_{trans} + \begin{pmatrix} 4 \to 1 & 5 \to 2 & 6 \to 3 \\ 0 & 0 & 0 \end{pmatrix} \cdot \Delta t_{trans} + \begin{pmatrix} 0 & 0 & 0 \\ 1 \to 4 & 2 \to 5 & 3 \to 6 \end{pmatrix} \cdot \Delta_{trans} + \begin{pmatrix} \Gamma & \Gamma & \Gamma \\ \Gamma & \Gamma & \Gamma \end{pmatrix} \cdot \Delta t_{latency}$$

$$\Delta t = \begin{pmatrix} 3 \\ 3 \end{pmatrix} \cdot \Delta t_{trans} + \begin{pmatrix} 3*\Gamma \\ 3*\Gamma \end{pmatrix} \cdot \Delta t_{latency} \quad \text{transfer\_size} = \begin{pmatrix} 3 \\ 3 \end{pmatrix} \text{float\_size} \quad \text{cache\_size} = \begin{pmatrix} 11 \\ 11 \end{pmatrix} \text{float\_size}$$

and a combination of all rows (resulting in a 1 unit computing without any transfers):

1 proc→(1,2,3,4,5,6)

$$\Delta t = (0) \cdot \Delta t_{trans} + (6*\Gamma) \cdot \Delta t_{latency} \quad \text{transfer\_size} = (0) \text{ float\_size} \quad \text{cache\_size} = (16) \text{ float\_size}$$

These steps show exemplary how the method creates different ratios between computing and communications and how depending on the combination the transfers are reduced and the computations per unit are getting higher. To make this more illustrative, a very simple model of computing and communicating can be used and some "real values" for the times assumed. Two generation of Intel CPUs with according to performance values for their floating point capabilities per cycle (FP) and their frequency lead to a power value for these to compute floating point arithmetics (like T in the model). We used for a P5 FP32: 0.5 and a Haswell FP32: 32 with a frequency for the cycles of 66 MHz and 3.5 GHz and for addition and multiplication of a float value 4 cycles. To get a value for the Δtransfer, representing the communication latency in the network (the author knows that there were made a lot of assumptions and the latency is not the only key value for a network), two types of latencies are used: Ins for an infiniband type and 50 ns for a cache latency. The behavior in FIG. 72 can be derived for a grid of nX=2048 and nY=1024 by Δt=number of combined cbn*cpu+number of transfers*network latency.

It is always straight forward to get code back from the method, respectively the two matrices, adapted to the available IPC options. This generic form of optimizing code brings a novelty to the field of automatic code parallelization. For example, the code can be optimal mapped e.g. to an MPI-cluster infrastructure or with some more fine grained tuning applying a Hybrid approach by combining MPI (shared memory) and threading locally on nodes. By different combinations (e.g. combine the first x cons in i-direction and the y cons in j-direction) it is possible to get an optimal ratio between "computation" and "communication" for any given discretized PDE but depending on the available hardware infrastructure. This can be done without any by-hand interaction as the necessary properties can also be tested, or computed for an available hardware infrastructure, solving real technical problems of the prior art.

(iii) Fibonacci Using Loop

The Fibonacci source can also be implemented using loops.

```
//Fibonacci Series using Dynamic Programming
#include<studio.h>
int fib(n)
{
  /* Declare an array to strore Fibonacci numbers. */
  int f[n+2];   // 1 extra to handle case, n=0
  int 1;
  /* 0th and 1st number to the series are 0 and 1 */
  f[0] = 0;
  f[1] = 1;
  for (i=2; i<=n; i++)
  {
    /* Add the previous 2 numbers in the series and store it */
    f[i] = f[i-1] + f[i-2];
  }
  return f[n];
}
int main( )
{
  int n=9;
  printf("%d", fib(n));
  getchar( );
  return 0;
}
```

According to the example with the 2D heat equation, this leads to the result in FIG. 73, and, in return, results in a source code of the form:

```
main( ) {
  a1 = f(1);
  b1 = f(0)
  for (i=0; i<=(n-1)/2; i++) {
    c1 = a1+b1
    a2= c1
    b2 = b1
    c2 = a2+b2
    a1 = c2
    b1 = c1
  }
}
```

This has the similar performance properties as the result the code of FIG. 53, shown above.

(iv) Pointer Disambiguation

Pointer disambiguation is also a technical problem not solved completely (see e.g. Runtime pointer disambiguation by P. Alves). Applying the inventive method, it can be shown, that the inventive methodology resolves the disambiguation occurring by passing function parameters as pointers, because it takes the pointer as an information and this disambiguation will be resolved in the step of the transfer vanishing, as illustrated by FIG. 74.

Difference of the Inventive System to Exemplary Prior Art System

The various approaches, as known by the prior art differ essentially by their technical approach. In the following, the essential difference to three of the prior art systems are detailed explained in order to further illustrate the inventive system and method.

(a) Slicing based code parallelization for minimizing inter-process communication by M. Kandemir et al. (hereafter Kandemir) discloses a method for scalable parallelization that minimizes inter-processor communication distributed memory multi-core architectures. Using the concept of iteration space slicing, Kandemir discloses a code parallelization scheme for data-intensive applications. This scheme targets distributed memory multi-core architectures, and formulates the problem of data-computation distribution (partitioning) across parallel processors using slicing such that, starting with the partitioning of the output arrays, it iteratively determines the partitions of other arrays as well as iteration spaces of the loop nests in the application code. The goal is to minimize inter-processor data communications based on this iteration space slicing based formulation of the problem. However, Kandemir does this with the portioning of output array, by iteratively determining the partition of other arrays in the application code (see p. 87). This is a different approach, because the inventive method, disclosed herein, does not include an iterative determination of array parts, which are combined. The inventive method gets this information directly from the code. As disclosed on p. 88 Kandemir, program slicing was originally introduced by Weiser in a seminal paper. Slicing means extracting statements form a program that potentially have an influence on a specific statement of interest, which is the slicing criterion (cf. Advanced slicing of sequential and concurrent programs by J. Krinke). Slicing techniques showing similar effects as the well-known points data/control dependences (cf. Computer architecture by D. Patterson, p. 150ff) and data flow analysis (e.g. [8]). Our method resembles on the first impression these methods. This comes from the fact, that statements, blocks in programs, data dependencies are one of the most central points in programing and compiling, but the inventive method, disclosed herein, has a different perspective. The novelty is in this new approach providing a new perspective, respectively the definition of the computation block nodes, as indicated by the report. The inventive method explicitly takes each variable as a unique information (represented by one particular bit-pattern) and as the computing instruction (=statement) can only be performed with available bit-patterns (in accessible storages, e.g. in CPU registers), the inventive method extracts the time between the modification and the use of a variable at a "location" (e.g. a register). No SOTA compiler known extracts this time out of the (source) code nor focus on the single data entities (bit-pattern) in a statement—all known prior art systems use always as a focus the result of a complete statement. As Kandemir discloses (p. 89), using iteration space slicing, one can answer questions such as "Which iterations of which statements might affect the values of a given set of elements from arrayA". This shows a different perspective, where the inventive method derives exactly this affection in a generic form of finding the «read» and «write» on each element of the array and brings this delay time of "reading" and "writing" in correlation to the time needed to transfer an element. It finds this «affect» and do not try to find it by «simulating» the interaction with linear algebra methods, respectively by iterative methods. On p. 91, Kandemir summarizes the function that returns the set of loop iterations to be assigned to processor p from loop nest s, where $Z_{p,r}$ is the set of data elements accessed by processor p from array Ar. In contrast to this, the inventive system and method is not based on this approach: the inventive method and system derives first all dependencies of the code (also in the nested loops), then it creates matrices for all code in the program and at the end we map/optimize by combining of the matrices all operations of a program. Kandemir's method creates a matrix for the array loop index dependencies and derives by assigning them to processors and then finds (see Kandemir p. 92) how very iterative this approach is needed to be by taking the Presbuerger set and then generating a code as output "(a series of potentially nested loops)" and then iterates over the unknowns. Kandemir's approach does not take hardware specification into account either.

(b) Automatic Parallelization: Executing Sequential Programs on a Task-Based Parallel Runtime by A. Fonseca (hereafter Fonseca) discloses another system of the prior art for automatically parallelizing sequential code in modern multicore architectures. Fonseca discloses a parallelizing compiler that analyses the read and write instructions, and control-flow modifications in programs to identify a set of dependencies between the instructions in the program. Afterwards, the compiler, based on the generated dependencies graph, rewrites, and organizes the program in a task-oriented structure. Parallel tasks are composed by instructions that cannot be executed in parallel. A work-stealing-based parallel runtime is responsible for scheduling and managing the granularity of the generated tasks. Furthermore, a compile-time granularity control mechanism also avoids creating unnecessary data-structures. Fonseca focuses on the Java language, but the techniques could possibly be applied to other programming languages. However, in contrast to the inventive method, discloses in this application, in Fonseca's approach, in order to automatically parallelize the program, it is necessary to analyze the memory accessed to understand dependencies between parts of the program (cf. p. 6, Fonseca). The inventive method, disclosed herein, is different: Fonseca uses data-groups and memory layouts and then it checks the dependencies. This is not the same scope as the inventive method, since as Fonseca explicitly holds that it is task parallelism. For instance in the Fibonacci example, as discussed above, the cost of creating a new task is higher than the cost of executing the method for a low input number (see Fonseca p. 7). This shows that this is not the same approach, as the inventive method handles this example completely different. On the other side, this also directly the prove for a technical problem which can be solved by the inventive method. Further, Fonseca (see p. 9) has to define the main requirements for the position of the future creation. In contrast, the inventive method knows where to place each instruction, respectively statement, depending on the data dependency of the single information/variable. Fonseca (see p. 9) also discloses that an algorithm 18 has to be used to find the best position to create the future. The inventive method, in contrary, exactly places the instructions to the position based on the new scope. In Fonseca (see p. 10), the used operations that are commutative and associative. The inventive method does not base its approach on this form, because it excludes e.g. division (used in a lot of mathematical models). This limitation is also typically for map-reduce approaches (as discussed herein).

(c) The publication US 2008/0263530 A1 discloses a system for converting application code into optimized application code or into execution code suitable for execution on an architecture comprising at least a first and a second level of data memory units. The method obtains application code, the application code comprising data transfer operations between the levels of memory units. The method further comprises converting at least a part of the application code. The converting of application code comprises scheduling of data transfer operations from a first level of memory units to a second level of memory units such that accesses of data accessed multiple times are brought closer together in time than in the original code. The converting of application code further comprises, after the scheduling of the data transfer operations, deciding on layout of the data in the second level of memory units to improve the data layout locality such that data which is accessed closer together in time is also brought closer together in the layout than in the original code. US 2008/0263530A1 allows improving layout locality (see US 2008/0263530A1 p. 4, para. 0078). In contrast, the inventive method, disclosed herein, has a different scope, since the inventive method finds this form of "locality" and orders the instructions in a way that instructions are grouped, which must be "local"-then this inherent form of the code is placed in matrices and then there can be a generic, not-iterative, respectively by combining elements and then set the optimal mapping to a given hardware, which leads always in a concurrent form of the code. Iterative solution methods can miss solutions and end with a non-clear result. Further, US 2008/0263530A1 (p. 6, para. 0092) discloses that it can be regarded as a complex, non-linear problem, for which a reasonable, near-optimal, and scalable solution is provided. In contrast, the inventive method is not a non-linear problem, rather it prevents to get a complex, non-linear problem, which needs an iterative, numerical solution/optimization approach/algorithm. US 2008/0263530A1 (p. 6, para. 0093) holds that its access locality is improved by computing the reuse vectors and applying them to find an appropriate transformation matrix T. In contrast, the inventive method, disclosed herein, does not need a transformation matrix, nor computing of such one. It reads the inherent logic connection between the array operations based on the given code (in form of loop-definition or loop blocks in compiler IR languages or jump definitions in assembler code). Finally, US 2008/0263530A1 (p. 6, para. 0093) holds that having fixed T, thereafter the placement M for the arrays accessed in the loop-nest is fixed, whose placement is not already fixed. This discloses an iterative and numerical solver based approach. The inventive method, disclosed herein, reads this dependencies in the code, without an iterative solving technique using linear algebraic methods to finding solution of systems of equations.

LIST OF REFERENCE SIGNS

- 1 Compiler system
  - 11 Lexer/Parser
  - 12 Analyzer
  - 13 Scheduler
  - 14 Computational block chains module
  - 15 Matrix builder
    - 151, . . . , 15*i* Matrices
  - 16 Optimizer module
  - 17 Code generator
- 2 Parallel processing system/Multi-processer system
  - 21 Processor units
    - 210 Central Processing Units (CPU)
      - 2101 Control Unit
      - 2102 Processor
        - 21021 Register
        - 21022 Combinational logic
    - 211 Graphics Processing Units (GPU)
    - 212 Sound chips
    - 213 Vision Processing Unit (VPU)
    - 214 Tensor Processing Units (TPU)
    - 215 Neural Processing Units (NPU)
    - 216 Physics Processing Units (PPU)
    - 217 Digital Signal Processors (DSP)
    - 218 Synergistic Processing Units (SPU)
    - 219 Field-Programmable Gate Arrays (FPGA)
  - 22 Memory units
    - 221 Primary storage units
      - 2211 Processor registers
      - 2212 Processor caches
        - 22121 L1-cache
        - 22122 L2-cache
      - 2213 Random Access Memory (RAM) units
    - 222 Secondary storage units
      - 2221 Hard Disk Drives (HDD)
      - 2222 Solid-State Drives (SSD)
      - 2223 Universal Serial Bus (USB) memory
      - 2224 Flash drives
      - 2225 Optical storage devices (CD or DVD drives)
      - 2226 Floppy disk drives (FDD)
      - 2227 RAM disks
      - 2228 Magnetic tapes
    - 223 Tertiary storage units (tape backup etc.)
  - 23 Memory bus
    - 231 Address bus
    - 232 Data bus
  - 24 Memory Management Unit (MMU)
  - 25 Input/Output (I/O) interfaces
    - 251 Memory-mapped I/O (MMIO) or port-mapped I/O (PMIO) interfaces
    - 252 Input/Output (I/O) channels (processors)
- 3 Program code
  - 31 High level language
    - 311 C/C++
    - 312 phyton
    - 313 Java
    - 314 Fortran
    - 315 OpenCL (Open Computing Language)
  - 32 Low-level language (machine code/assembly language)
    - 321 Arithmetic operation instructions
    - 322 Logical operation instructions
    - 323 Variable and array declarations operations
    - 324 Compare operation instructions
    - 325 Code flow instructions/Memory operation/I/O operation
  - 33 Nodes
    - 331 Data nodes (holding certain data values)
      - 3311 Input data node for READ ($Datanode_{in}$ (read access))
      - 3312 Output data node for WRITE ($Datanode_{out}$, write access)
    - 332 Operation nodes (performing an operation)
    - 333 Computation block nodes (CB1, CB2 . . . , CBx)
    - 334 Control flow nodes
      - 3341 Branch nodes
      - 3342 Hidden branch nodes
      - 3343 Loop branch nodes
    - 335 Condition nodes
  - 34 Chains
    - 341 Computational chains (chains of computation block nodes)
    - 342 Operational chains (chains of operation nodes)
  - 35 Latency time Δt (time to transfer data from one process to another)
    - 351 $\Delta t_{readwrite}$=time between a write and a read access to a data node

352 $\Delta t_{computation}$=time to compute all operation nodes in a computation block node

353 Total (aggregated) latency time $\Delta t_{total}$

4 Network

41 Network controller

The invention claimed is:

1. A compiler system for optimized compiling and auto-parallelization of a program code for execution by a parallel processing system having a plurality of processing units simultaneously processing instructions on data in the parallel processing system by executing the program code, wherein the compiler system comprises means for translating a source program code written in a programming into a machine code as target programming language by generating the machine code as parallel processing code comprising a number of instructions executable by the plurality of processing units of the parallel processing system or controlling the operation of the plurality of processing units;

wherein the execution of the processing code by the parallel processing system comprises the occurrence of latency times, the latency times being given by idle times of the processing units between transmitting data back to the parallel processing system after having processed a specific block of instructions of the processing code on the data by the processing unit and receiving data necessary for execution of a consecutive block of instructions of the processing code by said processing units, wherein the compiler system comprises a parser module for translating the source programming language into a code with a flow of elementary instructions executable by the processing units, the elementary instructions selectable out of a processing-unit-specific set of elementary instructions and the elementary instructions comprising elementary arithmetic operations and/or logic operations and/or control operations and/or memory operations for the number of processing units;

wherein the parser module comprises means for partitioning the code of elementary instructions into computation block nodes, each computation block node consisting of a smallest possible segmentation of a non-further decomposable sequence of elementary instructions of the code processable by a single processing unit, the smallest possible segmentation of the elementary instructions being characterized by a sequence of elementary instructions framed by consecutive read and write instructions, said sequence being not further decomposable by smaller sequences of elementary instructions between consecutive read and write instructions, and the read and write instructions needed to receive data required for processing said sequence of elementary instructions by the processing unit and transmit back data after processing by the sequence;

wherein the compiler system comprises a matrix builder for generating computation and transfer matrices out of computation chains portioned from the code, wherein a computation chain is formed by one or more computation block nodes creating an ordered flow of computation block nodes, wherein each computation chain is executed by one processing unit;

wherein the computation matrix contains in each row the computation chain of a processing unit with each column having the sequence of elementary instructions of a computation block node within the computation chain of the row and each cell of the transfer matrix contains transfer properties associated with a data transfer from one to a consecutive computation block node, the transfer properties at least comprising what transfers are required at the beginning and at the end of each corresponding cell in the computation matrix; and wherein the compiler system comprises an optimizer module using an optimization technique by building different combinations of rows from the computation and the transfer matrices, each of the different combinations representing a possible machine code as parallel processing code, and by minimizing an overall occurring latency time as aggregated latency times providing an optimized combination as structure of computational chains being processed by the plurality of processing units, wherein by means of a code generator an optimized machine code is generated for the plurality of processing units of the parallel processing system having a minimized overall latency time.

2. The compiler system according to claim 1, wherein the source programming language is a high-level programming language.

3. The compiler system according to claim 2, wherein the high-level programming language comprises C and/or C++ and/or python and/or java.

4. The compiler system according to claim 1, wherein the transition buffer units comprise cache memory modules and/or L1-cache.

5. The compiler system according to claim 1, wherein the latency time comprises register access time and/or L1-cache access time and/or memory access time and/or I/O operation time and/or data network transfer time and/or processor configuration time.

6. The compiler system according to claim 1, wherein at least two of the processing units have different sets of elementary instructions.

7. The compiler system according to claim 1, wherein the arithmetic operations comprise the operations addition, subtraction, multiplication, and division.

8. The compiler system according to claim 1, wherein the logic operations comprise a number of logical expressions like equal, not equal, greater than, less than, greater than or equal, less than or equal.

9. The compiler system according to claim 1, wherein the control operations comprise a “branch expression” and/or a “loop expression”.

10. The compiler system according to claim 1, wherein the computation block nodes consist of connected operation nodes, the operation nodes being composed in one chain having one or more input data nodes and one or more output data nodes.

11. The compiler system according to claim 1, wherein the computation block nodes are connected to next computation block nodes or to control flow nodes or to one or more input data nodes and one or more output data nodes building the chain.

12. The compiler system according to claim 1, wherein each pair of computation and transfer matrices is realized forming a single numerical matrix and/or multi-dimensional numerical tensor, respectively.

13. The compiler system according to claim 12, wherein the numerical matrix optimization is realized as tensor optimization.

14. The compiler system according to claim 12, wherein the numerical matrix optimization or tensor optimization by means of the optimizer module is based on a dedicated applied machine learning structure.

15. The compiler system according to claim 1, wherein each computation block node of a computation chain is numbered along the ordered flow of computation block nodes within the computation chain by assigning block numbers to the computation block nodes, wherein in the computation and transfer matrix, the block numbers of the computation block nodes are equal to the column of the matrices, and wherein the computation block nodes with the same block number are distributed to different rows of the same column.

16. The compiler system according to claim 1, wherein in the computation matrix, each row contains a computation chain of a processing unit, wherein the cells of the computation matrix comprise the computation block nodes of the computation chain, and wherein in the transfer matrix, the cells contain the required transfer properties to and/or from other computation block nodes.

17. The compiler system according to claim 16, wherein the transfer matrix with the cells having the transfer properties comprise at least of what information is needed in another computation block node.

* * * * *